(12) United States Patent
Ogitani et al.

(10) Patent No.: US 12,497,465 B2
(45) Date of Patent: Dec. 16, 2025

(54) COMBINATION OF ANTIBODY-DRUG CONJUGATE AND TUBULIN INHIBITOR

(71) Applicant: DAIICHI SANKYO COMPANY, LIMITED, Tokyo (JP)

(72) Inventors: Yusuke Ogitani, Tokyo (JP); Chiaki Ishii, Tokyo (JP); Yasuki Kamai, Tokyo (JP); Kiyoshi Sugihara, Tokyo (JP); Shotaro Nagase, Tokyo (JP)

(73) Assignee: DAIICHI SANKYO COMPANY, LIMITED, Tokyo (JP)

( * ) Notice: Subject to any disclaimer, the term of this patent is extended or adjusted under 35 U.S.C. 154(b) by 1259 days.

(21) Appl. No.: 17/266,465

(22) PCT Filed: Aug. 5, 2019

(86) PCT No.: PCT/JP2019/030635
§ 371 (c)(1),
(2) Date: Feb. 5, 2021

(87) PCT Pub. No.: WO2020/031936
PCT Pub. Date: Feb. 13, 2020

(65) Prior Publication Data
US 2021/0290775 A1 Sep. 23, 2021

(30) Foreign Application Priority Data

Aug. 6, 2018 (JP) .................................. 2018-147582

(51) Int. Cl.
| | |
|---|---|
| *C07K 16/32* | (2006.01) |
| *A61K 31/337* | (2006.01) |
| *A61K 31/357* | (2006.01) |
| *A61K 31/4745* | (2006.01) |
| *A61K 47/54* | (2017.01) |
| *A61K 47/65* | (2017.01) |

(Continued)

(52) U.S. Cl.
CPC ............ *C07K 16/32* (2013.01); *A61K 31/337* (2013.01); *A61K 31/357* (2013.01); *A61K 31/4745* (2013.01); *A61K 47/545* (2017.08); *A61K 47/65* (2017.08); *A61K 47/68037* (2023.08); *A61K 47/6849* (2017.08); *A61P 35/00* (2018.01)

(58) Field of Classification Search
CPC .... C07K 16/32; C07K 16/28; C07K 16/2827; A61K 31/337; A61K 31/357; A61K 31/4745; A61K 47/545; A61K 47/65; A61K 47/68037; A61K 47/6849; A61K 2039/505; A61K 39/39558; A61K 45/06; A61K 47/6851; A61K 47/6855; A61K 47/6857; A61K 47/6859; A61K 47/6869; A61K 47/6801; A61K 47/6835; A61K 2300/00; A61P 35/00; A61P 43/00
See application file for complete search history.

(56) References Cited

U.S. PATENT DOCUMENTS 10,155,821 B2 * 12/2018 Naito .................. A61K 47/6849
11,584,800 B2 * 2/2023 Naito .................. C07K 16/3046
(Continued)

FOREIGN PATENT DOCUMENTS

| CN | 103239455 A | 8/2013 |
|---|---|---|
| CN | 107922477 A | 4/2018 |

(Continued)

OTHER PUBLICATIONS

McIntyre, et al., Breast Cancer Rs Treat (2014) 146:321 (Year: 2014).*

(Continued)

*Primary Examiner* — Karen A. Canella
*Assistant Examiner* — Sydney Van Druff
(74) *Attorney, Agent, or Firm* — Foley & Lardner LLP

(57) ABSTRACT

A pharmaceutical composition, wherein an antibody-drug conjugate in which a drug-linker represented by the following formula (wherein A represents a connecting position to an antibody) is conjugated to the antibody via a thioether bond, and a tubulin inhibitor are administered in combination, and a method of treatment, wherein the antibody-drug conjugate and the tubulin inhibitor are administered in combination to a subject.

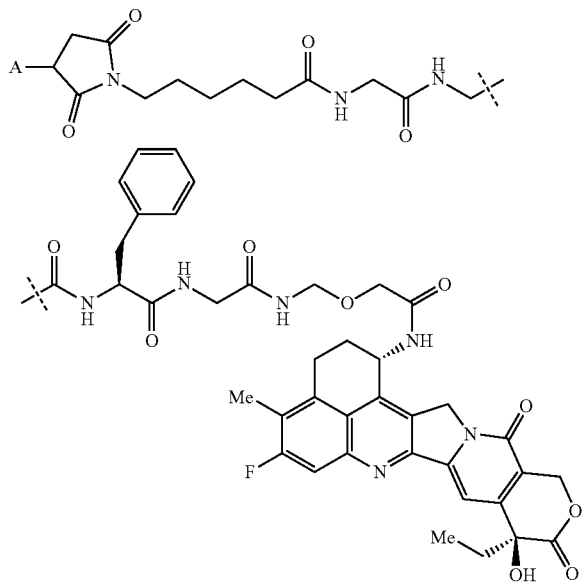

47 Claims, 10 Drawing Sheets
Specification includes a Sequence Listing.

(51) Int. Cl.
  *A61K 47/68*  (2017.01)
  *A61P 35/00*  (2006.01)

(56) References Cited

U.S. PATENT DOCUMENTS

| | | | |
|---|---|---|---|
| 2016/0046711 | A1 | 2/2016 | Bialucha et al. |
| 2016/0333112 | A1* | 11/2016 | Naito .................... C07K 16/30 |
| 2017/0252458 | A1 | 9/2017 | Albone et al. |
| 2018/0147292 | A1 | 5/2018 | Noguchi et al. |
| 2021/0386865 | A1 | 12/2021 | Noguchi et al. |
| 2024/0026030 | A1* | 1/2024 | Naito ................ C07K 16/3015 |

FOREIGN PATENT DOCUMENTS

| | | | |
|---|---|---|---|
| EP | 3 552 626 | A1 | 10/2019 |
| JP | 2017-524364 | A | 8/2017 |
| JP | 2018-520140 | A | 7/2018 |
| WO | WO-2014/057687 | A1 | 4/2014 |
| WO | WO-2014/061277 | A1 | 4/2014 |
| WO | WO-2015/098099 | A1 | 7/2015 |
| WO | WO-2015/115091 | A1 | 8/2015 |
| WO | WO-2015/146132 | A1 | 10/2015 |
| WO | WO-2015/155976 | A1 | 10/2015 |
| WO | WO-2015/155998 | A1 | 10/2015 |
| WO | WO-2016/024195 | A1 | 2/2016 |
| WO | WO-2016/210108 | A1 | 12/2016 |
| WO | WO-2017/100709 | A1 | 6/2017 |
| WO | WO-2018/110515 | A1 | 6/2018 |
| WO | WO-2018/135501 | A1 | 7/2018 |
| WO | WO-2018/212136 | A1 | 11/2018 |

OTHER PUBLICATIONS

Office Action issued in corresponding Chinese Patent Application No. 201980052170.5 dated Apr. 26, 2024 (9 pages).
Office Action and Search Report issued in corresponding Chinese Patent Application No. 201980052170.5, dated Feb. 25, 2023.
International Searching Authority, "International Search Report," issued in connection with International Patent Application No. PCT/JP2019/030635, dated Oct. 8, 2019.
International Searching Authority, "Written Opinion," issued in connection with International Patent Application No. PCT/JP2019/030635, dated Oct. 8, 2019.
Alley et al., "Antibody-drug conjugates: targeted drug delivery for cancer," Current Opinion in Chemical Biology, vol. 14, 2010, pp. 529-537.
Burris, III et al., "Phase II Study of the Antibody Drug Conjugate Trastuzumab-DM1 for the Treatment of Human Epidermal Growth Factor Receptor 2 (HER2)—Positive Breast Cancer After Prior HER2-Directed Therapy," Journal of Clinical Oncology, vol. 29, No. 4, Feb. 1, 2011, pp. 398-405.
Damle, Nitin K., "Tumour-targeted chemotherapy with immunoconjugates of calicheamicin," Expert Opin. Biol. Ther., vol. 4, No. 9, 2004, pp. 1445-1452.
Doi et al., "Safety, pharmacokinetics, and antitumour activity of trastuzumab deruxtecan (DS-8201), a HER2-targeting antibody-drug conjugate, in patients with advanced breast and gastric or gastro-oesophageal tumours: a phase 1 dose-escalation study," The Lancet Oncology, vol. 18, Issue 11, Nov. 1, 2017, pp. 1512-1522.
Ducry et al., "Antibody—Drug Conjugates: Linking Cytotoxic Payloads to Monoclonal Antibodies," Bioconjugate Chem, vol. 21, 2010, pp. 5-13.
Dumontet et al., "Microtubule-binding agents: a dynamic field of cancer therapeutics," Nat Rev Drug Discov, vol. 9, No. 10, 2010, pp. 790-803.
Mukhtar et al., "Targeting Microtubules by Natural Agents for Cancer Therapy," Molecular Cancer Therapeutics, vol. 13, Issue 2, Feb. 2014, pp. 275-284.
Ogitani et al., "Bystander killing effect of DS-8201a, a novel anti-human epidermal growth factor receptor 2 antibody-drug conjugate, in tumors with human epidermal growth factor receptor 2 heterogeneity," Cancer Science, vol. 107, 2016, pp. 1039-1046.
Ogitani et al., "DS-8201a, A Novel HER2-Targeting ADC with a Novel DNA Topoisomerase I Inhibitor, Demonstrates a Promising Antitumor Efficacy with Differentiation from T-DM1," Clinical Cancer Research, vol. 22, No. 20, Oct. 15, 2016, pp. 5097-5108.
Senter et al., "The discovery and development of brentuximab vedotin for use in relapsed Hodgkin lymphoma and systemic anaplastic large cell lymphoma," Nature Biotechnology, vol. 30, No. 7, Jul. 2012, pp. 631-637.
Takegawa et al., "DS-8201a, a new HER2-targeting antibody-drug conjugate incorporating a novel DNA topoisomerase I inhibitor, overcomes HER2-positive gastric cancer T-DM1 resistance," International Journey of Cancer, vol. 141, 2017, pp. 1682-1689.
Office Action issued in corresponding Australian Patent Application No. 2019320336 dated May 23, 2024 (4 pages).
Extended European Search Report issued in corresponding European Application No. 19847036.1 dated Apr. 8, 2022 (7 pages).
Chinese Office Action issued in corresponding CN Appl. Ser. No. 201980052170.5 dated Jun. 14, 2022 (7 pages).

* cited by examiner

[Figure 1]

SEQ ID NO: 1 - Amino acid sequence of a heavy chain of the anti-HER2 antibody

EVQLVESGGGLVQPGGSLRLSCAASGFNIKDTYIHWVR
QAPGKGLEWVARIYPTNGYTRYADSVKGRFTISADTSK
NTAYLQMNSLRAEDTAVYYCSRWGGDGFYAMDYWGQGT
LVTVSSASTKGPSVFPLAPSSKSTSGGTAALGCLVKDY
FPEPVTVSWNSGALTSGVHTFPAVLQSSGLYSLSSVVT
VPSSSLGTQTYICNVNHKPSNTKVDKKVEPKSCDKTHT
CPPCPAPELLGGPSVFLFPPKPKDTLMISRTPEVTCVV
VDVSHEDPEVKFNWYVDGVEVHNAKTKPREEQYNSTYR
VVSVLTVLHQDWLNGKEYKCKVSNKALPAPIEKTISKA
KGQPREPQVYTLPPSREEMTKNQVSLTCLVKGFYPSDI
AVEWESNGQPENNYKTTPPVLDSDGSFFLYSKLTVDKS
RWQQGNVFSCSVMHEALHNHYTQKSLSLSPGK

[Figure 2]

SEQ ID NO: 2 - Amino acid sequence of a light chain of the anti-HER2 antibody

DIQMTQSPSSLSASVGDRVTITCRASQDVNTAVAWYQQ
KPGKAPKLLIYSASFLYSGVPSRFSGSRSGTDFTLTIS
SLQPEDFATYYCQQHYTTPPTFGQGTKVEIKRTVAAPS
VFIFPPSDEQLKSGTASVVCLLNNFYPREAKVQWKVDN
ALQSGNSQESVTEQDSKDSTYSLSSTLTLSKADYEKHK
VYACEVTHQGLSSPVTKSFNRGEC

[Figure 3]

SEQ ID NO: 3 - Amino acid sequence of a heavy chain of the anti-HER3 antibody

```
QVQLQQWGAGLLKPSETLSLTCAVYGGSFSGYYWSWIR
QPPGKGLEWIGEINHSGSTNYNPSLKSRVTISVETSKN
QFSLKLSSVTAADTAVYYCARDKWTWYFDLWGRGTLVT
VSSASTKGPSVFPLAPSSKSTSGGTAALGCLVKDYFPE
PVTVSWNSGALTSGVHTFPAVLQSSGLYSLSSVVTVPS
SSLGTQTYICNVNHKPSNTKVDKRVEPKSCDKTHTCPP
CPAPELLGGPSVFLFPPKPKDTLMISRTPEVTCVVVDV
SHEDPEVKFNWYVDGVEVHNAKTKPREEQYNSTYRVVS
VLTVLHQDWLNGKEYKCKVSNKALPAPIEKTISKAKGQ
PREPQVYTLPPSREEMTKNQVSLTCLVKGFYPSDIAVE
WESNGQPENNYKTTPPVLDSDGSFFLYSKLTVDKSRWQ
QGNVFSCSVMHEALHNHYTQKSLSLSPGK
```

[Figure 4]

SEQ ID NO: 4 - Amino acid sequence of a light chain of the anti-HER3 antibody

```
DIEMTQSPDSLAVSLGERATINCRSSQSVLYSSSNRNY
LAWYQQNPGQPPKLLIYWASTRESGVPDRFSGSGSGTD
FTLTISSLQAEDVAVYYCQQYYSTPRTFGQGTKVEIKR
TVAAPSVFIFPPSDEQLKSGTASVVCLLNNFYPREAKV
QWKVDNALQSGNSQESVTEQDSKDSTYSLSSTLTLSKA
DYEKHKVYACEVTHQGLSSPVTKSFNRGEC
```

[Figure 5]

SEQ ID NO: 5 - Amino acid sequence of a heavy chain of the anti-TROP2 antibody

MKHLWFFLLLVAAPRWVLSQVQLVQSGAEVKKPGASVK
VSCKASGYTFTTAGMQWVRQAPGQGLEWMGWINTHSGV
PKYAEDFKGRVTISADTSTSTAYLQLSSLKSEDTAVYY
CARSGFGSSYWYFDVWGQGTLVTVSSASTKGPSVFPLA
PSSKSTSGGTAALGCLVKDYFPEPVTVSWNSGALTSGV
HTFPAVLQSSGLYSLSSVVTVPSSSLGTQTYICNVNHK
PSNTKVDKRVEPKSCDKTHTCPPCPAPELLGGPSVFLF
PPKPKDTLMISRTPEVTCVVVDVSHEDPEVKFNWYVDG
VEVHNAKTKPREEQYNSTYRVVSVLTVLHQDWLNGKEY
KCKVSNKALPAPIEKTISKAKGQPREPQVYTLPPSREE
MTKNQVSLTCLVKGFYPSDIAVEWESNGQPENNYKTTP
PVLDSDGSFFLYSKLTVDKSRWQQGNVFSCSVMHEALH
NHYTQKSLSLSPGK

Signal sequence (1-19), Variable region (20-140), Constant region (141-470)

[Figure 6]

SEQ ID NO: 6 - Amino acid sequence of a light chain of the anti-TROP2 antibody

MVLQTQVFISLLLWISGAYGDIQMTQSPSSLSASVGDR
VTITCKASQDVSTAVAWYQQKPGKAPKLLIYSASYRYT
GVPSRFSGSGSGTDFTLTISSLQPEDFAVYYCQQHYIT
PLTFGQGTKLEIKRTVAAPSVFIFPPSDEQLKSGTASV
VCLLNNFYPREAKVQWKVDNALQSGNSQESVTEQDSKD
STYSLSSTLTLSKADYEKHKVYACEVTHQGLSSPVTKS
FNRGEC

Signal sequence (1-20), Variable region (21-129), Constant region (130-234)

[Figure 7]

SEQ ID NO: 7 - Amino acid sequence of a heavy chain of the anti-B7-H3 antibody

MKHLWFFLLLVAAPRWVLSQVQLVQSGAEVKKPGSSVK
VSCKASGYTFTNYVMHWVRQAPGQGLEWMGYINPYNDD
VKYNEKFKGRVTITADESTSTAYMELSSLRSEDTAVYY
CARWGYYGSPLYYFDYWGQGTLVTVSSASTKGPSVFPL
APSSKSTSGGTAALGCLVKDYFPEPVTVSWNSGALTSG
VHTFPAVLQSSGLYSLSSVVTVPSSSLGTQTYICNVNH
KPSNTKVDKRVEPKSCDKTHTCPPCPAPELLGGPSVFL
FPPKPKDTLMISRTPEVTCVVVDVSHEDPEVKFNWYVD
GVEVHNAKTKPREEQYNSTYRVVSVLTVLHQDWLNGKE
YKCKVSNKALPAPIEKTISKAKGQPREPQVYTLPPSRE
EMTKNQVSLTCLVKGFYPSDIAVEWESNGQPENNYKTT
PPVLDSDGSFFLYSKLTVDKSRWQQGNVFSCSVMHEAL
HNHYTQKSLSLSPGK

Signal sequence (1-19), Variable region (20-141), Constant region (142-471)

[Figure 8]

SEQ ID NO: 8 - Amino acid sequence of a light chain of the anti-B7-H3 antibody

MVLQTQVFISLLLWISGAYGEIVLTQSPATLSLSPGER
ATLSCRASSRLIYMHWYQQKPGQAPRPLIYATSNLASG
IPARFSGSGSGTDFTLTISSLEPEDFAVYYCQQWNSNP
PTFGQGTKVEIKRTVAAPSVFIFPPSDEQLKSGTASVV
CLLNNFYPREAKVQWKVDNALQSGNSQESVTEQDSKDS
TYSLSSTLTLSKADYEKHKVYACEVTHQGLSSPVTKSF
NRGEC

Signal sequence (1-20), Variable region (21-128), Constant region (129-233)

[Figure 9]
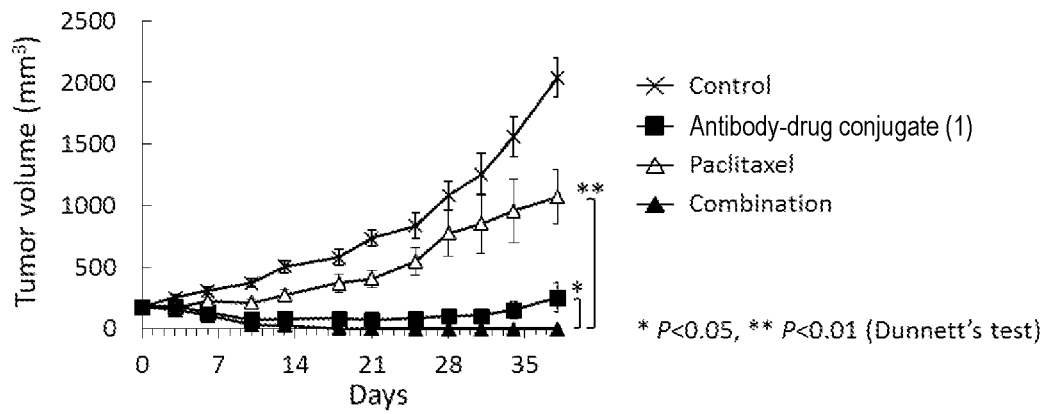
[Figure 10]
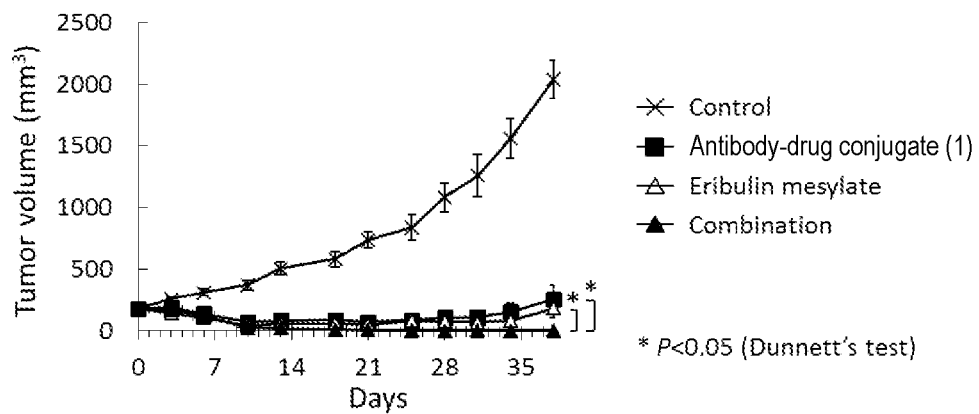
[Figure 11]
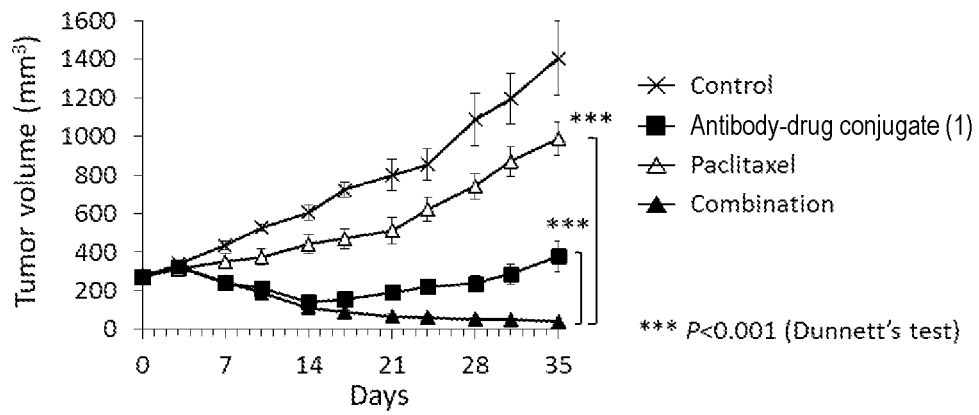

[Figure 12]
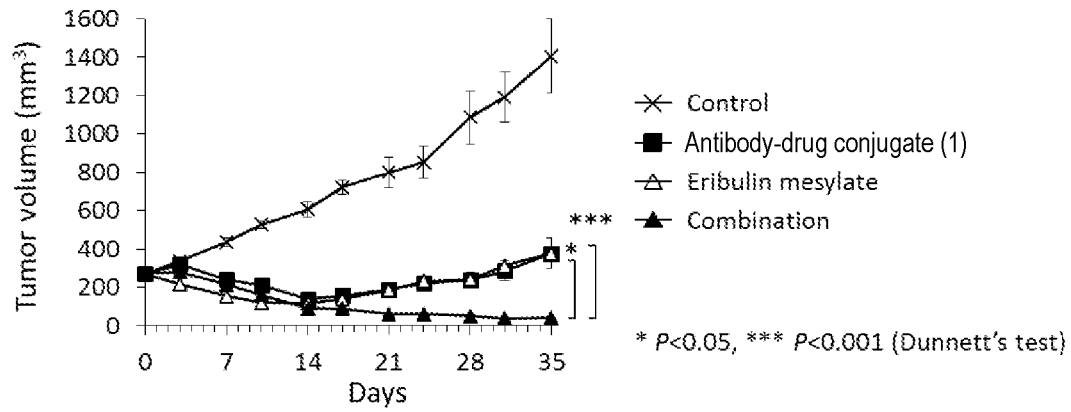
[Figure 13]
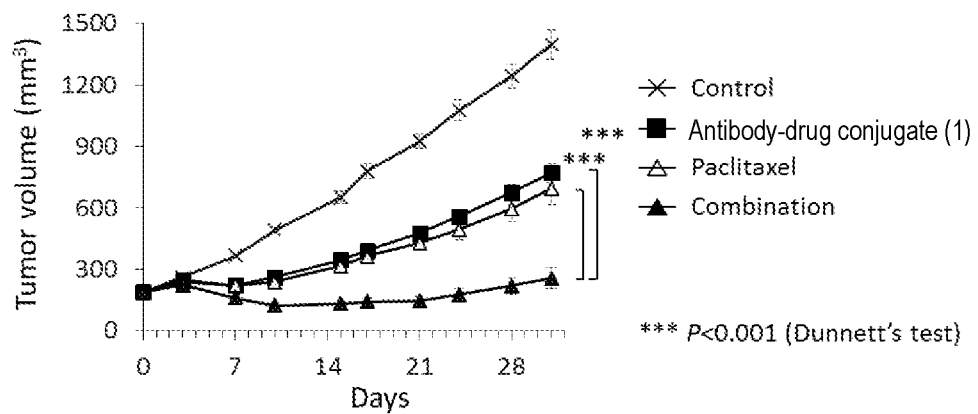
[Figure 14]
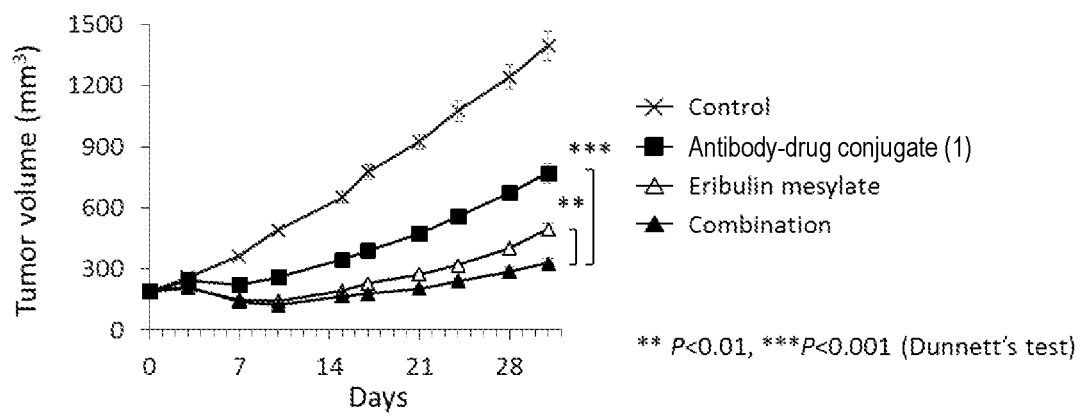

[Figure 15]
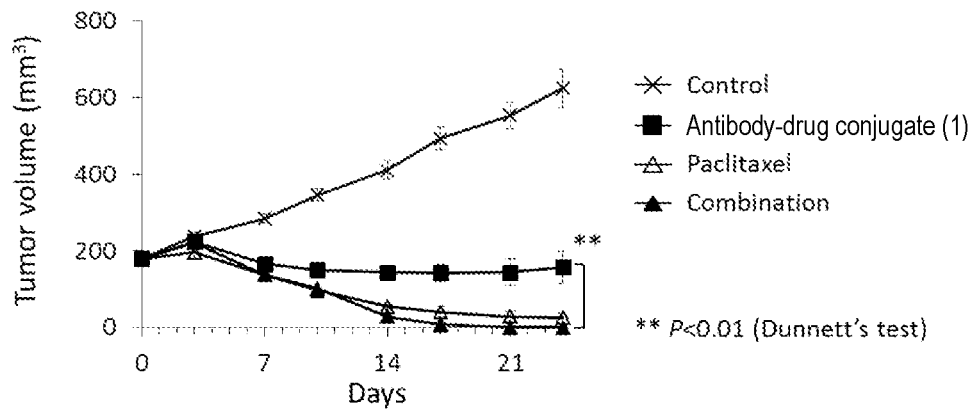
[Figure 16]
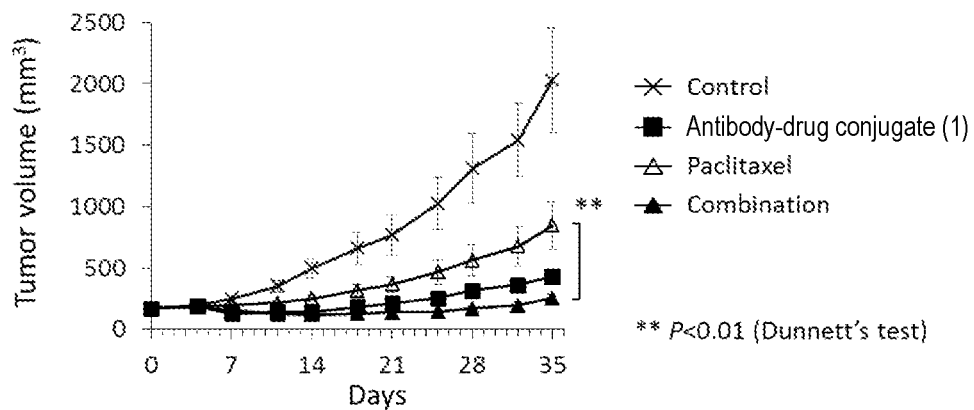
[Figure 17]
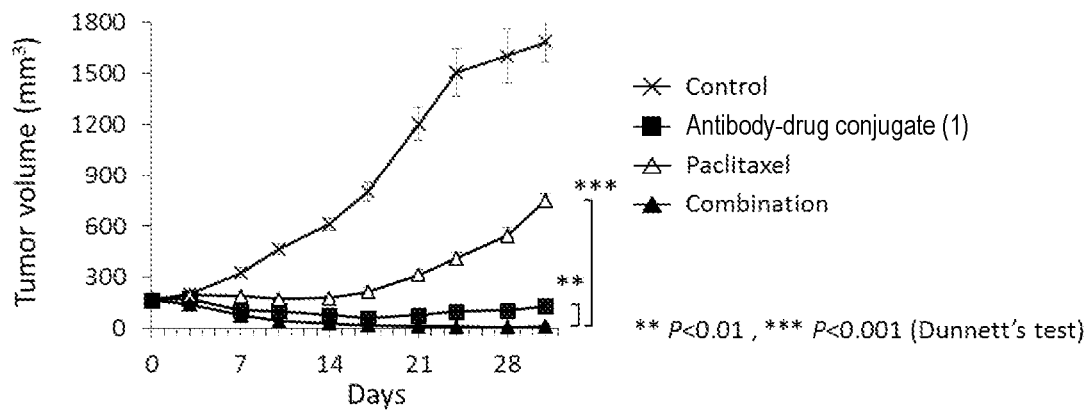

[Figure 18]

SEQ ID NO: 9 - Amino acid sequence of a heavy chain of the anti-GPR20 antibody

MKHLWFFLLLVAAPRWVLSEVQLVQSGAEVKKPGASVK
VSCKASGYTFTSYYISWIRQAPGQGLKYMGFINPGSGH
TNYNEKFKGRVTITADKSSTATMELSSLRSEDTAVYY
CARGAGGFLRIITKFDYWGQGTLVTVSSASTKGPSVFP
LAPSSKSTSGGTAALGCLVKDYFPEPVTVSWNSGALTS
GVHTFPAVLQSSGLYSLSSVVTVPSSSLGTQTYICNVN
HKPSNTKVDKRVEPKSCDKTHTCPPCPAPELLGGPSVF
LFPPKPKDTLMISRTPEVTCVVVDVSHEDPEVKFNWYV
DGVEVHNAKTKPREEQYNSTYRVVSVLTVLHQDWLNGK
EYKCKVSNKALPAPIEKTISKAKGQPREPQVYTLPPSR
EEMTKNQVSLTCLVKGFYPSDIAVEWESNGQPENNYKT
TPPVLDSDGSFFLYSKLTVDKSRWQQGNVFSCSVMHEA
LHNHYTQKSLSLSPGK

Signal sequence (1-19), Variable region (20-142), Constant region (143-472)

[Figure 19]

SEQ ID NO: 10 - Amino acid sequence of a light chain of the anti-GPR20 antibody

MVLQTQVFISLLLWISGAYGDTQLTQSPSSLSASVGDR
VTITCRASKSVSTYIHWYQQKPGKQPKLLIYSAGNLES
GVPSRFSGSGSGTDFTLTISSLQPEDFANYYCQQINEL
PYTFGQGTKVEIKRTVAAPSVFIFPPSDEQLKSGTASV
VCLLNNFYPREAKVQWKVDNALQSGNSQESVTEQDSKD
STYSLSSTLTLSKADYEKHKVYACEVTHQGLSSPVTKS
FNRGEC

Signal sequence (1-20), Variable region (21-129), Constant region (130-234)

[Figure 20]

SEQ ID NO: 11 - Amino acid sequence of a heavy chain of the anti-CDH6 antibody

MKHLWFFLLLVAAPRWVLSEVQLVQSGAEVKKPGASVK
VSCKASGYTFTRNFMHWVRQAPGQGLEWMGWIYPGDGE
TEYAQKFQGRVTITADTSTSTAYMELSSLRSEDTAVYY
CARGVYGGFAGGYFDFWGQGTLVTVSSASTKGPSVFPL
APSSKSTSGGTAALGCLVKDYFPEPVTVSWNSGALTSG
VHTFPAVLQSSGLYSLSSVVTVPSSSLGTQTYICNVNH
KPSNTKVDKRVEPKSCDKTHTCPPCPAPELLGGPSVFL
FPPKPKDTLMISRTPEVTCVVVDVSHEDPEVKFNWYVD
GVEVHNAKTKPREEQYNSTYRVVSVLTVLHQDWLNGKE
YKCKVSNKALPAPIEKTISKAKGQPREPQVYTLPPSRE
EMTKNQVSLTCLVKGFYPSDIAVEWESNGQPENNYKTT
PPVLDSDGSFFLYSKLTVDKSRWQQGNVFSCSVMHEAL
HNHYTQKSLSLSPGK

Signal sequence (1-19), Variable region (20-141), Constant region (142-471)

[Figure 21]

SEQ ID NO: 12 - Amino acid sequence of a light chain of the anti-CDH6 antibody

MVLQTQVFISLLLWISGAYGDIQMTQSPSSLSASVGDR
VTITCKASQNIYKNLAWYQQKPGKAPKLLIYDANTLQT
GVPSRFSGSGSGSDFTLTISSLQPEDFATYFCQQYYSG
WAFGQGTKVEIKRTVAAPSVFIFPPSDEQLKSGTASVV
CLLNNFYPREAKVQWKVDNALQSGNSQESVTEQDSKDS
TYSLSSTLTLSKADYEKHKVYACEVTHQGLSSPVTKSF
NRGEC

Signal sequence (1-20), Variable region (21-128), Constant region (129-233)

[Figure 22]
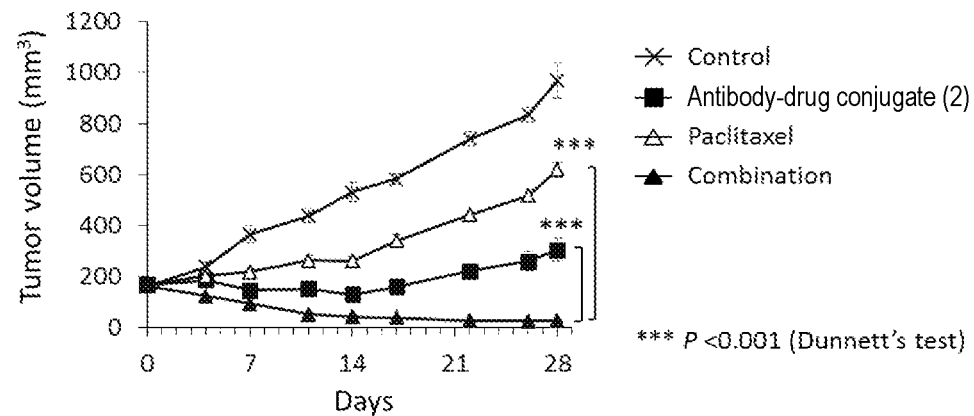
[Figure 23]
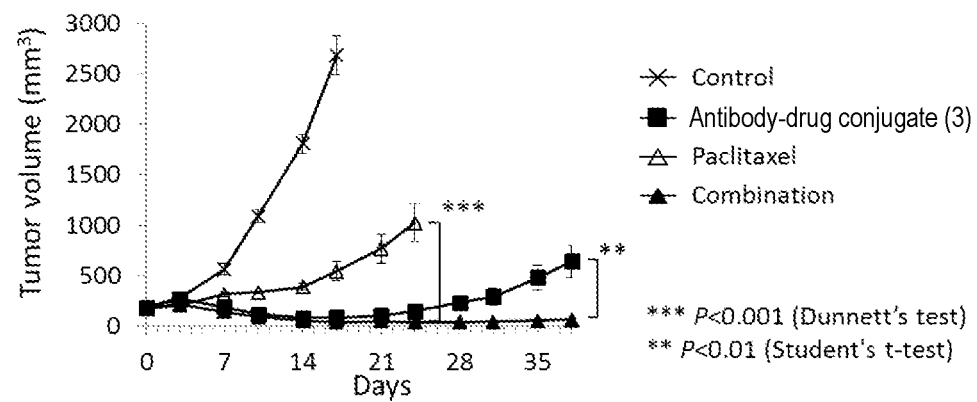

SEQUENCE LISTING

```
<160> NUMBER OF SEQ ID NOS: 12

<210> SEQ ID NO 1
<211> LENGTH: 450
<212> TYPE: PRT
<213> ORGANISM: Artificial Sequence
<220> FEATURE:
<223> OTHER INFORMATION: Heavy chain of anti-HER2 antibody

<400> SEQUENCE: 1

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Asn Ile Lys Asp Thr
            20                  25                  30

Tyr Ile His Trp Val Arg Gln Ala Pro Gly Lys Gly Leu Glu Trp Val
        35                  40                  45

Ala Arg Ile Tyr Pro Thr Asn Gly Tyr Thr Arg Tyr Ala Asp Ser Val
    50                  55                  60

Lys Gly Arg Phe Thr Ile Ser Ala Asp Thr Ser Lys Asn Thr Ala Tyr
65                  70                  75                  80

Leu Gln Met Asn Ser Leu Arg Ala Glu Asp Thr Ala Val Tyr Tyr Cys
                85                  90                  95

Ser Arg Trp Gly Gly Asp Gly Phe Tyr Ala Met Asp Tyr Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
        275                 280                 285

Asn Ala Lys Thr Lys Pro Arg Glu Glu Gln Tyr Asn Ser Thr Tyr Arg
    290                 295                 300
```

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
            325                 330                 335

Lys Thr Ile Ser Lys Ala Lys Gly Gln Pro Arg Glu Pro Gln Val Tyr
            340                 345                 350

Thr Leu Pro Pro Ser Arg Glu Glu Met Thr Lys Asn Gln Val Ser Leu
            355                 360                 365

Thr Cys Leu Val Lys Gly Phe Tyr Pro Ser Asp Ile Ala Val Glu Trp
370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
                420                 425                 430

Glu Ala Leu His Asn His Tyr Thr Gln Lys Ser Leu Ser Leu Ser Pro
                435                 440                 445

Gly Lys
    450

<210> SEQ ID NO 2
<211> LENGTH: 214
<212> TYPE: PRT
<213> ORGANISM: Artificial Sequence
<220> FEATURE:
<223> OTHER INFORMATION: Light chain of anti-HER2 antibody

<400> SEQUENCE: 2

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Val Asn Thr Ala
            20                  25                  30

Val Ala Trp Tyr Gln Gln Lys Pro Gly Lys Ala Pro Lys Leu Leu Ile
        35                  40                  45

Tyr Ser Ala Ser Phe Leu Tyr Ser Gly Val Pro Ser Arg Phe Ser Gly
    50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln Gln His Tyr Thr Thr Pro Pro
            85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 3
<211> LENGTH: 447
<212> TYPE: PRT
<213> ORGANISM: Artificial Sequence
<220> FEATURE:
<223> OTHER INFORMATION: Heavy chain of anti-HER3 antibody

<400> SEQUENCE: 3

Gln Val Gln Leu Gln Gln Trp Gly Ala Gly Leu Leu Lys Pro Ser Glu
1               5                   10                  15

Thr Leu Ser Leu Thr Cys Ala Val Tyr Gly Gly Ser Phe Ser Gly Tyr
            20                  25                  30

Tyr Trp Ser Trp Ile Arg Gln Pro Pro Gly Lys Gly Leu Glu Trp Ile
        35                  40                  45

Gly Glu Ile Asn His Ser Gly Ser Thr Asn Tyr Asn Pro Ser Leu Lys
    50                  55                  60

Ser Arg Val Thr Ile Ser Val Glu Thr Ser Lys Asn Gln Phe Ser Leu
65                  70                  75                  80

Lys Leu Ser Ser Val Thr Ala Ala Asp Thr Ala Val Tyr Tyr Cys Ala
                85                  90                  95

Arg Asp Lys Trp Thr Trp Tyr Phe Asp Leu Trp Gly Arg Gly Thr Leu
            100                 105                 110

Val Thr Val Ser Ser Ala Ser Thr Lys Gly Pro Ser Val Phe Pro Leu
        115                 120                 125

Ala Pro Ser Ser Lys Ser Thr Ser Gly Gly Thr Ala Ala Leu Gly Cys
    130                 135                 140

Leu Val Lys Asp Tyr Phe Pro Glu Pro Val Thr Val Ser Trp Asn Ser
145                 150                 155                 160

Gly Ala Leu Thr Ser Gly Val His Thr Phe Pro Ala Val Leu Gln Ser
                165                 170                 175

Ser Gly Leu Tyr Ser Leu Ser Ser Val Val Thr Val Pro Ser Ser Ser
            180                 185                 190

Leu Gly Thr Gln Thr Tyr Ile Cys Asn Val Asn His Lys Pro Ser Asn
        195                 200                 205

Thr Lys Val Asp Lys Arg Val Glu Pro Lys Ser Cys Asp Lys Thr His
    210                 215                 220

Thr Cys Pro Pro Cys Pro Ala Pro Glu Leu Leu Gly Gly Pro Ser Val
225                 230                 235                 240

Phe Leu Phe Pro Pro Lys Pro Lys Asp Thr Leu Met Ile Ser Arg Thr
                245                 250                 255

Pro Glu Val Thr Cys Val Val Val Asp Val Ser His Glu Asp Pro Glu
            260                 265                 270

Val Lys Phe Asn Trp Tyr Val Asp Gly Val Glu Val His Asn Ala Lys
        275                 280                 285

Thr Lys Pro Arg Glu Glu Gln Tyr Asn Ser Thr Tyr Arg Val Val Ser
    290                 295                 300

Val Leu Thr Val Leu His Gln Asp Trp Leu Asn Gly Lys Glu Tyr Lys
305                 310                 315                 320

Cys Lys Val Ser Asn Lys Ala Leu Pro Ala Pro Ile Glu Lys Thr Ile
                325                 330                 335

Ser Lys Ala Lys Gly Gln Pro Arg Glu Pro Gln Val Tyr Thr Leu Pro
            340                 345                 350

Pro Ser Arg Glu Glu Met Thr Lys Asn Gln Val Ser Leu Thr Cys Leu
        355                 360                 365

Val Lys Gly Phe Tyr Pro Ser Asp Ile Ala Val Glu Trp Glu Ser Asn
        370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Lys Leu Thr Val Asp Lys Ser Arg
                405                 410                 415

Trp Gln Gln Gly Asn Val Phe Ser Cys Ser Val Met His Glu Ala Leu
                420                 425                 430

His Asn His Tyr Thr Gln Lys Ser Leu Ser Leu Ser Pro Gly Lys
                435                 440                 445

<210> SEQ ID NO 4
<211> LENGTH: 220
<212> TYPE: PRT
<213> ORGANISM: Artificial Sequence
<220> FEATURE:
<223> OTHER INFORMATION: Light chain of anti-HER3 antibody

<400> SEQUENCE: 4

Asp Ile Glu Met Thr Gln Ser Pro Asp Ser Leu Ala Val Ser Leu Gly
1               5                   10                  15

Glu Arg Ala Thr Ile Asn Cys Arg Ser Ser Gln Ser Val Leu Tyr Ser
            20                  25                  30

Ser Ser Asn Arg Asn Tyr Leu Ala Trp Tyr Gln Gln Asn Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Gln Gln
                85                  90                  95

Tyr Tyr Ser Thr Pro Arg Thr Phe Gly Gln Gly Thr Lys Val Glu Ile
            100                 105                 110

Lys Arg Thr Val Ala Ala Pro Ser Val Phe Ile Phe Pro Pro Ser Asp
        115                 120                 125

Glu Gln Leu Lys Ser Gly Thr Ala Ser Val Val Cys Leu Leu Asn Asn
    130                 135                 140

Phe Tyr Pro Arg Glu Ala Lys Val Gln Trp Lys Val Asp Asn Ala Leu
145                 150                 155                 160

Gln Ser Gly Asn Ser Gln Glu Ser Val Thr Glu Gln Asp Ser Lys Asp
                165                 170                 175

Ser Thr Tyr Ser Leu Ser Ser Thr Leu Thr Leu Ser Lys Ala Asp Tyr
            180                 185                 190

Glu Lys His Lys Val Tyr Ala Cys Glu Val Thr His Gln Gly Leu Ser
        195                 200                 205

Ser Pro Val Thr Lys Ser Phe Asn Arg Gly Glu Cys
    210                 215                 220

<210> SEQ ID NO 5
<211> LENGTH: 470
<212> TYPE: PRT
<213> ORGANISM: Artificial Sequence
<220> FEATURE:
<223> OTHER INFORMATION: Heavy chain of anti-TROP2 antibody

```
<400> SEQUENCE: 5

Met Lys His Leu Trp Phe Phe Leu Leu Leu Val Ala Ala Pro Arg Trp
1               5                   10                  15

Val Leu Ser Gln Val Gln Leu Val Gln Ser Gly Ala Glu Val Lys Lys
            20                  25                  30

Pro Gly Ala Ser Val Lys Val Ser Cys Lys Ala Ser Gly Tyr Thr Phe
        35                  40                  45

Thr Thr Ala Gly Met Gln Trp Val Arg Gln Ala Pro Gly Gln Gly Leu
    50                  55                  60

Glu Trp Met Gly Trp Ile Asn Thr His Ser Gly Val Pro Lys Tyr Ala
65              70                  75                  80

Glu Asp Phe Lys Gly Arg Val Thr Ile Ser Ala Asp Thr Ser Thr Ser
                85                  90                  95

Thr Ala Tyr Leu Gln Leu Ser Ser Leu Lys Ser Glu Asp Thr Ala Val
            100                 105                 110

Tyr Tyr Cys Ala Arg Ser Gly Phe Gly Ser Ser Tyr Trp Tyr Phe Asp
        115                 120                 125

Val Trp Gly Gln Gly Thr Leu Val Thr Val Ser Ser Ala Ser Thr Lys
    130                 135                 140

Gly Pro Ser Val Phe Pro Leu Ala Pro Ser Ser Lys Ser Thr Ser Gly
145                 150                 155                 160

Gly Thr Ala Ala Leu Gly Cys Leu Val Lys Asp Tyr Phe Pro Glu Pro
                165                 170                 175

Val Thr Val Ser Trp Asn Ser Gly Ala Leu Thr Ser Gly Val His Thr
            180                 185                 190

Phe Pro Ala Val Leu Gln Ser Ser Gly Leu Tyr Ser Leu Ser Ser Val
        195                 200                 205

Val Thr Val Pro Ser Ser Ser Leu Gly Thr Gln Thr Tyr Ile Cys Asn
    210                 215                 220

Val Asn His Lys Pro Ser Asn Thr Lys Val Asp Lys Arg Val Glu Pro
225                 230                 235                 240

Lys Ser Cys Asp Lys Thr His Thr Cys Pro Pro Cys Pro Ala Pro Glu
                245                 250                 255

Leu Leu Gly Gly Pro Ser Val Phe Leu Phe Pro Pro Lys Pro Lys Asp
            260                 265                 270

Thr Leu Met Ile Ser Arg Thr Pro Glu Val Thr Cys Val Val Val Asp
        275                 280                 285

Val Ser His Glu Asp Pro Glu Val Lys Phe Asn Trp Tyr Val Asp Gly
    290                 295                 300

Val Glu Val His Asn Ala Lys Thr Lys Pro Arg Glu Glu Gln Tyr Asn
305                 310                 315                 320

Ser Thr Tyr Arg Val Val Ser Val Leu Thr Val Leu His Gln Asp Trp
                325                 330                 335

Leu Asn Gly Lys Glu Tyr Lys Cys Lys Val Ser Asn Lys Ala Leu Pro
            340                 345                 350

Ala Pro Ile Glu Lys Thr Ile Ser Lys Ala Lys Gly Gln Pro Arg Glu
        355                 360                 365

Pro Gln Val Tyr Thr Leu Pro Pro Ser Arg Glu Glu Met Thr Lys Asn
    370                 375                 380

Gln Val Ser Leu Thr Cys Leu Val Lys Gly Phe Tyr Pro Ser Asp Ile
385                 390                 395                 400

Ala Val Glu Trp Glu Ser Asn Gly Gln Pro Glu Asn Asn Tyr Lys Thr
                405                 410                 415
```

```
Thr Pro Pro Val Leu Asp Ser Asp Gly Ser Phe Phe Leu Tyr Ser Lys
            420                 425                 430

Leu Thr Val Asp Lys Ser Arg Trp Gln Gln Gly Asn Val Phe Ser Cys
        435                 440                 445

Ser Val Met His Glu Ala Leu His Asn His Tyr Thr Gln Lys Ser Leu
    450                 455                 460

Ser Leu Ser Pro Gly Lys
465             470

<210> SEQ ID NO 6
<211> LENGTH: 234
<212> TYPE: PRT
<213> ORGANISM: Artificial Sequence
<220> FEATURE:
<223> OTHER INFORMATION: Light chain of anti-TROP2 antibody

<400> SEQUENCE: 6

Met Val Leu Gln Thr Gln Val Phe Ile Ser Leu Leu Leu Trp Ile Ser
1               5                   10                  15

Gly Ala Tyr Gly Asp Ile Gln Met Thr Gln Ser Pro Ser Ser Leu Ser
            20                  25                  30

Ala Ser Val Gly Asp Arg Val Thr Ile Thr Cys Lys Ala Ser Gln Asp
        35                  40                  45

Val Ser Thr Ala Val Ala Trp Tyr Gln Gln Lys Pro Gly Lys Ala Pro
    50                  55                  60

Lys Leu Leu Ile Tyr Ser Ala Ser Tyr Arg Tyr Thr Gly Val Pro Ser
65                  70                  75                  80

Arg Phe Ser Gly Ser Gly Ser Gly Thr Asp Phe Thr Leu Thr Ile Ser
                85                  90                  95

Ser Leu Gln Pro Glu Asp Phe Ala Val Tyr Tyr Cys Gln Gln His Tyr
            100                 105                 110

Ile Thr Pro Leu Thr Phe Gly Gln Gly Thr Lys Leu Glu Ile Lys Arg
        115                 120                 125

Thr Val Ala Ala Pro Ser Val Phe Ile Phe Pro Pro Ser Asp Glu Gln
    130                 135                 140

Leu Lys Ser Gly Thr Ala Ser Val Val Cys Leu Leu Asn Asn Phe Tyr
145                 150                 155                 160

Pro Arg Glu Ala Lys Val Gln Trp Lys Val Asp Asn Ala Leu Gln Ser
                165                 170                 175

Gly Asn Ser Gln Glu Ser Val Thr Glu Gln Asp Ser Lys Asp Ser Thr
            180                 185                 190

Tyr Ser Leu Ser Ser Thr Leu Thr Leu Ser Lys Ala Asp Tyr Glu Lys
        195                 200                 205

His Lys Val Tyr Ala Cys Glu Val Thr His Gln Gly Leu Ser Ser Pro
    210                 215                 220

Val Thr Lys Ser Phe Asn Arg Gly Glu Cys
225                 230

<210> SEQ ID NO 7
<211> LENGTH: 471
<212> TYPE: PRT
<213> ORGANISM: Artificial Sequence
<220> FEATURE:
<223> OTHER INFORMATION: Heavy chain of anti-B7-H3 antibody

<400> SEQUENCE: 7

Met Lys His Leu Trp Phe Phe Leu Leu Leu Val Ala Ala Pro Arg Trp
```

```
1               5                   10                  15
Val Leu Ser Gln Val Gln Leu Val Gln Ser Gly Ala Glu Val Lys Lys
            20                  25                  30
Pro Gly Ser Ser Val Lys Val Ser Cys Lys Ala Ser Gly Tyr Thr Phe
            35                  40                  45
Thr Asn Tyr Val Met His Trp Val Arg Gln Ala Pro Gly Gln Gly Leu
            50                  55                  60
Glu Trp Met Gly Tyr Ile Asn Pro Tyr Asn Asp Asp Val Lys Tyr Asn
65                  70                  75                  80
Glu Lys Phe Lys Gly Arg Val Thr Ile Thr Ala Asp Glu Ser Thr Ser
                85                  90                  95
Thr Ala Tyr Met Glu Leu Ser Ser Leu Arg Ser Glu Asp Thr Ala Val
            100                 105                 110
Tyr Tyr Cys Ala Arg Trp Gly Tyr Tyr Gly Ser Pro Leu Tyr Tyr Phe
            115                 120                 125
Asp Tyr Trp Gly Gln Gly Thr Leu Val Thr Val Ser Ser Ala Ser Thr
            130                 135                 140
Lys Gly Pro Ser Val Phe Pro Leu Ala Pro Ser Ser Lys Ser Thr Ser
145                 150                 155                 160
Gly Gly Thr Ala Ala Leu Gly Cys Leu Val Lys Asp Tyr Phe Pro Glu
                165                 170                 175
Pro Val Thr Val Ser Trp Asn Ser Gly Ala Leu Thr Ser Gly Val His
                180                 185                 190
Thr Phe Pro Ala Val Leu Gln Ser Ser Gly Leu Tyr Ser Leu Ser Ser
            195                 200                 205
Val Val Thr Val Pro Ser Ser Ser Leu Gly Thr Gln Thr Tyr Ile Cys
            210                 215                 220
Asn Val Asn His Lys Pro Ser Asn Thr Lys Val Asp Lys Arg Val Glu
225                 230                 235                 240
Pro Lys Ser Cys Asp Lys Thr His Thr Cys Pro Pro Cys Pro Ala Pro
                245                 250                 255
Glu Leu Leu Gly Gly Pro Ser Val Phe Leu Phe Pro Pro Lys Pro Lys
            260                 265                 270
Asp Thr Leu Met Ile Ser Arg Thr Pro Glu Val Thr Cys Val Val Val
            275                 280                 285
Asp Val Ser His Glu Asp Pro Glu Val Lys Phe Asn Trp Tyr Val Asp
            290                 295                 300
Gly Val Glu Val His Asn Ala Lys Thr Lys Pro Arg Glu Glu Gln Tyr
305                 310                 315                 320
Asn Ser Thr Tyr Arg Val Val Ser Val Leu Thr Val Leu His Gln Asp
                325                 330                 335
Trp Leu Asn Gly Lys Glu Tyr Lys Cys Lys Val Ser Asn Lys Ala Leu
                340                 345                 350
Pro Ala Pro Ile Glu Lys Thr Ile Ser Lys Ala Lys Gly Gln Pro Arg
            355                 360                 365
Glu Pro Gln Val Tyr Thr Leu Pro Pro Ser Arg Glu Glu Met Thr Lys
            370                 375                 380
Asn Gln Val Ser Leu Thr Cys Leu Val Lys Gly Phe Tyr Pro Ser Asp
385                 390                 395                 400
Ile Ala Val Glu Trp Glu Ser Asn Gly Gln Pro Glu Asn Asn Tyr Lys
                405                 410                 415
Thr Thr Pro Pro Val Leu Asp Ser Asp Gly Ser Phe Phe Leu Tyr Ser
                420                 425                 430
```

```
Lys Leu Thr Val Asp Lys Ser Arg Trp Gln Gln Gly Asn Val Phe Ser
        435                 440                 445

Cys Ser Val Met His Glu Ala Leu His Asn His Tyr Thr Gln Lys Ser
        450                 455                 460

Leu Ser Leu Ser Pro Gly Lys
465                 470

<210> SEQ ID NO 8
<211> LENGTH: 233
<212> TYPE: PRT
<213> ORGANISM: Artificial Sequence
<220> FEATURE:
<223> OTHER INFORMATION: Light chain of anti-B7-H3 antibody

<400> SEQUENCE: 8

Met Val Leu Gln Thr Gln Val Phe Ile Ser Leu Leu Trp Ile Ser
1               5                   10                  15

Gly Ala Tyr Gly Glu Ile Val Leu Thr Gln Ser Pro Ala Thr Leu Ser
            20                  25                  30

Leu Ser Pro Gly Glu Arg Ala Thr Leu Ser Cys Arg Ala Ser Ser Arg
        35                  40                  45

Leu Ile Tyr Met His Trp Tyr Gln Gln Lys Pro Gly Gln Ala Pro Arg
    50                  55                  60

Pro Leu Ile Tyr Ala Thr Ser Asn Leu Ala Ser Gly Ile Pro Ala Arg
65                  70                  75                  80

Phe Ser Gly Ser Gly Ser Gly Thr Asp Phe Thr Leu Thr Ile Ser Ser
                85                  90                  95

Leu Glu Pro Glu Asp Phe Ala Val Tyr Tyr Cys Gln Gln Trp Asn Ser
            100                 105                 110

Asn Pro Pro Thr Phe Gly Gln Gly Thr Lys Val Glu Ile Lys Arg Thr
        115                 120                 125

Val Ala Ala Pro Ser Val Phe Ile Phe Pro Pro Ser Asp Glu Gln Leu
    130                 135                 140

Lys Ser Gly Thr Ala Ser Val Val Cys Leu Leu Asn Asn Phe Tyr Pro
145                 150                 155                 160

Arg Glu Ala Lys Val Gln Trp Lys Val Asp Asn Ala Leu Gln Ser Gly
                165                 170                 175

Asn Ser Gln Glu Ser Val Thr Glu Gln Asp Ser Lys Asp Ser Thr Tyr
            180                 185                 190

Ser Leu Ser Ser Thr Leu Thr Leu Ser Lys Ala Asp Tyr Glu Lys His
        195                 200                 205

Lys Val Tyr Ala Cys Glu Val Thr His Gln Gly Leu Ser Ser Pro Val
    210                 215                 220

Thr Lys Ser Phe Asn Arg Gly Glu Cys
225                 230

<210> SEQ ID NO 9
<211> LENGTH: 472
<212> TYPE: PRT
<213> ORGANISM: Artificial Sequence
<220> FEATURE:
<223> OTHER INFORMATION: Heavy chain of anti-GPR20 antibody

<400> SEQUENCE: 9

Met Lys His Leu Trp Phe Phe Leu Leu Leu Val Ala Ala Pro Arg Trp
1               5                   10                  15

Val Leu Ser Glu Val Gln Leu Val Gln Ser Gly Ala Glu Val Lys Lys
```

-continued

```
                20                  25                  30
Pro Gly Ala Ser Val Lys Val Ser Cys Lys Ala Ser Gly Tyr Thr Phe
            35                  40                  45
Thr Ser Tyr Tyr Ile Ser Trp Ile Arg Gln Ala Pro Gly Gln Gly Leu
        50                  55                  60
Lys Tyr Met Gly Phe Ile Asn Pro Gly Ser Gly His Thr Asn Tyr Asn
65                  70                  75                  80
Glu Lys Phe Lys Gly Arg Val Thr Ile Thr Ala Asp Lys Ser Ser Ser
                85                  90                  95
Thr Ala Thr Met Glu Leu Ser Ser Leu Arg Ser Glu Asp Thr Ala Val
            100                 105                 110
Tyr Tyr Cys Ala Arg Gly Ala Gly Gly Phe Leu Arg Ile Ile Thr Lys
        115                 120                 125
Phe Asp Tyr Trp Gly Gln Gly Thr Leu Val Thr Val Ser Ser Ala Ser
    130                 135                 140
Thr Lys Gly Pro Ser Val Phe Pro Leu Ala Pro Ser Ser Lys Ser Thr
145                 150                 155                 160
Ser Gly Gly Thr Ala Ala Leu Gly Cys Leu Val Lys Asp Tyr Phe Pro
                165                 170                 175
Glu Pro Val Thr Val Ser Trp Asn Ser Gly Ala Leu Thr Ser Gly Val
            180                 185                 190
His Thr Phe Pro Ala Val Leu Gln Ser Ser Gly Leu Tyr Ser Leu Ser
        195                 200                 205
Ser Val Val Thr Val Pro Ser Ser Ser Leu Gly Thr Gln Thr Tyr Ile
    210                 215                 220
Cys Asn Val Asn His Lys Pro Ser Asn Thr Lys Val Asp Lys Arg Val
225                 230                 235                 240
Glu Pro Lys Ser Cys Asp Lys Thr His Thr Cys Pro Pro Cys Pro Ala
                245                 250                 255
Pro Glu Leu Leu Gly Gly Pro Ser Val Phe Leu Phe Pro Pro Lys Pro
            260                 265                 270
Lys Asp Thr Leu Met Ile Ser Arg Thr Pro Glu Val Thr Cys Val Val
        275                 280                 285
Val Asp Val Ser His Glu Asp Pro Glu Val Lys Phe Asn Trp Tyr Val
    290                 295                 300
Asp Gly Val Glu Val His Asn Ala Lys Thr Lys Pro Arg Glu Glu Gln
305                 310                 315                 320
Tyr Asn Ser Thr Tyr Arg Val Val Ser Val Leu Thr Val Leu His Gln
                325                 330                 335
Asp Trp Leu Asn Gly Lys Glu Tyr Lys Cys Lys Val Ser Asn Lys Ala
            340                 345                 350
Leu Pro Ala Pro Ile Glu Lys Thr Ile Ser Lys Ala Lys Gly Gln Pro
        355                 360                 365
Arg Glu Pro Gln Val Tyr Thr Leu Pro Pro Ser Arg Glu Glu Met Thr
    370                 375                 380
Lys Asn Gln Val Ser Leu Thr Cys Leu Val Lys Gly Phe Tyr Pro Ser
385                 390                 395                 400
Asp Ile Ala Val Glu Trp Glu Ser Asn Gly Gln Pro Glu Asn Asn Tyr
                405                 410                 415
Lys Thr Thr Pro Pro Val Leu Asp Ser Asp Gly Ser Phe Phe Leu Tyr
            420                 425                 430
Ser Lys Leu Thr Val Asp Lys Ser Arg Trp Gln Gln Gly Asn Val Phe
        435                 440                 445
```

```
Ser Cys Ser Val Met His Glu Ala Leu His Asn His Tyr Thr Gln Lys
    450                 455                 460

Ser Leu Ser Leu Ser Pro Gly Lys
465                 470

<210> SEQ ID NO 10
<211> LENGTH: 234
<212> TYPE: PRT
<213> ORGANISM: Artificial Sequence
<220> FEATURE:
<223> OTHER INFORMATION: Light chain of anti-GPR20 antibody

<400> SEQUENCE: 10

Met Val Leu Gln Thr Gln Val Phe Ile Ser Leu Leu Trp Ile Ser
1               5                   10                  15

Gly Ala Tyr Gly Asp Thr Gln Leu Thr Gln Ser Pro Ser Ser Leu Ser
            20                  25                  30

Ala Ser Val Gly Asp Arg Val Thr Ile Thr Cys Arg Ala Ser Lys Ser
        35                  40                  45

Val Ser Thr Tyr Ile His Trp Tyr Gln Gln Lys Pro Gly Lys Gln Pro
    50                  55                  60

Lys Leu Leu Ile Tyr Ser Ala Gly Asn Leu Glu Ser Gly Val Pro Ser
65                  70                  75                  80

Arg Phe Ser Gly Ser Gly Ser Gly Thr Asp Phe Thr Leu Thr Ile Ser
                85                  90                  95

Ser Leu Gln Pro Glu Asp Phe Ala Asn Tyr Tyr Cys Gln Gln Ile Asn
            100                 105                 110

Glu Leu Pro Tyr Thr Phe Gly Gln Gly Thr Lys Val Glu Ile Lys Arg
        115                 120                 125

Thr Val Ala Ala Pro Ser Val Phe Ile Phe Pro Pro Ser Asp Glu Gln
    130                 135                 140

Leu Lys Ser Gly Thr Ala Ser Val Val Cys Leu Leu Asn Asn Phe Tyr
145                 150                 155                 160

Pro Arg Glu Ala Lys Val Gln Trp Lys Val Asp Asn Ala Leu Gln Ser
                165                 170                 175

Gly Asn Ser Gln Glu Ser Val Thr Glu Gln Asp Ser Lys Asp Ser Thr
            180                 185                 190

Tyr Ser Leu Ser Ser Thr Leu Thr Leu Ser Lys Ala Asp Tyr Glu Lys
        195                 200                 205

His Lys Val Tyr Ala Cys Glu Val Thr His Gln Gly Leu Ser Ser Pro
    210                 215                 220

Val Thr Lys Ser Phe Asn Arg Gly Glu Cys
225                 230

<210> SEQ ID NO 11
<211> LENGTH: 471
<212> TYPE: PRT
<213> ORGANISM: Artificial Sequence
<220> FEATURE:
<223> OTHER INFORMATION: Heavy chain of anti-CDH6 antibody

<400> SEQUENCE: 11

Met Lys His Leu Trp Phe Phe Leu Leu Leu Val Ala Ala Pro Arg Trp
1               5                   10                  15

Val Leu Ser Glu Val Gln Leu Val Gln Ser Gly Ala Glu Val Lys Lys
            20                  25                  30

Pro Gly Ala Ser Val Lys Val Ser Cys Lys Ala Ser Gly Tyr Thr Phe
```

```
                35                  40                  45
Thr Arg Asn Phe Met His Trp Val Arg Gln Ala Pro Gly Gln Gly Leu
 50                  55                  60
Glu Trp Met Gly Trp Ile Tyr Pro Gly Asp Gly Thr Glu Tyr Ala
 65                  70                  75                  80
Gln Lys Phe Gln Gly Arg Val Thr Ile Thr Ala Asp Thr Ser Thr Ser
                 85                  90                  95
Thr Ala Tyr Met Glu Leu Ser Ser Leu Arg Ser Glu Asp Thr Ala Val
                100                 105                 110
Tyr Tyr Cys Ala Arg Gly Val Tyr Gly Gly Phe Ala Gly Tyr Phe
                115                 120                 125
Asp Phe Trp Gly Gln Gly Thr Leu Val Thr Val Ser Ser Ala Ser Thr
            130                 135                 140
Lys Gly Pro Ser Val Phe Pro Leu Ala Pro Ser Ser Lys Ser Thr Ser
145                 150                 155                 160
Gly Gly Thr Ala Ala Leu Gly Cys Leu Val Lys Asp Tyr Phe Pro Glu
                165                 170                 175
Pro Val Thr Val Ser Trp Asn Ser Gly Ala Leu Thr Ser Gly Val His
            180                 185                 190
Thr Phe Pro Ala Val Leu Gln Ser Ser Gly Leu Tyr Ser Leu Ser Ser
            195                 200                 205
Val Val Thr Val Pro Ser Ser Ser Leu Gly Thr Gln Thr Tyr Ile Cys
        210                 215                 220
Asn Val Asn His Lys Pro Ser Asn Thr Lys Val Asp Lys Arg Val Glu
225                 230                 235                 240
Pro Lys Ser Cys Asp Lys Thr His Thr Cys Pro Pro Cys Pro Ala Pro
                245                 250                 255
Glu Leu Leu Gly Gly Pro Ser Val Phe Leu Phe Pro Pro Lys Pro Lys
                260                 265                 270
Asp Thr Leu Met Ile Ser Arg Thr Pro Glu Val Thr Cys Val Val Val
            275                 280                 285
Asp Val Ser His Glu Asp Pro Glu Val Lys Phe Asn Trp Tyr Val Asp
        290                 295                 300
Gly Val Glu Val His Asn Ala Lys Thr Lys Pro Arg Glu Glu Gln Tyr
305                 310                 315                 320
Asn Ser Thr Tyr Arg Val Val Ser Val Leu Thr Val Leu His Gln Asp
                325                 330                 335
Trp Leu Asn Gly Lys Glu Tyr Lys Cys Lys Val Ser Asn Lys Ala Leu
            340                 345                 350
Pro Ala Pro Ile Glu Lys Thr Ile Ser Lys Ala Lys Gly Gln Pro Arg
            355                 360                 365
Glu Pro Gln Val Tyr Thr Leu Pro Pro Ser Arg Glu Glu Met Thr Lys
        370                 375                 380
Asn Gln Val Ser Leu Thr Cys Leu Val Lys Gly Phe Tyr Pro Ser Asp
385                 390                 395                 400
Ile Ala Val Glu Trp Glu Ser Asn Gly Gln Pro Glu Asn Asn Tyr Lys
                405                 410                 415
Thr Thr Pro Pro Val Leu Asp Ser Asp Gly Ser Phe Phe Leu Tyr Ser
            420                 425                 430
Lys Leu Thr Val Asp Lys Ser Arg Trp Gln Gln Gly Asn Val Phe Ser
            435                 440                 445
Cys Ser Val Met His Glu Ala Leu His Asn His Tyr Thr Gln Lys Ser
450                 455                 460
```

```
<210> SEQ ID NO 12
<211> LENGTH: 233
<212> TYPE: PRT
<213> ORGANISM: Artificial Sequence
<220> FEATURE:
<223> OTHER INFORMATION: Light chain of anti-CDH6 antibody

<400> SEQUENCE: 12

Met Val Leu Gln Thr Gln Val Phe Ile Ser Leu Leu Trp Ile Ser
1               5                   10                  15

Gly Ala Tyr Gly Asp Ile Gln Met Thr Gln Ser Pro Ser Ser Leu Ser
                20                  25                  30

Ala Ser Val Gly Asp Arg Val Thr Ile Thr Cys Lys Ala Ser Gln Asn
            35                  40                  45

Ile Tyr Lys Asn Leu Ala Trp Tyr Gln Gln Lys Pro Gly Lys Ala Pro
        50                  55                  60

Lys Leu Leu Ile Tyr Asp Ala Asn Thr Leu Gln Thr Gly Val Pro Ser
65                  70                  75                  80

Arg Phe Ser Gly Ser Gly Ser Gly Ser Asp Phe Thr Leu Thr Ile Ser
                85                  90                  95

Ser Leu Gln Pro Glu Asp Phe Ala Thr Tyr Phe Cys Gln Gln Tyr Tyr
            100                 105                 110

Ser Gly Trp Ala Phe Gly Gln Gly Thr Lys Val Glu Ile Lys Arg Thr
        115                 120                 125

Val Ala Ala Pro Ser Val Phe Ile Phe Pro Pro Ser Asp Glu Gln Leu
    130                 135                 140

Lys Ser Gly Thr Ala Ser Val Val Cys Leu Leu Asn Asn Phe Tyr Pro
145                 150                 155                 160

Arg Glu Ala Lys Val Gln Trp Lys Val Asp Asn Ala Leu Gln Ser Gly
                165                 170                 175

Asn Ser Gln Glu Ser Val Thr Glu Gln Asp Ser Lys Asp Ser Thr Tyr
            180                 185                 190

Ser Leu Ser Ser Thr Leu Thr Leu Ser Lys Ala Asp Tyr Glu Lys His
        195                 200                 205

Lys Val Tyr Ala Cys Glu Val Thr His Gln Gly Leu Ser Ser Pro Val
    210                 215                 220

Thr Lys Ser Phe Asn Arg Gly Glu Cys
225                 230
```

COMBINATION OF ANTIBODY-DRUG CONJUGATE AND TUBULIN INHIBITOR

CROSS-REFERENCE TO RELATED APPLICATIONS

The present application claims priority under 37 U.S.C. § 371 to International Patent Application No. PCT/JP2019/030635, filed Aug. 5, 2019, which claims priority to and the benefit of Japanese Patent Application No. 2018-147582, filed on Aug. 6, 2018. The contents of these applications are hereby incorporated by reference in their entireties.

SEQUENCE LISTING

The instant application contains a Sequence Listing which has been submitted in ASCII format via EFS-Web and is hereby incorporated by reference in its entirety. Said ASCII copy, is named 122622-0136_SL.txt and is 37 kb in size.

TECHNICAL FIELD

The present invention relates to a pharmaceutical composition wherein a specific antibody-drug conjugate and a tubulin inhibitor are administered in combination, and/or a method of treatment wherein a specific antibody-drug conjugate and a tubulin inhibitor are administered in combination to a subject.

BACKGROUND ART

Tubulin inhibitors are drugs that affect microtubule dynamics, and thus arrest cell division at the $G_2$ phase (pre-mitotic gap phase) and/or M phase (mitotic phase) of the cell cycle and induce cell death by apoptosis, thereby suppressing growth of cancer cells (Non-Patent References 1, 2).

Tubulin inhibitors include agents that promote tubulin polymerization, thereby affecting microtubule dynamics (tubulin polymerization accelerator); and agents that inhibit tubulin polymerization, thereby affecting microtubule dynamics (tubulin polymerization inhibiitor).

Known tubulin polymerization accelerators include paclitaxel, docetaxel, and cabazitaxel. Meanwhile, known tubulin polymerization inhibitors include eribulin; vincristine; vinblastine; vinorelbine; vindesine; brentuximab vedotin, which is an antibody-drug conjugate containing monomethyl auristatin E (MMAE) as a component; and trastuzumab emtansine, which is an antibody-drug conjugate containing DM1 as a component.

An antibody-drug conjugate (ADC) having a drug with cytotoxicity conjugated to an antibody capable of binding to an antigen expressed on the surface of cancer cells and cellular internalization, can deliver the drug selectively to cancer cells and can thus be expected to cause accumulation of the drug within cancer cells and to kill the cancer cells (Non-Patent References 3 to 7).

As one such antibody-drug conjugate, an antibody-drug conjugate comprising an antibody and a derivative of exatecan, which is a topoisomerase I inhibitor, as its components is known (Patent References 1 to 7, Non-Patent References 8 to 11).

Furthermore, Patent References 1 to 7 disclose that the foregoing antibody-drug conjugate can be administered with a variety of cancer therapeutic agents.

However, none of the references describes any test result showing an excellent combined effect when the foregoing antibody-drug conjugate and a tubulin inhibitor are used in combination, or any scientific basis for suggesting such a test result.

CITATION LIST

Patent Literature

Patent Reference 1: International Publication No. WO 2014/057687
Patent Reference 2: International Publication No. WO 2014/061277
Patent Reference 3: International Publication No. WO 2015/098099
Patent Reference 4: International Publication No. WO 2015/115091
Patent Reference 5: International Publication No. WO 2015/146132
Patent Reference 6: International Publication No. WO 2015/155976
Patent Reference 7: International Publication No. WO 2015/155998

Non-Patent Literature

Non-Patent Reference 1: Dumontet C, et al., Nat Rev Drug Discov. 2010 October; 9 (10): 790-803.
Non-Patent Reference 2: Mukhtar E, et al., Mol Cancer Ther. 2014 February: 13(2): 275-284.
Non-Patent Reference 3: Ducry, L., et al., Bioconjugate Chem. (2010) 21, 5-13.
Non-Patent Reference 4: Alley, S. C., et al., Current Opinion in Chemical Biology (2010) 14, 529-537.
Non-Patent Reference 5: Damle N. K. Expert Opin. Biol. Ther. (2004) 4, 1445-1452.
Non-Patent Reference 6: Senter P. D., et al., Nature Biotechnology (2012) 30, 631-637.
Non-Patent Reference 7: Howard A. et al., J Clin Oncol 29: 398-405.
Non-Patent Reference 8: Ogitani Y. et al., Clinical Cancer Research (2016) 22 (20), 5097-5108.
Non-Patent Reference 9: Ogitani Y. et al., Cancer Science (2016) 107, 1039-1046.
Non-Patent Reference 10: Doi T, et al., Lancet Oncol 2017; 18: 1512-22.
Non-Patent Reference 11: Takegawa N, et al., Int. J. Cancer: 141, 1682-1689 (2017)

SUMMARY OF INVENTION

Technical Problem

The antibody-drug conjugates used in the present invention (antibody-drug conjugates containing an exatecan derivative as a component) have been confirmed to exert a superior antitumor effect even as a single agent. However, there has been a need for obtaining a method of treatment which can suppress growth of cancer cells in multiple manners and exert a further superior antitumor effect by using the antibody-drug conjugate in combination with another anticancer agent having a different mechanism of action.

An object of the present invention is to provide a pharmaceutical composition wherein a specific antibody-drug conjugate and a tubulin inhibitor are administered in combination, and/or a method of treatment wherein a specific antibody-drug conjugate and a tubulin inhibitor are administrated in combination to a subject.

Solution to Problem

As a result of diligent studies in order to solve the above problems, the present inventors have found that combined administration of a specific antibody-drug conjugate and a tubulin inhibitor exhibits a superior combined effect, and thereby completed the present invention.

Thus, the present invention provides the following [1] to [344].

[1] A pharmaceutical composition, wherein an antibody-drug conjugate and a tubulin inhibitor are administered in combination, and the antibody-drug conjugate is an antibody-drug conjugate in which a drug-linker represented by the following formula:

[Formula 1]

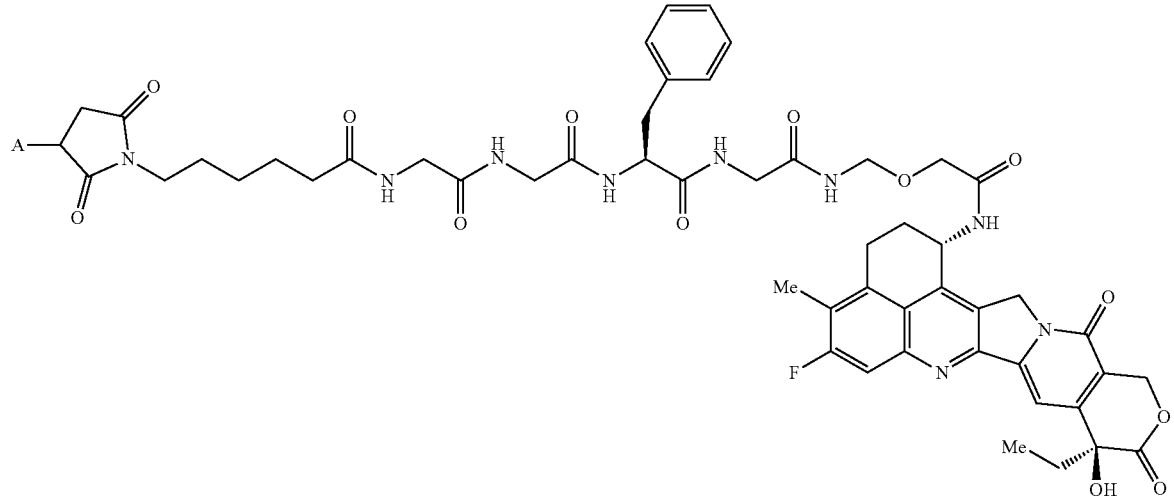

wherein A represents a connecting position to an antibody, is conjugated to the antibody via a thioether bond.

[2] The pharmaceutical composition according to [1], wherein the antibody in the antibody-drug conjugate is an anti-HER2 antibody, an anti-HER3 antibody, an anti-TROP2 antibody, an anti-B7-H3 antibody, an anti-GPR20 antibody, or an anti-CDH6 antibody.

[3] The pharmaceutical composition according to [2], wherein the antibody in the antibody-drug conjugate is an anti-HER2 antibody.

[4] The pharmaceutical composition according to [3], wherein the anti-HER2 antibody is an antibody comprising a heavy chain consisting of an amino acid sequence consisting of amino acid residues 1 to 449 of SEQ ID NO: 1 and a light chain consisting of an amino acid sequence consisting of amino acid residues 1 to 214 of SEQ ID NO: 2.

[5] The pharmaceutical composition according to [3], wherein the anti-HER2 antibody is an antibody comprising a heavy chain consisting of an amino acid sequence represented by SEQ ID NO: 1 and a light chain consisting of an amino acid sequence represented by SEQ ID NO: 2.

[6] The pharmaceutical composition according to any one of [3] to [5], wherein the average number of units of the drug-linker conjugated per antibody molecule in the antibody-drug conjugate is in the range of from 7 to 8.

[7] The pharmaceutical composition according to [2], wherein the antibody in the antibody-drug conjugate is an anti-HER3 antibody.

[8] The pharmaceutical composition according to [7], wherein the anti-HER3 antibody is an antibody comprising a heavy chain consisting of an amino acid sequence represented by SEQ ID NO: 3 and a light chain consisting of an amino acid sequence represented by SEQ ID NO: 4.

[9] The pharmaceutical composition according to [8], wherein the anti-HER3 antibody lacks a lysine residue at the carboxyl terminus of the heavy chain.

[10] The pharmaceutical composition according to any one of [7] to [9], wherein the average number of units of the drug-linker conjugated per antibody molecule in the antibody-drug conjugate is in the range of from 7 to 8.

[11] The pharmaceutical composition according to [2], wherein the antibody in the antibody-drug conjugate is an anti-TROP2 antibody.

[12] The pharmaceutical composition according to [11], wherein the anti-TROP2 antibody is an antibody comprising a heavy chain consisting of an amino acid sequence consisting of amino acid residues 20 to 470 of SEQ ID NO: 5 and a light chain consisting of an amino acid sequence consisting of amino acid residues 21 to 234 of SEQ ID NO: 6.

[13] The pharmaceutical composition according to [12], wherein the anti-TROP2 antibody lacks a lysine residue at the carboxyl terminus of the heavy chain.

[14] The pharmaceutical composition according to any one of [11] to [13], wherein the average number of units of the drug-linker conjugated per antibody molecule in the antibody-drug conjugate is in the range of from 3.5 to 4.5.

[15] The pharmaceutical composition according to [2], wherein the antibody in the antibody-drug conjugate is an anti-B7-H3 antibody.

[16] The pharmaceutical composition according to [15], wherein the anti-B7-H3 antibody is an antibody comprising a heavy chain consisting of an amino acid sequence consisting of amino acid residues 20 to 471 of SEQ ID NO: 7 and a light chain consisting of an amino acid sequence consisting of amino acid residues 21 to 233 of SEQ ID NO: 8.

[17] The pharmaceutical composition according to [16], wherein the anti-B7-H3 antibody lacks a lysine residue at the carboxyl terminus of the heavy chain.

[18] The pharmaceutical composition according to any one of [15] to [17], wherein the average number of units of the drug-linker conjugated per antibody molecule in the antibody-drug conjugate is in the range of from 3.5 to 4.5.

[19] The pharmaceutical composition according to [2], wherein the antibody in the antibody-drug conjugate is an anti-GPR20 antibody.

[20] The pharmaceutical composition according to [19], wherein the anti-GPR20 antibody is an antibody comprising a heavy chain consisting of an amino acid sequence consisting of amino acid residues 20 to 472 of SEQ ID NO: 9 and a light chain consisting of an amino acid sequence consisting of amino acid residues 21 to 234 of SEQ ID NO: 10.

[21] The pharmaceutical composition according to [20], wherein the anti-GPR20 antibody lacks a lysine residue at the carboxyl terminus of the heavy chain.

[22] The pharmaceutical composition according to any one of [19] to [21], wherein the average number of units of the drug-linker conjugated per antibody molecule in the antibody-drug conjugate is in the range of from 7 to 8.

[23] The pharmaceutical composition according to [2], wherein the antibody in the antibody-drug conjugate is an anti-CDH6 antibody.

[24] The pharmaceutical composition according to [23], wherein the anti-CDH6 antibody is an antibody comprising a heavy chain consisting of an amino acid sequence consisting of amino acid residues 20 to 471 of SEQ ID NO: 11 and a light chain consisting of an amino acid sequence consisting of amino acid residues 21 to 233 of SEQ ID NO: 12.

[25] The pharmaceutical composition according to [24], wherein the anti-CDH6 antibody lacks a lysine residue at the carboxyl terminus of the heavy chain.

[26] The pharmaceutical composition according to any one of [23] to [25], wherein the average number of units of the drug-linker conjugated per antibody molecule in the antibody-drug conjugate is in the range of from 7 to 8.

[27] The pharmaceutical composition according to any one of [1] to [26], wherein the tubulin inhibitor is paclitaxel, docetaxel, cabazitaxel, or a pharmacologically acceptable salt thereof, or nab-paclitaxel.

[28] The pharmaceutical composition according to [27], wherein the tubulin inhibitor is paclitaxel.

[29] The pharmaceutical composition according to any one of [1] to [26], wherein the tubulin inhibitor is eribulin or a pharmacologically acceptable salt thereof, or an antibody-drug conjugate in which eribulin is conjugated to the antibody via a linker.

[30] The pharmaceutical composition according to [29], wherein the tubulin inhibitor is eribulin mesylate.

[31] The pharmaceutical composition according to any one of [1] to [30], wherein the antibody-drug conjugate and the tubulin inhibitor are separately contained as active components in different formulations, and are administered simultaneously or at different times.

[32] The pharmaceutical composition according to any one of [1] to [31], wherein the pharmaceutical composition is for use in treating at least one selected from the group consisting of breast cancer, gastric cancer, colorectal cancer, lung cancer, esophageal cancer, salivary gland cancer, esophagogastric junction adenocarcinoma, biliary tract cancer, Paget's disease, pancreatic cancer, ovarian cancer, bladder cancer, prostate cancer, and uterine carcinosarcoma.

[33] The pharmaceutical composition according to [32], wherein the pharmaceutical composition is for use in treating breast cancer.

[34] The pharmaceutical composition according to [32], wherein the pharmaceutical composition is for use in treating gastric cancer.

[35] The pharmaceutical composition according to [32], wherein the pharmaceutical composition is for use in treating lung cancer.

[36] The pharmaceutical composition according to [32], wherein the pharmaceutical composition is for use in treating ovarian cancer.

[37] The pharmaceutical composition according to any one of [1] to [36], wherein the tubulin inhibitor suppresses decreased expression of a drug sensitivity factor caused by the administration of the antibody-drug conjugate.

[38] The pharmaceutical composition according to [37], wherein the drug sensitivity factor is SLFN11.

[39] The pharmaceutical composition according to any one of [1] to [36], wherein the tubulin inhibitor suppresses increased expression of a drug resistance factor caused by the administration of the antibody-drug conjugate.

[40] The pharmaceutical composition according to [39], wherein the drug resistance factor is ABCG2.

[41] A pharmaceutical composition, wherein an antibody-drug conjugate and a tubulin inhibitor are administered in combination, and the antibody-drug conjugate is an antibody-drug conjugate represented by the following formula:

[Formula 2]

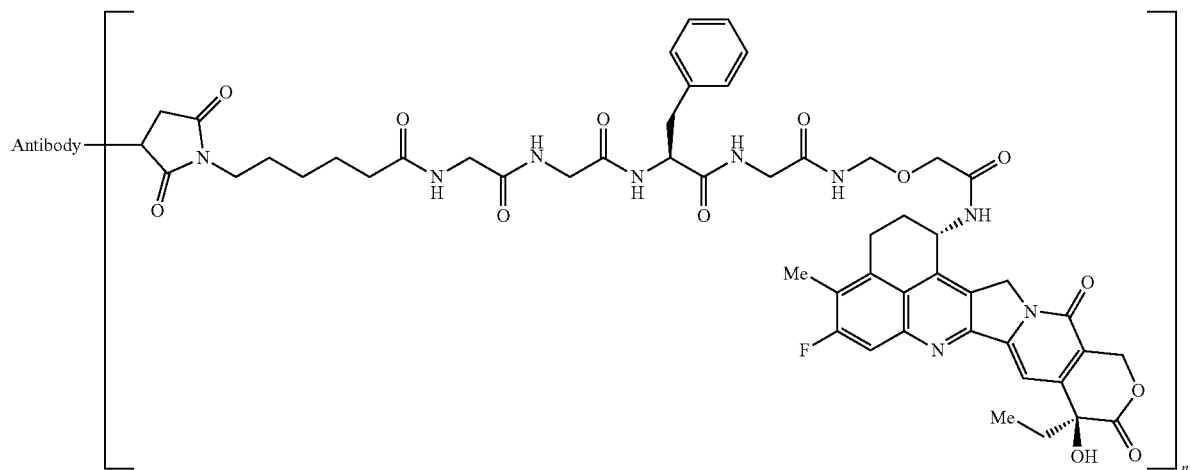

wherein the drug-linker is conjugated to the antibody via a thioether bond, and n is the average number of units of the drug-linker conjugated per antibody molecule.

[42] The pharmaceutical composition according to [41], wherein the antibody in the antibody-drug conjugate is an anti-HER2 antibody, an anti-HER3 antibody, an anti-TROP2 antibody, an anti-B7-H3 antibody, an anti-GPR20 antibody, or an anti-CDH6 antibody.

[43] The pharmaceutical composition according to [42], wherein the antibody in the antibody-drug conjugate is an anti-HER2 antibody.

[44] The pharmaceutical composition according to [43], wherein the anti-HER2 antibody is an antibody comprising a heavy chain consisting of an amino acid sequence consisting of amino acid residues 1 to 449 of SEQ ID NO: 1 and a light chain consisting of an amino acid sequence consisting of amino acid residues 1 to 214 of SEQ ID NO: 2.

[45] The pharmaceutical composition according to [43], wherein the anti-HER2 antibody is an antibody comprising a heavy chain consisting of an amino acid sequence represented by SEQ ID NO: 1 and a light chain consisting of an amino acid sequence represented by SEQ ID NO: 2.

[46] The pharmaceutical composition according to any one of [43] to [45], wherein the average number of units of the drug-linker conjugated per antibody molecule in the antibody-drug conjugate is in the range of from 7 to 8.

[47] The pharmaceutical composition according to [42], wherein the antibody in the antibody-drug conjugate is an anti-HER3 antibody.

[48] The pharmaceutical composition according to [47], wherein the anti-HER3 antibody is an antibody comprising a heavy chain consisting of an amino acid sequence represented by SEQ ID NO: 3 and a light chain consisting of an amino acid sequence represented by SEQ ID NO: 4.

[49] The pharmaceutical composition according to [48], wherein the anti-HER3 antibody lacks a lysine residue at the carboxyl terminus of the heavy chain.

[50] The pharmaceutical composition according to any one of [47] to [49], wherein the average number of units of the drug-linker conjugated per antibody molecule in the antibody-drug conjugate is in the range of from 7 to 8.

[51] The pharmaceutical composition according to [42], wherein the antibody in the antibody-drug conjugate is an anti-TROP2 antibody.

[52] The pharmaceutical composition according to [51], wherein the anti-TROP2 antibody is an antibody comprising a heavy chain consisting of an amino acid sequence consisting of amino acid residues 20 to 470 of SEQ ID NO: 5 and a light chain consisting of an amino acid sequence consisting of amino acid residues 21 to 234 of SEQ ID NO: 6.

[53] The pharmaceutical composition according to [52], wherein the anti-TROP2 antibody lacks a lysine residue at the carboxyl terminus of the heavy chain.

[54] The pharmaceutical composition according to any one of [51] to [53], wherein the average number of units of the drug-linker conjugated per antibody molecule in the antibody-drug conjugate is in the range of from 3.5 to 4.5.

[55] The pharmaceutical composition according to [42], wherein the antibody in the antibody-drug conjugate is an anti-B7-H3 antibody.

[56] The pharmaceutical composition according to [55], wherein the anti-B7-H3 antibody is an antibody comprising a heavy chain consisting of an amino acid sequence consisting of amino acid residues 20 to 471 of SEQ ID NO: 7 and a light chain consisting of an amino acid sequence consisting of amino acid residues 21 to 233 of SEQ ID NO: 8.

[57] The pharmaceutical composition according to [56], wherein the anti-B7-H3 antibody lacks a lysine residue at the carboxyl terminus of the heavy chain.

[58] The pharmaceutical composition according to any one of [55] to [57], wherein the average number of units of the drug-linker conjugated per antibody molecule in the antibody-drug conjugate is in the range of from 3.5 to 4.5.

[59] The pharmaceutical composition according to [42], wherein the antibody in the antibody-drug conjugate is an anti-GPR20 antibody.

[60] The pharmaceutical composition according to [59], wherein the anti-GPR20 antibody is an antibody comprising a heavy chain consisting of an amino acid sequence consisting of amino acid residues 20 to 472 of SEQ ID NO: 9 and a light chain consisting of an amino acid sequence consisting of amino acid residues 21 to 234 of SEQ ID NO: 10.

[61] The pharmaceutical composition according to [60], wherein the anti-GPR20 antibody lacks a lysine residue at the carboxyl terminus of the heavy chain.

[62] The pharmaceutical composition according to any one of [59] to [61], wherein the average number of units of the drug-linker conjugated per antibody molecule in the antibody-drug conjugate is in the range of from 7 to 8.

[63] The pharmaceutical composition according to [42], wherein the antibody in the antibody-drug conjugate is an anti-CDH6 antibody.

[64] The pharmaceutical composition according to [63], wherein the anti-CDH6 antibody is an antibody comprising a heavy chain consisting of an amino acid sequence consisting of amino acid residues 20 to 471 of SEQ ID NO: 11 and a light chain consisting of an amino acid sequence consisting of amino acid residues 21 to 233 of SEQ ID NO: 12.

[65] The pharmaceutical composition according to [64], wherein the anti-CDH6 antibody lacks a lysine residue at the carboxyl terminus of the heavy chain.

[66] The pharmaceutical composition according to any one of [63] to [65], wherein the average number of units of the drug-linker conjugated per antibody molecule in the antibody-drug conjugate is in the range of from 7 to 8.

[67] The pharmaceutical composition according to any one of [41] to [66], wherein the tubulin inhibitor is paclitaxel, docetaxel, cabazitaxel, or a pharmacologically acceptable salt thereof, or nab-paclitaxel.

[68] The pharmaceutical composition according to [67], wherein the tubulin inhibitor is paclitaxel.

[69] The pharmaceutical composition according to any one of [41] to [66], wherein the tubulin inhibitor is eribulin or a pharmacologically acceptable salt thereof, or an antibody-drug conjugate in which eribulin is conjugated to the antibody via a linker.

[70] The pharmaceutical composition according to [69], wherein the tubulin inhibitor is eribulin mesylate.

[71] The pharmaceutical composition according to any one of [41] to [70], wherein the antibody-drug conjugate and the tubulin inhibitor are separately contained as active components in different formulations, and are administered simultaneously or at different times.

[72] The pharmaceutical composition according to any one of [41] to [71], wherein the pharmaceutical composition is for use in treating at least one selected from the group consisting of breast cancer, gastric cancer, colorectal cancer, lung cancer, esophageal cancer, salivary gland cancer, esophagogastric junction adenocarcinoma, biliary tract cancer, Paget's disease, pancreatic cancer, ovarian cancer, bladder cancer, prostate cancer, and uterine carcinosarcoma.

[73] The pharmaceutical composition according to [72], wherein the pharmaceutical composition is for use in treating breast cancer.

[74] The pharmaceutical composition according to [72], wherein the pharmaceutical composition is for use in treating gastric cancer.

[75] The pharmaceutical composition according to [72], wherein the pharmaceutical composition is for use in treating lung cancer.

[76] The pharmaceutical composition according to [72], wherein the pharmaceutical composition is for use in treating ovarian cancer.

[77] The pharmaceutical composition according to any one of [41] to [76], wherein the tubulin inhibitor suppresses decreased expression of a drug sensitivity factor caused by the administration of the antibody-drug conjugate.

[78] The pharmaceutical composition according to [77], wherein the drug sensitivity factor is SLFN11.

[79] The pharmaceutical composition according to any one of [41] to [76], wherein the tubulin inhibitor suppresses increased expression of a drug resistance factor caused by the administration of the antibody-drug conjugate.

[80] The pharmaceutical composition according to [79], wherein the drug resistance factor is ABCG2.

[81] A method of treatment, comprising administering an antibody-drug conjugate and a tubulin inhibitor in combination to a subject in need of treatment, wherein the antibody-drug conjugate is an antibody-drug conjugate in which a drug-linker represented by the following formula:

[Formula 3]

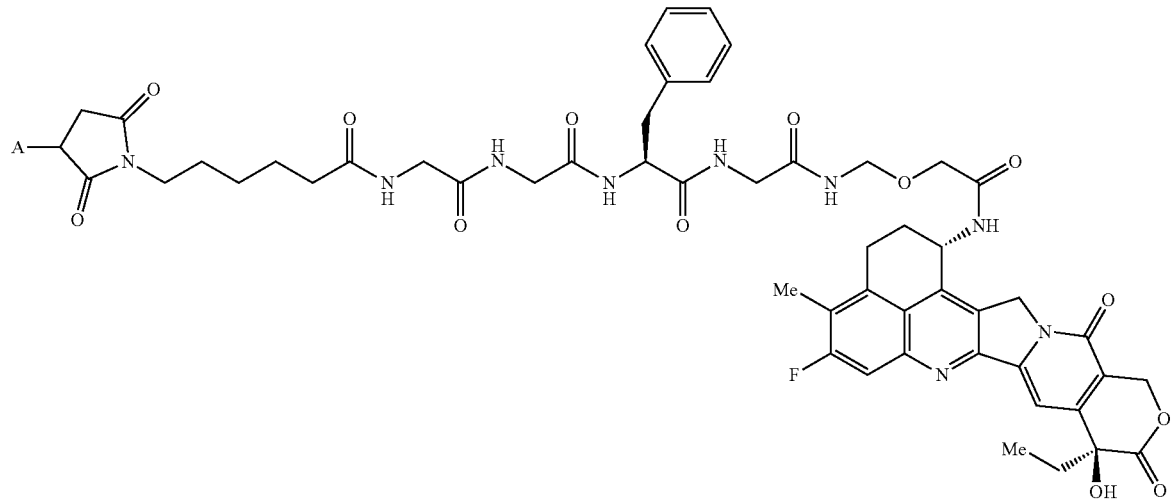

wherein A represents a connecting position to an antibody, is conjugated to the antibody via a thioether bond.

[82] The method of treatment according to [81], wherein the antibody in the antibody-drug conjugate is an anti-HER2 antibody, an anti-HER3 antibody, an anti-TROP2 antibody, an anti-B7-H3 antibody, an anti-GPR20 antibody, or an anti-CDH6 antibody.

[83] The method of treatment according to [82], wherein the antibody in the antibody-drug conjugate is an anti-HER2 antibody.

[84] The method of treatment according to [83], wherein the anti-HER2 antibody is an antibody comprising a heavy chain consisting of an amino acid sequence consisting of amino acid residues 1 to 449 of SEQ ID NO: 1 and a light chain consisting of an amino acid sequence consisting of amino acid residues 1 to 214 of SEQ ID NO: 2.

[85] The method of treatment according to [83], wherein the anti-HER2 antibody is an antibody comprising a heavy chain consisting of an amino acid sequence represented by SEQ ID NO: 1 and a light chain consisting of an amino acid sequence represented by SEQ ID NO: 2.

[86] The method of treatment according to any one of [83] to [85], wherein the average number of units of the drug-linker conjugated per antibody molecule in the antibody-drug conjugate is in the range of from 7 to 8.

[87] The method of treatment according to [82], wherein the antibody in the antibody-drug conjugate is an anti-HER3 antibody.

[88] The method of treatment according to [87], wherein the anti-HER3 antibody is an antibody comprising a heavy chain consisting of an amino acid sequence represented by SEQ ID NO: 3 and a light chain consisting of an amino acid sequence represented by SEQ ID NO: 4.

[89] The method of treatment according to [88], wherein the anti-HER3 antibody lacks a lysine residue at the carboxyl terminus of the heavy chain.

[90] The method of treatment according to any one of [87] to [89], wherein the average number of units of the drug-linker conjugated per antibody molecule in the antibody-drug conjugate is in the range of from 7 to 8.

[91] The method of treatment according to [82], wherein the antibody in the antibody-drug conjugate is an anti-TROP2 antibody.

[92] The method of treatment according to [91], wherein the anti-TROP2 antibody is an antibody comprising a heavy chain consisting of an amino acid sequence consisting of amino acid residues 20 to 470 of SEQ ID NO: 5 and a light chain consisting of an amino acid sequence consisting of amino acid residues 21 to 234 of SEQ ID NO: 6.

[93] The method of treatment according to [92], wherein the anti-TROP2 antibody lacks a lysine residue at the carboxyl terminus of the heavy chain.

[94] The method of treatment according to any one of [91] to [93], wherein the average number of units of the drug-linker conjugated per antibody molecule in the antibody-drug conjugate is in the range of from 3.5 to 4.5.

[95] The method of treatment according to [82], wherein the antibody in the antibody-drug conjugate is an anti-B7-H3 antibody.

[96] The method of treatment according to [95], wherein the anti-B7-H3 antibody is an antibody comprising a heavy chain consisting of an amino acid sequence consisting of amino acid residues 20 to 471 of SEQ ID NO: 7 and a light chain consisting of an amino acid sequence consisting of amino acid residues 21 to 233 of SEQ ID NO: 8.

[97] The method of treatment according to [96], wherein the anti-B7-H3 antibody lacks a lysine residue at the carboxyl terminus of the heavy chain.

[98] The method of treatment according to any one of [95] to [97], wherein the average number of units of the drug-linker conjugated per antibody molecule in the antibody-drug conjugate is in the range of from 3.5 to 4.5.

[99] The method of treatment according to [82], wherein the antibody in the antibody-drug conjugate is an anti-GPR20 antibody.

[100] The method of treatment according to [99], wherein the anti-GPR20 antibody is an antibody comprising a heavy chain consisting of an amino acid sequence consisting of amino acid residues 20 to 472 of SEQ ID NO: 9 and a light chain consisting of an amino acid sequence consisting of amino acid residues 21 to 234 of SEQ ID NO: 10.

[101] The method of treatment according to [100], wherein the anti-GPR20 antibody lacks a lysine residue at the carboxyl terminus of the heavy chain.

[102] The method of treatment according to any one of [99] to [101], wherein the average number of units of the drug-linker conjugated per antibody molecule in the antibody-drug conjugate is in the range of from 7 to 8.

[103] The method of treatment according to [82], wherein the antibody in the antibody-drug conjugate is an anti-CDH6 antibody.

[104] The method of treatment according to [103], wherein the anti-CDH6 antibody is an antibody comprising a heavy chain consisting of an amino acid sequence consisting of amino acid residues 20 to 471 of SEQ ID NO: 11 and a light chain consisting of an amino acid sequence consisting of amino acid residues 21 to 233 of SEQ ID NO: 12.

[105] The method of treatment according to [104], wherein the anti-CDH6 antibody lacks a lysine residue at the carboxyl terminus of the heavy chain.

[106] The method of treatment according to any one of [103] to [105], wherein the average number of units of the drug-linker conjugated per antibody molecule in the antibody-drug conjugate is in the range of from 7 to 8.

[107] The method of treatment according to any one of [81] to [106], wherein the tubulin inhibitor is paclitaxel, docetaxel, cabazitaxel, or a pharmacologically acceptable salt thereof, or nab-paclitaxel.

[108] The method of treatment according to [107], wherein the tubulin inhibitor is paclitaxel.

[109] The method of treatment according to any one of [81] to [106], wherein the tubulin inhibitor is eribulin or a pharmacologically acceptable salt thereof, or an antibody-drug conjugate in which eribulin is conjugated to the antibody via a linker.

[110] The method of treatment according to [109], wherein the tubulin inhibitor is eribulin mesylate.

[111] The method of treatment according to any one of [81] to [110], wherein the antibody-drug conjugate and the tubulin inhibitor are separately contained as active components in different formulations, and are administered simultaneously or at different times.

[112] The method of treatment according to any one of [81] to [111], wherein the method of treatment is for treating at least one selected from the group consisting of breast cancer, gastric cancer, colorectal cancer, lung cancer, esophageal cancer, salivary gland cancer, esophagogastric junction adenocarcinoma, biliary tract cancer, Paget's disease, pancreatic cancer, ovarian cancer, bladder cancer, prostate cancer, and uterine carcinosarcoma.

[113] The method of treatment according to [112], wherein the method of treatment is for treating breast cancer.

[114] The method of treatment according to [112], wherein the method of treatment is for treating gastric cancer.

[115] The method of treatment according to [112], wherein the method of treatment is for treating lung cancer.

[116] The method of treatment according to [112], wherein the method of treatment is for treating ovarian cancer.

[117] The method of treatment according to any one of [81] to [116], wherein the tubulin inhibitor suppresses decreased expression of a drug sensitivity factor caused by the administration of the antibody-drug conjugate.

[118] The method of treatment according to [117], wherein the drug sensitivity factor is SLFN11.

[119] The method of treatment according to any one of [81] to [116], wherein the tubulin inhibitor suppresses increased expression of a drug resistance factor caused by the administration of the antibody-drug conjugate.

[120] The method of treatment according to [119], wherein the drug resistance factor is ABCG2.

[121] A method of treatment, comprising administering an antibody-drug conjugate and a tubulin inhibitor in combination to a subject in need of treatment, wherein the antibody-drug conjugate is an antibody-drug conjugate represented by the following formula:

[Formula 4]

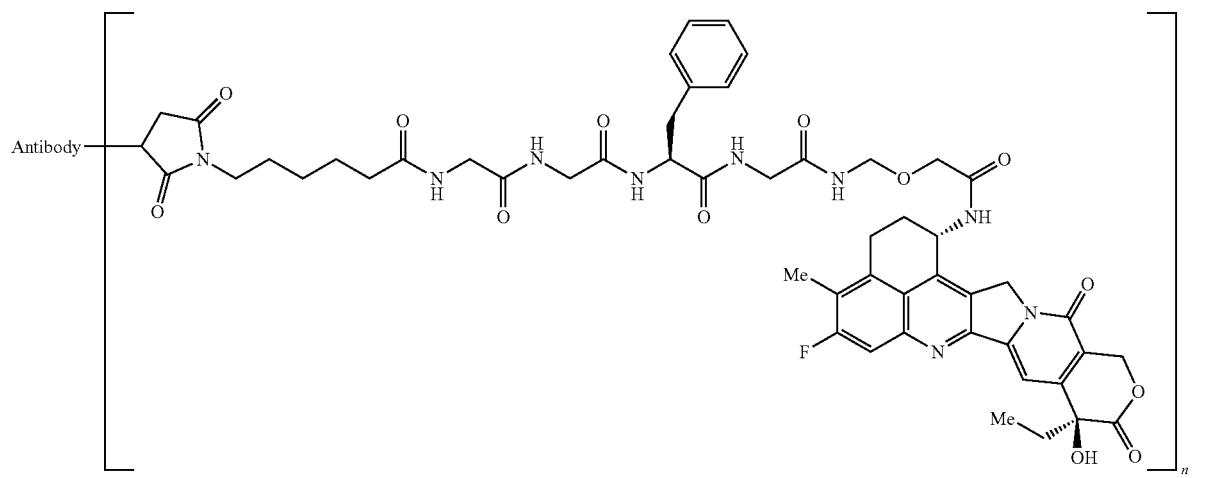

wherein the drug-linker is conjugated to the antibody via a thioether bond, and n is the average number of units of the drug-linker conjugated per antibody molecule.

[122] The method of treatment according to [121], wherein the antibody in the antibody-drug conjugate is an anti-HER2 antibody, an anti-HER3 antibody, an anti-TROP2 antibody, an anti-B7-H3 antibody, an anti-GPR20 antibody, or an anti-CDH6 antibody.

[123] The method of treatment according to [122], wherein the antibody in the antibody-drug conjugate is an anti-HER2 antibody.

[124] The method of treatment according to [123], wherein the anti-HER2 antibody is an antibody comprising a heavy chain consisting of an amino acid sequence consisting of amino acid residues 1 to 449 of SEQ ID NO: 1 and a light chain consisting of an amino acid sequence consisting of amino acid residues 1 to 214 of SEQ ID NO: 2.

[125] The method of treatment according to [123], wherein the anti-HER2 antibody is an antibody comprising a heavy chain consisting of an amino acid sequence represented by SEQ ID NO: 1 and a light chain consisting of an amino acid sequence represented by SEQ ID NO: 2.

[126] The method of treatment according to any one of [123] to [125], wherein the average number of units of the drug-linker conjugated per antibody molecule in the antibody-drug conjugate is in the range of from 7 to 8.

[127] The method of treatment according to [122], wherein the antibody in the antibody-drug conjugate is an anti-HER3 antibody.

[128] The method of treatment according to [127], wherein the anti-HER3 antibody is an antibody comprising a heavy chain consisting of an amino acid sequence represented by SEQ ID NO: 3 and a light chain consisting of an amino acid sequence represented by SEQ ID NO: 4.

[129] The method of treatment according to [128], wherein the anti-HER3 antibody lacks a lysine residue at the carboxyl terminus of the heavy chain.

[130] The method of treatment according to any one of [127] to [129], wherein the average number of units of the drug-linker conjugated per antibody molecule in the antibody-drug conjugate is in the range of from 7 to 8.

[131] The method of treatment according to [122], wherein the antibody in the antibody-drug conjugate is an anti-TROP2 antibody.

[132] The method of treatment according to [131], wherein the anti-TROP2 antibody is an antibody comprising a heavy chain consisting of an amino acid sequence consisting of amino acid residues 20 to 470 of SEQ ID NO: 5 and a light chain consisting of an amino acid sequence consisting of amino acid residues 21 to 234 of SEQ ID NO: 6.

[133] The method of treatment according to [132], wherein the anti-TROP2 antibody lacks a lysine residue at the carboxyl terminus of the heavy chain.

[134] The method of treatment according to any one of [131] to [133], wherein the average number of units of the drug-linker conjugated per antibody molecule in the antibody-drug conjugate is in the range of from 3.5 to 4.5.

[135] The method of treatment according to [122], wherein the antibody in the antibody-drug conjugate is an anti-B7-H3 antibody.

[136] The method of treatment according to [135], wherein the anti-B7-H3 antibody is an antibody comprising a heavy chain consisting of an amino acid sequence consisting of amino acid residues 20 to 471 of SEQ ID NO: 7 and a light chain consisting of an amino acid sequence consisting of amino acid residues 21 to 233 of SEQ ID NO: 8.

[137] The method of treatment according to [136], wherein the anti-B7-H3 antibody lacks a lysine residue at the carboxyl terminus of the heavy chain.

[138] The method of treatment according to any one of [135] to [137], wherein the average number of units of the drug-linker conjugated per antibody molecule in the antibody-drug conjugate is in the range of from 3.5 to 4.5.

[139] The method of treatment according to [122], wherein the antibody in the antibody-drug conjugate is an anti-GPR20 antibody.

[140] The method of treatment according to [139], wherein the anti-GPR20 antibody is an antibody comprising a heavy chain consisting of an amino acid sequence consisting of amino acid residues 20 to 472 of SEQ ID NO: 9 and a light chain consisting of an amino acid sequence consisting of amino acid residues 21 to 234 of SEQ ID NO: 10.

[141] The method of treatment according to [140], wherein the anti-GPR20 antibody lacks a lysine residue at the carboxyl terminus of the heavy chain.

[142] The method of treatment according to any one of [139] to [141], wherein the average number of units of the drug-linker conjugated per antibody molecule in the antibody-drug conjugate is in the range of from 7 to 8.

[143] The method of treatment according to [122], wherein the antibody in the antibody-drug conjugate is an anti-CDH6 antibody.

[144] The method of treatment according to [143], wherein the anti-CDH6 antibody is an antibody comprising a heavy chain consisting of an amino acid sequence consisting of amino acid residues 20 to 471 of SEQ ID NO: 11 and a light chain consisting of an amino acid sequence consisting of amino acid residues 21 to 233 of SEQ ID NO: 12.

[145] The method of treatment according to [144], wherein the anti-CDH6 antibody lacks a lysine residue at the carboxyl terminus of the heavy chain.

[146] The method of treatment according to any one of [143] to [145], wherein the average number of units of the drug-linker conjugated per antibody molecule in the antibody-drug conjugate is in the range of from 7 to 8.

[147] The method of treatment according to any one of [121] to [146], wherein the tubulin inhibitor is paclitaxel, docetaxel, cabazitaxel, or a pharmacologically acceptable salt thereof, or nab-paclitaxel.

[148] The method of treatment according to [147], wherein the tubulin inhibitor is paclitaxel.

[149] The method of treatment according to any one of [121] to [146], wherein the tubulin inhibitor is eribulin or a pharmacologically acceptable salt thereof, or an antibody-drug conjugate in which eribulin is conjugated to the antibody via a linker.

[150] The method of treatment according to [149], wherein the tubulin inhibitor is eribulin mesylate.

[151] The method of treatment according to any one of [121] to [150], wherein the antibody-drug conjugate and the tubulin inhibitor are separately contained as active components in different formulations, and are administered simultaneously or at different times.

[152] The method of treatment according to any one of [121] to [151], wherein the method of treatment is for treating at least one selected from the group consisting of breast cancer, gastric cancer, colorectal cancer, lung cancer, esophageal cancer, salivary gland cancer, esophagogastric junction adenocarcinoma, biliary tract cancer, Paget's disease, pancreatic cancer, ovarian cancer, bladder cancer, prostate cancer, and uterine carcinosarcoma.

[153] The method of treatment according to [152], wherein the method of treatment is for treating breast cancer.

[154] The method of treatment according to [152], wherein the method of treatment is for treating gastric cancer.

[155] The method of treatment according to [152], wherein the method of treatment is for treating lung cancer.

[156] The method of treatment according to [152], wherein the method of treatment is for treating ovarian cancer.

[157] The method of treatment according to any one of [121] to [156], wherein the tubulin inhibitor suppresses decreased expression of a drug sensitivity factor caused by the administration of the antibody-drug conjugate.

[158] The method of treatment according to [157], wherein the drug sensitivity factor is SLFN11.

[159] The method of treatment according to any one of [121] to [156], wherein the tubulin inhibitor suppresses increased expression of a drug resistance factor caused by the administration of the antibody-drug conjugate.

[160] The method of treatment according to [159], wherein the drug resistance factor is ABCG2.

[161] An antibody-drug conjugate for use in treating a disease through being administered in combination with a tubulin inhibitor, wherein a drug-linker represented by the following formula:

[Formula 5]

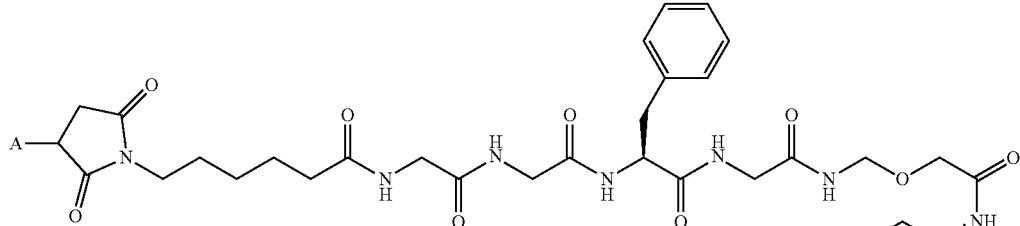
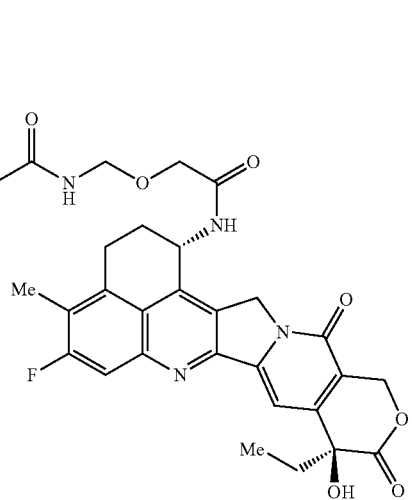

wherein A represents a connecting position to an antibody, is conjugated to the antibody via a thioether bond in the antibody-drug conjugate.

[162] The antibody-drug conjugate according to [161], wherein the antibody in the antibody-drug conjugate is an anti-HER2 antibody, an anti-HER3 antibody, an anti-TROP2 antibody, an anti-B7-H3 antibody, an anti-GPR20 antibody, or an anti-CDH6 antibody.

[163] The antibody-drug conjugate according to [162], wherein the antibody in the antibody-drug conjugate is an anti-HER2 antibody.

[164] The antibody-drug conjugate according to [163], wherein the anti-HER2 antibody is an antibody comprising a heavy chain consisting of an amino acid sequence consisting of amino acid residues 1 to 449 of SEQ ID NO: 1 and a light chain consisting of an amino acid sequence consisting of amino acid residues 1 to 214 of SEQ ID NO: 2.

[165] The antibody-drug conjugate according to [163], wherein the anti-HER2 antibody is an antibody comprising a heavy chain consisting of an amino acid sequence represented by SEQ ID NO: 1 and a light chain consisting of an amino acid sequence represented by SEQ ID NO: 2.

[166] The antibody-drug conjugate according to any one of [163] to [165], wherein the average number of units of the drug-linker conjugated per antibody molecule in the antibody-drug conjugate is in the range of from 7 to 8.

[167] The antibody-drug conjugate according to [162], wherein the antibody in the antibody-drug conjugate is an anti-HER3 antibody.

[168] The antibody-drug conjugate according to [167], wherein the anti-HER3 antibody is an antibody comprising a heavy chain consisting of an amino acid sequence represented by SEQ ID NO: 3 and a light chain consisting of an amino acid sequence represented by SEQ ID NO: 4.

[169] The antibody-drug conjugate according to [168], wherein the anti-HER3 antibody lacks a lysine residue at the carboxyl terminus of the heavy chain.

[170] The antibody-drug conjugate according to any one of [167] to [169], wherein the average number of units of the drug-linker conjugated per antibody molecule in the antibody-drug conjugate is in the range of from 7 to 8.

[171] The antibody-drug conjugate according to [162], wherein the antibody in the antibody-drug conjugate is an anti-TROP2 antibody.

[172] The antibody-drug conjugate according to [171], wherein the anti-TROP2 antibody is an antibody comprising a heavy chain consisting of an amino acid sequence consisting of amino acid residues 20 to 470 of SEQ ID NO: 5 and a light chain consisting of an amino acid sequence consisting of amino acid residues 21 to 234 of SEQ ID NO: 6.

[173] The antibody-drug conjugate according to [172], wherein the anti-TROP2 antibody lacks a lysine residue at the carboxyl terminus of the heavy chain.

[174] The antibody-drug conjugate according to any one of [171] to [173], wherein the average number of units of the drug-linker conjugated per antibody molecule in the antibody-drug conjugate is in the range of from 3.5 to 4.5.

[175] The antibody-drug conjugate according to [162], wherein the antibody in the antibody-drug conjugate is an anti-B7-H3 antibody.

[176] The antibody-drug conjugate according to [175], wherein the anti-B7-H3 antibody is an antibody comprising a heavy chain consisting of an amino acid sequence consisting of amino acid residues 20 to 471 of SEQ ID NO: 7 and a light chain consisting of an amino acid sequence consisting of amino acid residues 21 to 233 of SEQ ID NO: 8.

[177] The antibody-drug conjugate according to [176], wherein the anti-B7-H3 antibody lacks a lysine residue at the carboxyl terminus of the heavy chain.

[178] The antibody-drug conjugate according to any one of [175] to [177], wherein the average number of units of the drug-linker conjugated per antibody molecule in the antibody-drug conjugate is in the range of from 3.5 to 4.5.

[179] The antibody-drug conjugate according to [162], wherein the antibody in the antibody-drug conjugate is an anti-GPR20 antibody.

[180] The antibody-drug conjugate according to [179], wherein the anti-GPR20 antibody is an antibody comprising a heavy chain consisting of an amino acid sequence consisting of amino acid residues 20 to 472 of SEQ ID NO: 9 and a light chain consisting of an amino acid sequence consisting of amino acid residues 21 to 234 of SEQ ID NO: 10.

[181] The antibody-drug conjugate according to [180], wherein the anti-GPR20 antibody lacks a lysine residue at the carboxyl terminus of the heavy chain.

[182] The antibody-drug conjugate according to any one of [179] to [181], wherein the average number of units of the drug-linker conjugated per antibody molecule in the antibody-drug conjugate is in the range of from 7 to 8.

[183] The antibody-drug conjugate according to [162], wherein the antibody in the antibody-drug conjugate is an anti-CDH6 antibody.

[184] The antibody-drug conjugate according to [183], wherein the anti-CDH6 antibody is an antibody comprising a heavy chain consisting of an amino acid sequence consisting of amino acid residues 20 to 471 of SEQ ID NO: 11 and a light chain consisting of an amino acid sequence consisting of amino acid residues 21 to 233 of SEQ ID NO: 12.

[185] The antibody-drug conjugate according to [184], wherein the anti-CDH6 antibody lacks a lysine residue at the carboxyl terminus of the heavy chain.

[186] The antibody-drug conjugate according to any one of [183] to [185], wherein the average number of units of the drug-linker conjugated per antibody molecule in the antibody-drug conjugate is in the range of from 7 to 8.

[187] The antibody-drug conjugate according to any one of [161] to [186], wherein the tubulin inhibitor is paclitaxel, docetaxel, cabazitaxel, or a pharmacologically acceptable salt thereof, or nab-paclitaxel.

[188] The antibody-drug conjugate according to [187], wherein the tubulin inhibitor is paclitaxel.

[189] The antibody-drug conjugate according to any one of [161] to [186], wherein the tubulin inhibitor is eribulin or a pharmacologically acceptable salt thereof, or an antibody-drug conjugate in which eribulin is conjugated to the antibody via a linker.

[190] The antibody-drug conjugate according to [189], wherein the tubulin inhibitor is eribulin mesylate.

[191] The antibody-drug conjugate according to any one of [161] to [190], wherein the antibody-drug conjugate and the tubulin inhibitor are separately contained as active components in different formulations, and are administered simultaneously or at different times.

[192] The antibody-drug conjugate according to any one of [161] to [191], wherein the antibody-drug conjugate is for use in treating at least one selected from the group consisting of breast cancer, gastric cancer, colorectal cancer, lung cancer, esophageal cancer, salivary gland cancer, esophago-gastric junction adenocarcinoma, biliary tract cancer, Paget's disease, pancreatic cancer, ovarian cancer, bladder cancer, prostate cancer, and uterine carcinosarcoma.

[193] The antibody-drug conjugate according to [192], wherein the antibody-drug conjugate is for use in treating breast cancer.

[194] The antibody-drug conjugate according to [192], wherein the antibody-drug conjugate is for use in treating gastric cancer.

[195] The antibody-drug conjugate according to [192], wherein the antibody-drug conjugate is for use in treating lung cancer.

[196] The antibody-drug conjugate according to [192], wherein the antibody-drug conjugate is for use in treating ovarian cancer.

[197] The antibody-drug conjugate according to any one of [161] to [196], wherein the tubulin inhibitor suppresses decreased expression of a drug sensitivity factor caused by the administration of the antibody-drug conjugate.

[198] The antibody-drug conjugate according to [197], wherein the drug sensitivity factor is SLFN11.

[199] The antibody-drug conjugate according to any one of [161] to [196], wherein the tubulin inhibitor suppresses increased expression of a drug resistance factor caused by the administration of the antibody-drug conjugate.

[200] The antibody-drug conjugate according to [199], wherein the drug resistance factor is ABCG2.

[201] An antibody-drug conjugate for use in treating a disease through being administered in combination with a tubulin inhibitor, wherein the antibody-drug conjugate is represented by the following formula:

[Formula 6]

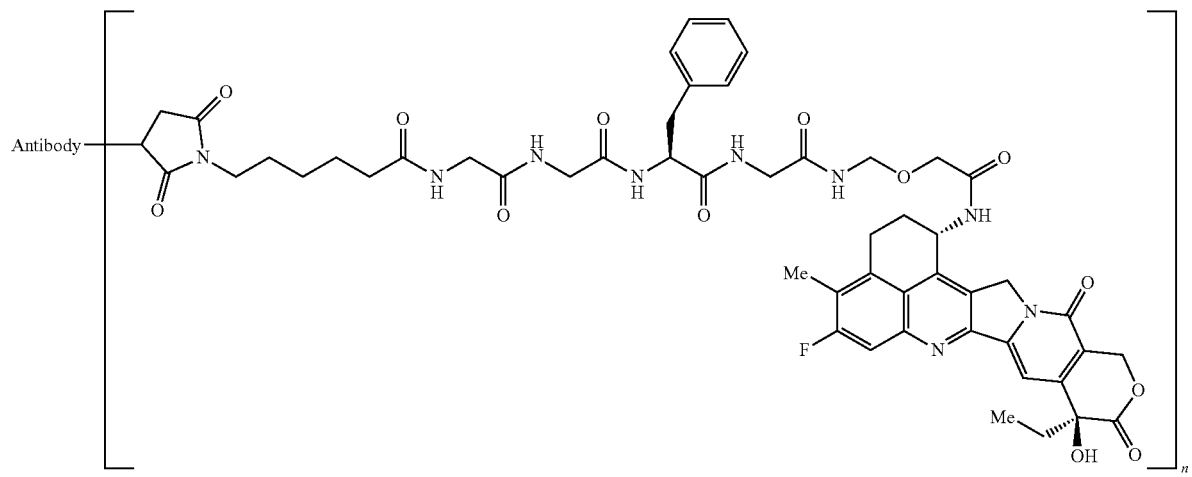

wherein the drug-linker is conjugated to the antibody via a thioether bond, and n is the average number of units of the drug-linker conjugated per antibody molecule.

[202] The antibody-drug conjugate according to [201], wherein the antibody in the antibody-drug conjugate is an anti-HER2 antibody, an anti-HER3 antibody, an anti-TROP2 antibody, an anti-B7-H3 antibody, an anti-GPR20 antibody, or an anti-CDH6 antibody.

[203] The antibody-drug conjugate according to [202], wherein the antibody in the antibody-drug conjugate is an anti-HER2 antibody.

[204] The antibody-drug conjugate according to [203], wherein the anti-HER2 antibody is an antibody comprising a heavy chain consisting of an amino acid sequence consisting of amino acid residues 1 to 449 of SEQ ID NO: 1 and a light chain consisting of an amino acid sequence consisting of amino acid residues 1 to 214 of SEQ ID NO: 2.

[205] The antibody-drug conjugate according to [203], wherein the anti-HER2 antibody is an antibody comprising a heavy chain consisting of an amino acid sequence represented by SEQ ID NO: 1 and a light chain consisting of an amino acid sequence represented by SEQ ID NO: 2.

[206] The antibody-drug conjugate according to any one of [203] to [205], wherein the average number of units of the drug-linker conjugated per antibody molecule in the antibody-drug conjugate is in the range of from 7 to 8.

[207] The antibody-drug conjugate according to [202], wherein the antibody in the antibody-drug conjugate is an anti-HER3 antibody.

[208] The antibody-drug conjugate according to [207], wherein the anti-HER3 antibody is an antibody comprising a heavy chain consisting of an amino acid sequence represented by SEQ ID NO: 3 and a light chain consisting of an amino acid sequence represented by SEQ ID NO: 4.

[209] The antibody-drug conjugate according to [208], wherein the anti-HER3 antibody lacks a lysine residue at the carboxyl terminus of the heavy chain.

[210] The antibody-drug conjugate according to any one of [207] to [209], wherein the average number of units of the drug-linker conjugated per antibody molecule in the antibody-drug conjugate is in the range of from 7 to 8.

[211] The antibody-drug conjugate according to [202], wherein the antibody in the antibody-drug conjugate is an anti-TROP2 antibody.

[212] The antibody-drug conjugate according to [211], wherein the anti-TROP2 antibody is an antibody comprising a heavy chain consisting of an amino acid sequence consisting of amino acid residues 20 to 470 of SEQ ID NO: 5 and a light chain consisting of an amino acid sequence consisting of amino acid residues 21 to 234 of SEQ ID NO: 6.

[213] The antibody-drug conjugate according to [212], wherein the anti-TROP2 antibody lacks a lysine residue at the carboxyl terminus of the heavy chain.

[214] The antibody-drug conjugate according to any one of [211] to [213], wherein the average number of units of the drug-linker conjugated per antibody molecule in the antibody-drug conjugate is in the range of from 3.5 to 4.5.

[215] The antibody-drug conjugate according to [202], wherein the antibody in the antibody-drug conjugate is an anti-B7-H3 antibody.

[216] The antibody-drug conjugate according to [215], wherein the anti-B7-H3 antibody is an antibody comprising a heavy chain consisting of an amino acid sequence consisting of amino acid residues 20 to 471 of SEQ ID NO: 7 and a light chain consisting of an amino acid sequence consisting of amino acid residues 21 to 233 of SEQ ID NO: 8.

[217] The antibody-drug conjugate according to [216], wherein the anti-B7-H3 antibody lacks a lysine residue at the carboxyl terminus of the heavy chain.

[218] The antibody-drug conjugate according to any one of [215] to [217], wherein the average number of units of the drug-linker conjugated per antibody molecule in the antibody-drug conjugate is in the range of from 3.5 to 4.5.

[219] The antibody-drug conjugate according to [202], wherein the antibody in the antibody-drug conjugate is an anti-GPR20 antibody.

[220] The antibody-drug conjugate according to [219], wherein the anti-GPR20 antibody is an antibody comprising a heavy chain consisting of an amino acid sequence consisting of amino acid residues 20 to 472 of SEQ ID NO: 9 and a light chain consisting of an amino acid sequence consisting of amino acid residues 21 to 234 of SEQ ID NO: 10.

[221] The antibody-drug conjugate according to [220], wherein the anti-GPR20 antibody lacks a lysine residue at the carboxyl terminus of the heavy chain.

[222] The antibody-drug conjugate according to any one of [219] to [221], wherein the average number of units of the drug-linker conjugated per antibody molecule in the antibody-drug conjugate is in the range of from 7 to 8.

[223] The antibody-drug conjugate according to [202], wherein the antibody in the antibody-drug conjugate is an anti-CDH6 antibody.

[224] The antibody-drug conjugate according to [223], wherein the anti-CDH6 antibody is an antibody comprising a heavy chain consisting of an amino acid sequence consisting of amino acid residues 20 to 471 of SEQ ID NO: 11 and a light chain consisting of an amino acid sequence consisting of amino acid residues 21 to 233 of SEQ ID NO: 12.

[225] The antibody-drug conjugate according to [224], wherein the anti-CDH6 antibody lacks a lysine residue at the carboxyl terminus of the heavy chain.

[226] The antibody-drug conjugate according to any one of [223] to [225], wherein the average number of units of the drug-linker conjugated per antibody molecule in the antibody-drug conjugate is in the range of from 7 to 8.

[227] The antibody-drug conjugate according to any one of [201] to [226], wherein the tubulin inhibitor is paclitaxel, docetaxel, cabazitaxel, or a pharmacologically acceptable salt thereof, or nab-paclitaxel.

[228] The antibody-drug conjugate according to [227], wherein the tubulin inhibitor is paclitaxel.

The antibody-drug conjugate according to any one of [201] to [226], wherein the tubulin inhibitor is eribulin or a pharmacologically acceptable salt thereof, or an antibody-drug conjugate in which eribulin is conjugated to the antibody via a linker.

[230] The antibody-drug conjugate according to [229], wherein the tubulin inhibitor is eribulin mesylate.

[231] The antibody-drug conjugate according to any one of [201] to [230], wherein the antibody-drug conjugate and the tubulin inhibitor are separately contained as active components in different formulations, and are administered simultaneously or at different times.

[232] The antibody-drug conjugate according to any one of [201] to [231], wherein the antibody-drug conjugate is for use in treating at least one selected from the group consisting of breast cancer, gastric cancer, colorectal cancer, lung cancer, esophageal cancer, salivary gland cancer, esophagogastric junction adenocarcinoma, biliary tract cancer, Paget's disease, pancreatic cancer, ovarian cancer, bladder cancer, prostate cancer, and uterine carcinosarcoma.

[233] The antibody-drug conjugate according to [232], wherein the antibody-drug conjugate is for use in treating breast cancer.

[234] The antibody-drug conjugate according to [232], wherein the antibody-drug conjugate is for use in treating gastric cancer.

[235] The antibody-drug conjugate according to [232], wherein the antibody-drug conjugate is for use in treating lung cancer.

[236] The antibody-drug conjugate according to [232], wherein the antibody-drug conjugate is for use in treating ovarian cancer.

[237] The antibody-drug conjugate according to any one of [201] to [236], wherein the tubulin inhibitor suppresses decreased expression of a drug sensitivity factor caused by the administration of the antibody-drug conjugate.

[238] The antibody-drug conjugate according to [237], wherein the drug sensitivity factor is SLFN11.

[239] The antibody-drug conjugate according to any one of [201] to [236], wherein the tubulin inhibitor suppresses increased expression of a drug resistance factor caused by the administration of the antibody-drug conjugate.

[240] The antibody-drug conjugate according to [239], wherein the drug resistance factor is ABCG2.

[241] Use of an antibody-drug conjugate for the manufacture of a medicament for treating a disease through being administered in combination with a tubulin inhibitor, wherein a drug-linker represented by the following formula:

conjugated per antibody molecule in the antibody-drug conjugate is in the range of from 7 to 8.

[247] The use according to [242], wherein the antibody in the antibody-drug conjugate is an anti-HER3 antibody.

[248] The use according to [247], wherein the anti-HER3 antibody is an antibody comprising a heavy chain consisting of an amino acid sequence represented by SEQ ID NO: 3 and a light chain consisting of an amino acid sequence represented by SEQ ID NO: 4.

[249] The use according to [248], wherein the anti-HER3 antibody lacks a lysine residue at the carboxyl terminus of the heavy chain.

[250] The use according to any one of [247] to [249], wherein the average number of units of the drug-linker conjugated per antibody molecule in the antibody-drug conjugate is in the range of from 7 to 8.

[251] The use according to [242], wherein the antibody in the antibody-drug conjugate is an anti-TROP2 antibody.

[Formula 7]

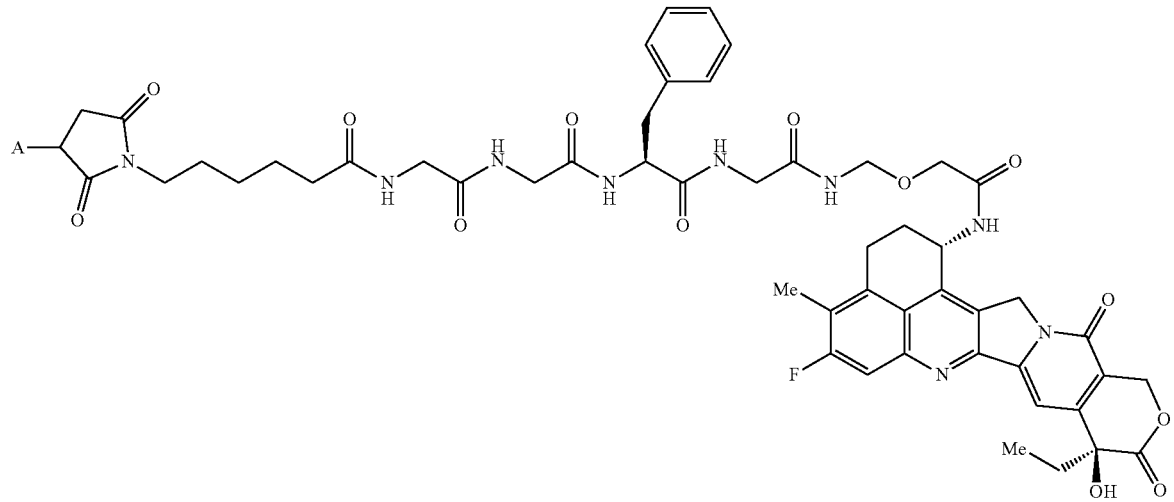

wherein A represents a connecting position to an antibody, is conjugated to the antibody via a thioether bond in the antibody-drug conjugate.

[242] The use according to [241], wherein the antibody in the antibody-drug conjugate is an anti-HER2 antibody, an anti-HER3 antibody, an anti-TROP2 antibody, an anti-B7-H3 antibody, an anti-GPR20 antibody, or an anti-CDH6 antibody.

[243] The use according to [242], wherein the antibody in the antibody-drug conjugate is an anti-HER2 antibody.

[244] The use according to [243], wherein the anti-HER2 antibody is an antibody comprising a heavy chain consisting of an amino acid sequence consisting of amino acid residues 1 to 449 of SEQ ID NO: 1 and a light chain consisting of an amino acid sequence consisting of amino acid residues 1 to 214 of SEQ ID NO: 2.

[245] The use according to [243], wherein the anti-HER2 antibody is an antibody comprising a heavy chain consisting of an amino acid sequence represented by SEQ ID NO: 1 and a light chain consisting of an amino acid sequence represented by SEQ ID NO: 2.

[246] The use according to any one of [243] to [245], wherein the average number of units of the drug-linker

[252] The use according to [251], wherein the anti-TROP2 antibody is an antibody comprising a heavy chain consisting of an amino acid sequence consisting of amino acid residues 20 to 470 of SEQ ID NO: 5 and a light chain consisting of an amino acid sequence consisting of amino acid residues 21 to 234 of SEQ ID NO: 6.

[253] The use according to [252], wherein the anti-TROP2 antibody lacks a lysine residue at the carboxyl terminus of the heavy chain.

[254] The use according to any one of [251] to [253], wherein the average number of units of the drug-linker conjugated per antibody molecule in the antibody-drug conjugate is in the range of from 3.5 to 4.5.

[255] The use according to [242], wherein the antibody in the antibody-drug conjugate is an anti-B7-H3 antibody.

[256] The use according to [255], wherein the anti-B7-H3 antibody is an antibody comprising a heavy chain consisting of an amino acid sequence consisting of amino acid residues 20 to 471 of SEQ ID NO: 7 and a light chain consisting of an amino acid sequence consisting of amino acid residues 21 to 233 of SEQ ID NO: 8.

[257] The use according to [256], wherein the anti-B7-H3 antibody lacks a lysine residue at the carboxyl terminus of the heavy chain.

[258] The use according to any one of [255] to [257], wherein the average number of units of the drug-linker conjugated per antibody molecule in the antibody-drug conjugate is in the range of from 3.5 to 4.5.

[259] The use according to [242], wherein the antibody in the antibody-drug conjugate is an anti-GPR20 antibody.

[260] The use according to [259], wherein the anti-GPR20 antibody is an antibody comprising a heavy chain consisting of an amino acid sequence consisting of amino acid residues 20 to 472 of SEQ ID NO: 9 and a light chain consisting of an amino acid sequence consisting of amino acid residues 21 to 234 of SEQ ID NO: 10.

[261] The use according to [260], wherein the anti-GPR20 antibody lacks a lysine residue at the carboxyl terminus of the heavy chain.

[262] The use according to any one of [259] to [261], wherein the average number of units of the drug-linker conjugated per antibody molecule in the antibody-drug conjugate is in the range of from 7 to 8.

[263] The use according to [242], wherein the antibody in the antibody-drug conjugate is an anti-CDH6 antibody.

[264] The use according to [263], wherein the anti-CDH6 antibody is an antibody comprising a heavy chain consisting of an amino acid sequence consisting of amino acid residues 20 to 471 of SEQ ID NO: 11 and a light chain consisting of an amino acid sequence consisting of amino acid residues 21 to 233 of SEQ ID NO: 12.

[265] The use according to [264], wherein the anti-CDH6 antibody lacks a lysine residue at the carboxyl terminus of the heavy chain.

[266] The use according to any one of [263] to [265], wherein the average number of units of the drug-linker conjugated per antibody molecule in the antibody-drug conjugate is in the range of from 7 to 8.

[267] The use according to any one of [241] to [266], wherein the tubulin inhibitor is paclitaxel, docetaxel, cabazitaxel, or a pharmacologically acceptable salt thereof, or nab-paclitaxel.

[268] The use according to [267], wherein the tubulin inhibitor is paclitaxel.

[269] The use according to any one of [241] to [266], wherein the tubulin inhibitor is eribulin or a pharmacologically acceptable salt thereof, or an antibody-drug conjugate in which eribulin is conjugated to the antibody via a linker.

[270] The use according to [269], wherein the tubulin inhibitor is eribulin mesylate.

[271] The use according to any one of [241] to [270], wherein the antibody-drug conjugate and the tubulin inhibitor are separately contained as active components in different formulations, and are administered simultaneously or at different times.

[272] The use according to any one of [241] to [271], wherein the use is for treating at least one selected from the group consisting of breast cancer, gastric cancer, colorectal cancer, lung cancer, esophageal cancer, salivary gland cancer, esophagogastric junction adenocarcinoma, biliary tract cancer, Paget's disease, pancreatic cancer, ovarian cancer, bladder cancer, prostate cancer, and uterine carcinosarcoma.

[273] The use according to [272], wherein the use is for treating breast cancer.

[274] The use according to [272], wherein the use is for treating gastric cancer.

[275] The use according to [272], wherein the use is for treating lung cancer.

[276] The use according to [272], wherein the use is for treating ovarian cancer.

[277] The use according to any one of [241] to [276], wherein the tubulin inhibitor suppresses decreased expression of a drug sensitivity factor caused by the administration of the antibody-drug conjugate.

[278] The use according to [277], wherein the drug sensitivity factor is SLFN11.

[279] The use according to any one of [241] to [276], wherein the tubulin inhibitor suppresses increased expression of a drug resistance factor caused by the administration of the antibody-drug conjugate.

[280] The use according to [279], wherein the drug resistance factor is ABCG2.

[281] Use of an antibody-drug conjugate for the manufacture of a medicament for treating a disease through being administered in combination with a tubulin inhibitor, wherein the antibody-drug conjugate is represented by the following formula:

[Formula 8]

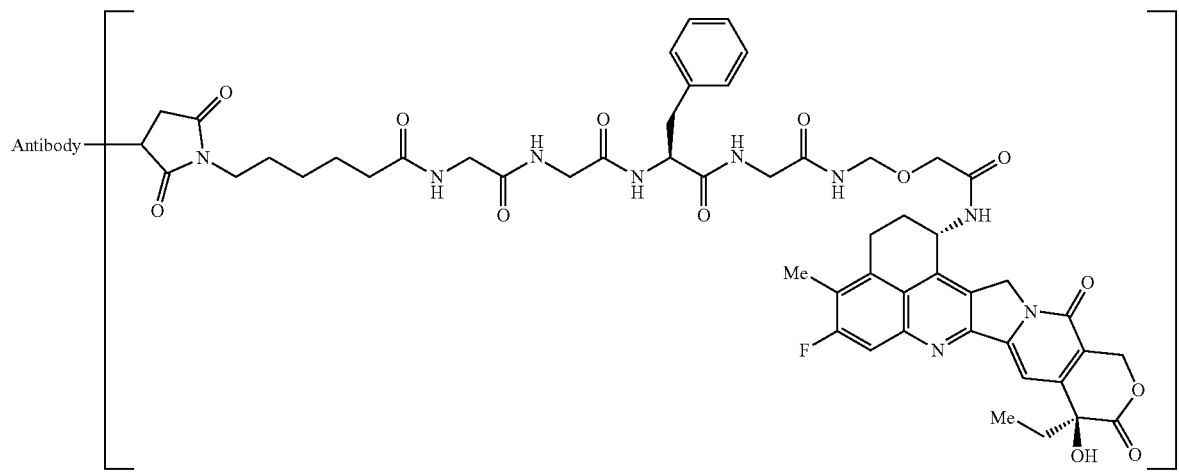

wherein the drug-linker is conjugated to the antibody via a thioether bond, and n is the average number of units of the drug-linker conjugated per antibody molecule.

[282] The use according to [281], wherein the antibody in the antibody-drug conjugate is an anti-HER2 antibody, an anti-HER3 antibody, an anti-TROP2 antibody, an anti-B7-H3 antibody, an anti-GPR20 antibody, or an anti-CDH6 antibody.

[283] The use according to [282], wherein the antibody in the antibody-drug conjugate is an anti-HER2 antibody.

[284] The use according to [283], wherein the anti-HER2 antibody is an antibody comprising a heavy chain consisting of an amino acid sequence consisting of amino acid residues 1 to 449 of SEQ ID NO: 1 and a light chain consisting of an amino acid sequence consisting of amino acid residues 1 to 214 of SEQ ID NO: 2.

[285] The use according to [283], wherein the anti-HER2 antibody is an antibody comprising a heavy chain consisting of an amino acid sequence represented by SEQ ID NO: 1 and a light chain consisting of an amino acid sequence represented by SEQ ID NO: 2.

[286] The use according to any one of [283] to [285], wherein the average number of units of the drug-linker conjugated per antibody molecule in the antibody-drug conjugate is in the range of from 7 to 8.

[287] The use according to [282], wherein the antibody in the antibody-drug conjugate is an anti-HER3 antibody.

[288] The use according to [287], wherein the anti-HER3 antibody is an antibody comprising a heavy chain consisting of an amino acid sequence represented by SEQ ID NO: 3 and a light chain consisting of an amino acid sequence represented by SEQ ID NO: 4.

[289] The use according to [288], wherein the anti-HER3 antibody lacks a lysine residue at the carboxyl terminus of the heavy chain.

[290] The use according to any one of [287] to [289], wherein the average number of units of the drug-linker conjugated per antibody molecule in the antibody-drug conjugate is in the range of from 7 to 8.

[291] The use according to [282], wherein the antibody in the antibody-drug conjugate is an anti-TROP2 antibody.

[292] The use according to [291], wherein the anti-TROP2 antibody is an antibody comprising a heavy chain consisting of an amino acid sequence consisting of amino acid residues 20 to 470 of SEQ ID NO: 5 and a light chain consisting of an amino acid sequence consisting of amino acid residues 21 to 234 of SEQ ID NO: 6.

[293] The use according to [292], wherein the anti-TROP2 antibody lacks a lysine residue at the carboxyl terminus of the heavy chain.

[294] The use according to any one of [291] to [293], wherein the average number of units of the drug-linker conjugated per antibody molecule in the antibody-drug conjugate is in the range of from 3.5 to 4.5.

[295] The use according to [282], wherein the antibody in the antibody-drug conjugate is an anti-B7-H3 antibody.

[296] The use according to [295], wherein the anti-B7-H3 antibody is an antibody comprising a heavy chain consisting of an amino acid sequence consisting of amino acid residues 20 to 471 of SEQ ID NO: 7 and a light chain consisting of an amino acid sequence consisting of amino acid residues 21 to 233 of SEQ ID NO: 8.

[297] The use according to [296], wherein the anti-B7-H3 antibody lacks a lysine residue at the carboxyl terminus of the heavy chain.

[298] The use according to any one of [295] to [297], wherein the average number of units of the drug-linker conjugated per antibody molecule in the antibody-drug conjugate is in the range of from 3.5 to 4.5.

[299] The use according to [282], wherein the antibody in the antibody-drug conjugate is an anti-GPR20 antibody.

[300] The use according to [299], wherein the anti-GPR20 antibody is an antibody comprising a heavy chain consisting of an amino acid sequence consisting of amino acid residues 20 to 472 of SEQ ID NO: 9 and a light chain consisting of an amino acid sequence consisting of amino acid residues 21 to 234 of SEQ ID NO: 10.

[301] The use according to [300], wherein the anti-GPR20 antibody lacks a lysine residue at the carboxyl terminus of the heavy chain.

[302] The use according to any one of [299] to [301], wherein the average number of units of the drug-linker conjugated per antibody molecule in the antibody-drug conjugate is in the range of from 7 to 8.

[303] The use according to [282], wherein the antibody in the antibody-drug conjugate is an anti-CDH6 antibody.

[304] The use according to [303], wherein the anti-CDH6 antibody is an antibody comprising a heavy chain consisting of an amino acid sequence consisting of amino acid residues 20 to 471 of SEQ ID NO: 11 and a light chain consisting of an amino acid sequence consisting of amino acid residues 21 to 233 of SEQ ID NO: 12.

[305] The use according to [304], wherein the anti-CDH6 antibody lacks a lysine residue at the carboxyl terminus of the heavy chain.

[306] The use according to any one of [303] to [305], wherein the average number of units of the drug-linker conjugated per antibody molecule in the antibody-drug conjugate is in the range of from 7 to 8.

[307] The use according to any one of [281] to [306], wherein the tubulin inhibitor is paclitaxel, docetaxel, cabazitaxel, or a pharmacologically acceptable salt thereof, or nab-paclitaxel.

[308] The use according to [307], wherein the tubulin inhibitor is paclitaxel.

[309] The use according to any one of [281] to [306], wherein the tubulin inhibitor is eribulin or a pharmacologically acceptable salt thereof, or an antibody-drug conjugate in which eribulin is conjugated to the antibody via a linker.

[310] The use according to [309], wherein the tubulin inhibitor is eribulin mesylate.

[311] The use according to any one of [281] to [310], wherein the antibody-drug conjugate and the tubulin inhibitor are separately contained as active components in different formulations, and are administered simultaneously or at different times.

[312] The use according to any one of [281] to [311], wherein the use is for treating at least one selected from the group consisting of breast cancer, gastric cancer, colorectal cancer, lung cancer, esophageal cancer, salivary gland cancer, esophagogastric junction adenocarcinoma, biliary tract cancer, Paget's disease, pancreatic cancer, ovarian cancer, bladder cancer, prostate cancer, and uterine carcinosarcoma.

[313] The use according to [312], wherein the use is for treating breast cancer.

[314] The use according to [312], wherein the use is for treating gastric cancer.

[315] The use according to [312], wherein the use is for treating lung cancer.

[316] The use according to [312], wherein the use is for treating ovarian cancer.

[317] The use according to any one of [281] to [316], wherein the tubulin inhibitor suppresses decreased expression of a drug sensitivity factor caused by the administration of the antibody-drug conjugate.

[318] The use according to [317], wherein the drug sensitivity factor is SLFN11.

[319] The use according to any one of [281] to [316], wherein the tubulin inhibitor suppresses increased expression of a drug resistance factor caused by the administration of the antibody-drug conjugate.

[320] The use according to [319], wherein the drug resistance factor is ABCG2.

[321] A pharmaceutical composition, wherein an antibody-drug conjugate and a tubulin inhibitor are administered in combination, and
  1) the tubulin inhibitor suppresses decreased expression of a drug sensitivity factor caused by the administration of the antibody-drug conjugate, and/or
  2) the tubulin inhibitor suppresses increased expression of a drug resistance factor caused by the administration of the antibody-drug conjugate.

[322] The pharmaceutical composition according to [321], wherein the drug sensitivity factor is SLFN11.

[323] The pharmaceutical composition according to [321] or [322], wherein the drug resistance factor is ABCG2.

[324] The pharmaceutical composition according to any one of [321] to [323], wherein the drug in the antibody-drug conjugate has a topoisomerase I inhibitory effect.

[325] The pharmaceutical composition according to any one of [321] to [323], wherein the antibody-drug conjugate is an antibody-drug conjugate in which a drug-linker represented by the following formula:

[326] The pharmaceutical composition according to any one of [321] to [323], wherein the antibody-drug conjugate is an antibody-drug conjugate represented by the following formula:

[Formula 9]

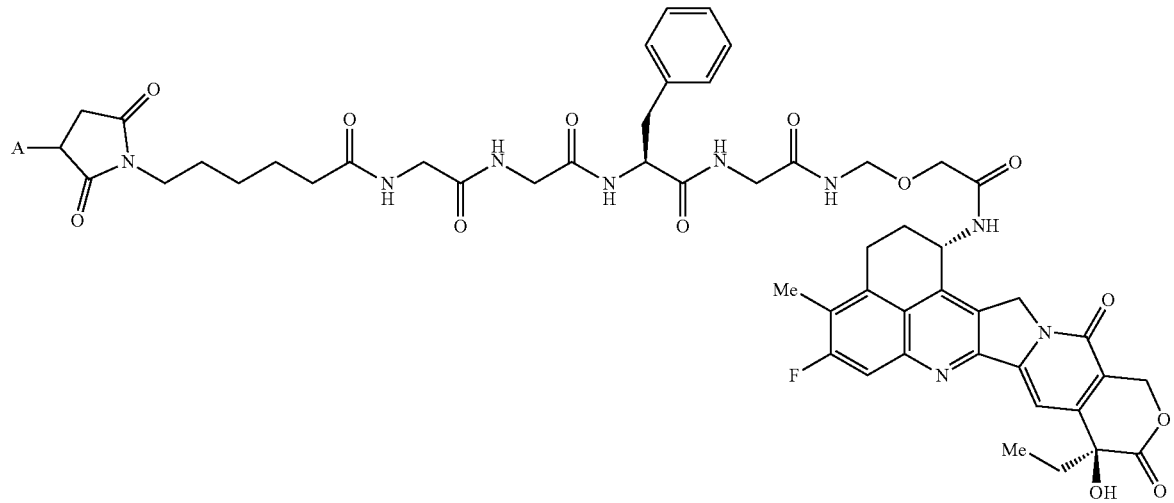

wherein A represents a connecting position to an antibody, is conjugated to the antibody via a thioether bond.

[Formula 10]

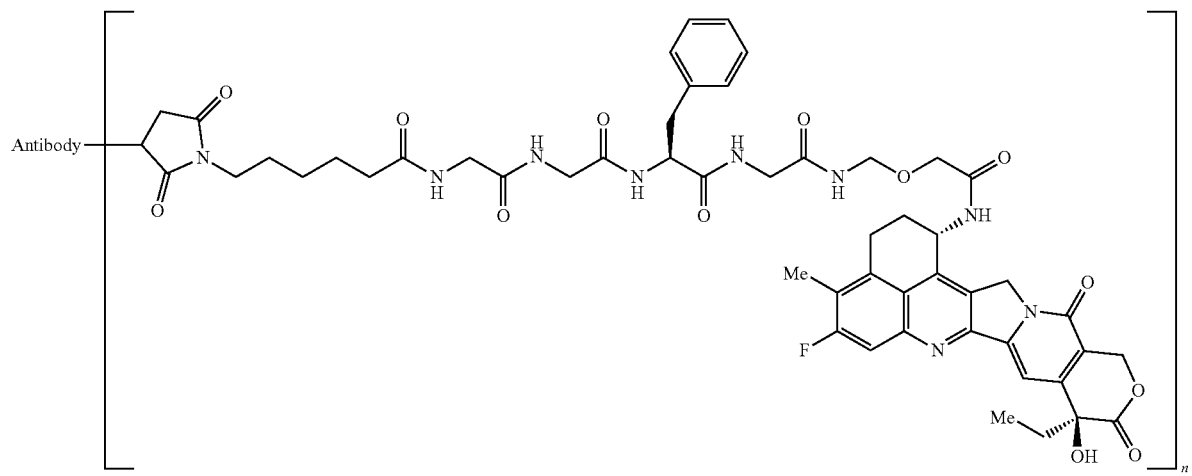

wherein the drug-linker is conjugated to the antibody via a thioether bond, and n is the average number of units of the drug-linker conjugated per antibody molecule.

[327] A method of treatment, comprising administering an antibody-drug conjugate and a tubulin inhibitor in combination to a subject in need of treatment, wherein
1) the tubulin inhibitor suppresses decreased expression of a drug sensitivity factor caused by the administration of the antibody-drug conjugate, and/or
2) the tubulin inhibitor suppresses increased expression of a drug resistance factor caused by the administration of the antibody-drug conjugate.

[328] The method of treatment according to [327], wherein the drug sensitivity factor is SLFN11.

[329] The method of treatment according to [327] or [328], wherein the drug resistance factor is ABCG2.

[330] The method of treatment according to any one of [327] to [329], wherein the drug in the antibody-drug conjugate has a topoisomerase I inhibitory effect.

[331] The method of treatment according to any one of [327] to [329], wherein the antibody-drug conjugate is an antibody-drug conjugate in which a drug-linker represented by the following formula:

[Formula 11]

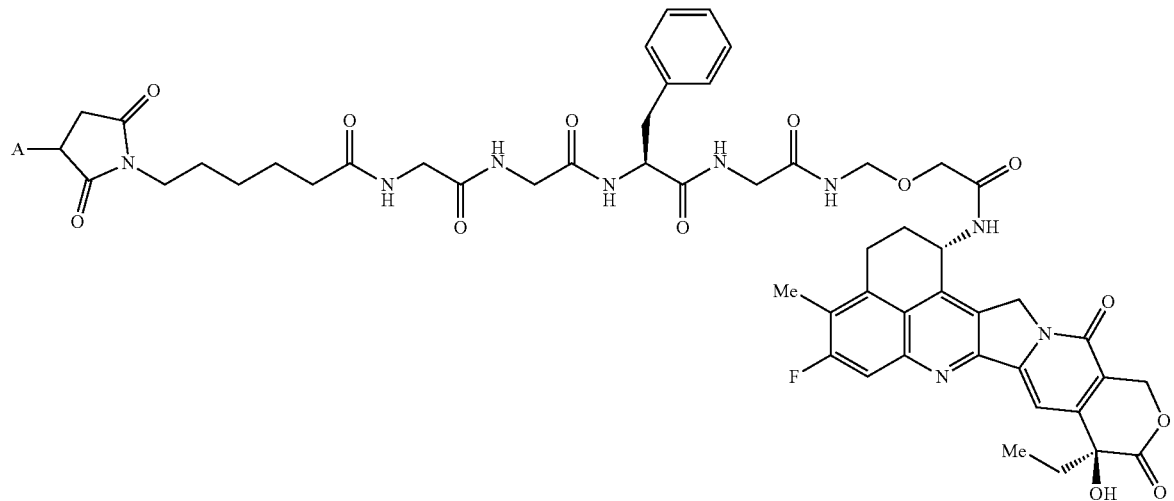

wherein A represents a connecting position to an antibody, is conjugated to the antibody via a thioether bond.

[332] The method of treatment according to any one of [327] to [329], wherein the antibody-drug conjugate is an antibody-drug conjugate represented by the following formula:

[Formula 12]

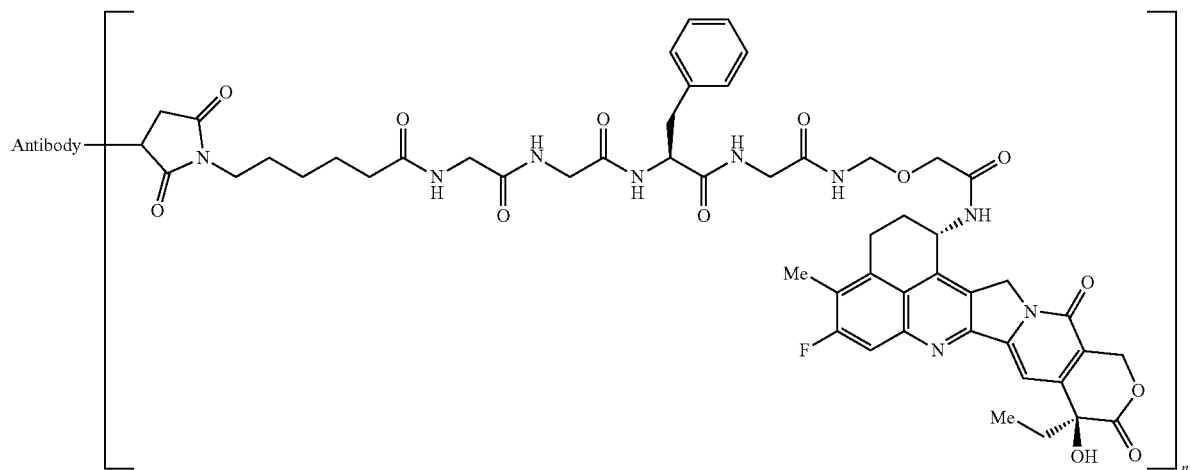

wherein the drug-linker is conjugated to the antibody via a thioether bond, and n is the average number of units of the drug-linker conjugated per antibody molecule.

[333] An antibody-drug conjugate for use in treating a disease through being administered in combination with a tubulin inhibitor, wherein 1) the tubulin inhibitor suppresses decreased expression of a drug sensitivity factor caused by the administration of the antibody-drug conjugate, and/or 2) the tubulin inhibitor suppresses increased expression of a drug resistance factor caused by the administration of the antibody-drug conjugate.

[334] The antibody-drug conjugate according to [333], wherein the drug sensitivity factor is SLFN11.

[335] The antibody-drug conjugate according to [333] or [334], wherein the drug resistance factor is ABCG2.

[336] The antibody-drug conjugate according to any one of [333] to [335], wherein the drug in the antibody-drug conjugate has a topoisomerase I inhibitory effect.

[337] The antibody-drug conjugate according to any one of [333] to [335], wherein the antibody-drug conjugate is an antibody-drug conjugate in which a drug-linker represented by the following formula:

[Formula 13]

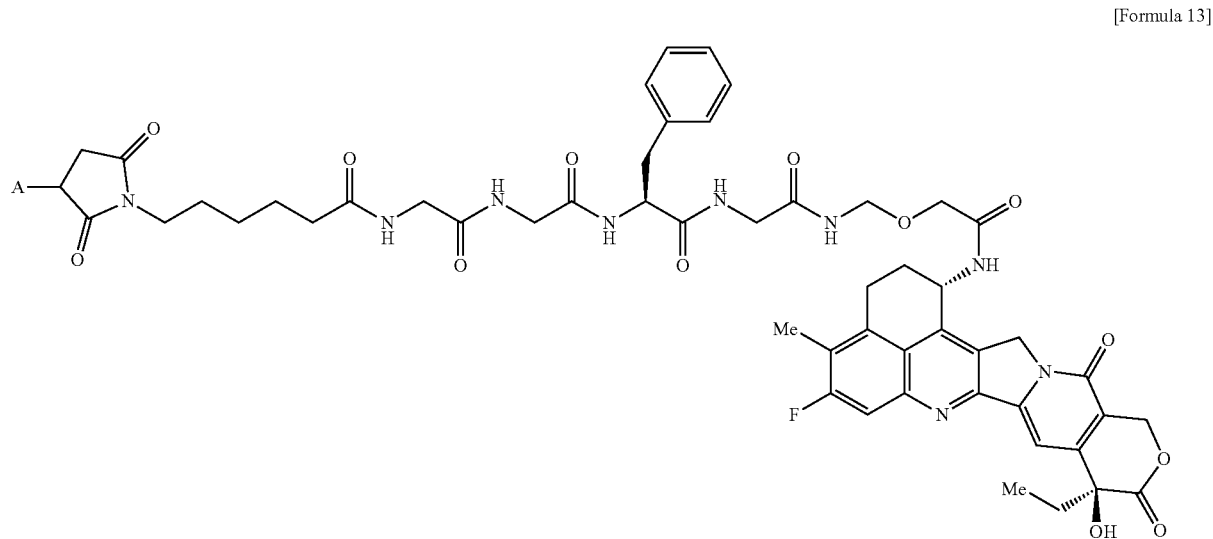

wherein A represents a connecting position to an antibody, is conjugated to the antibody via a thioether bond.

[338] The antibody-drug conjugate according to any one of [333] to [335], wherein the antibody-drug conjugate is an antibody-drug conjugate represented by the following formula:

[Formula 14]

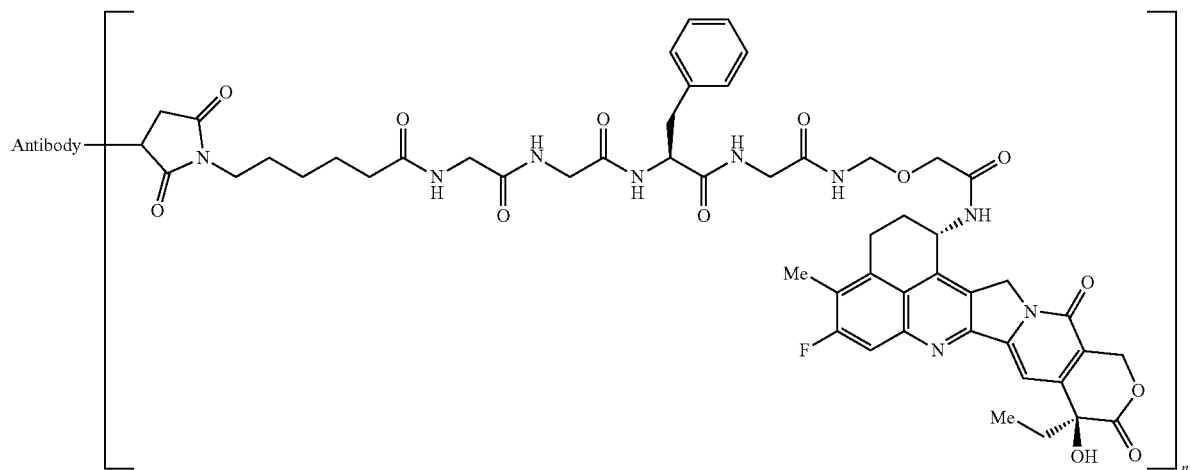

wherein the drug-linker is conjugated to the antibody via a thioether bond, and n is the average number of units of the drug-linker conjugated per antibody molecule.

[339] Use of an antibody-drug conjugate for the manufacture of a medicament for treating a disease through being administered in combination with a tubulin inhibitor, wherein
1) the tubulin inhibitor suppresses decreased expression of a drug sensitivity factor caused by the administration of the antibody-drug conjugate, and/or
2) the tubulin inhibitor suppresses increased expression of a drug resistance factor caused by the administration of the antibody-drug conjugate.

[340] The use according to [339], wherein the drug sensitivity factor is SLFN11.

[341] The use according to [339] or [340], wherein the drug resistance factor is ABCG2.

[342] The use according to any one of [339] to [341], wherein the drug in the antibody-drug conjugate has a topoisomerase I inhibitory effect.

[343] The use according to any one of [339] to [341], wherein
the antibody-drug conjugate is an antibody-drug conjugate in which a drug-linker represented by the following formula:

[Formula 15]

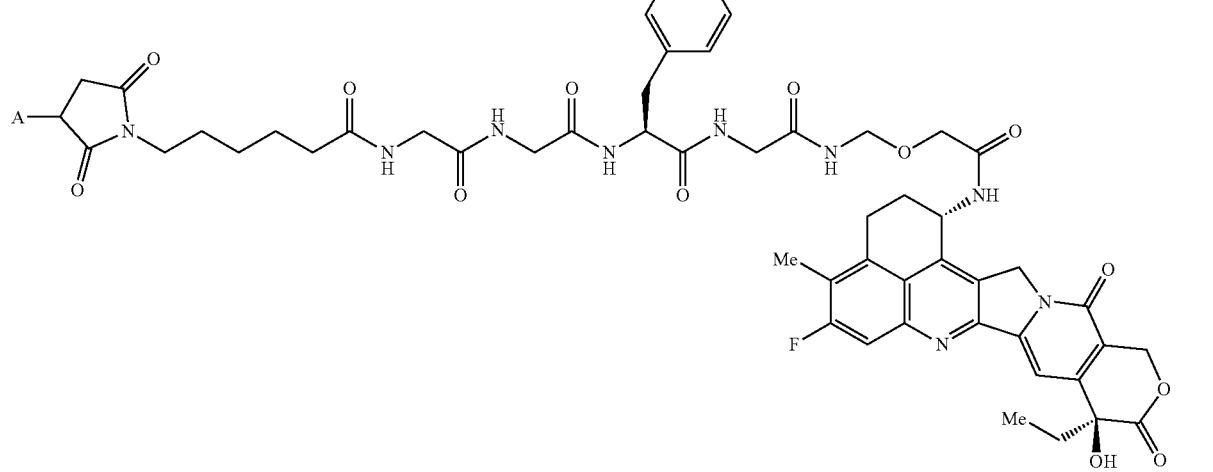

wherein A represents a connecting position to an antibody, is conjugated to the antibody via a thioether bond.

[344] The use according to any one of [339] to [341], wherein the antibody-drug conjugate is an antibody-drug conjugate represented by the following formula:

[Formula 16]

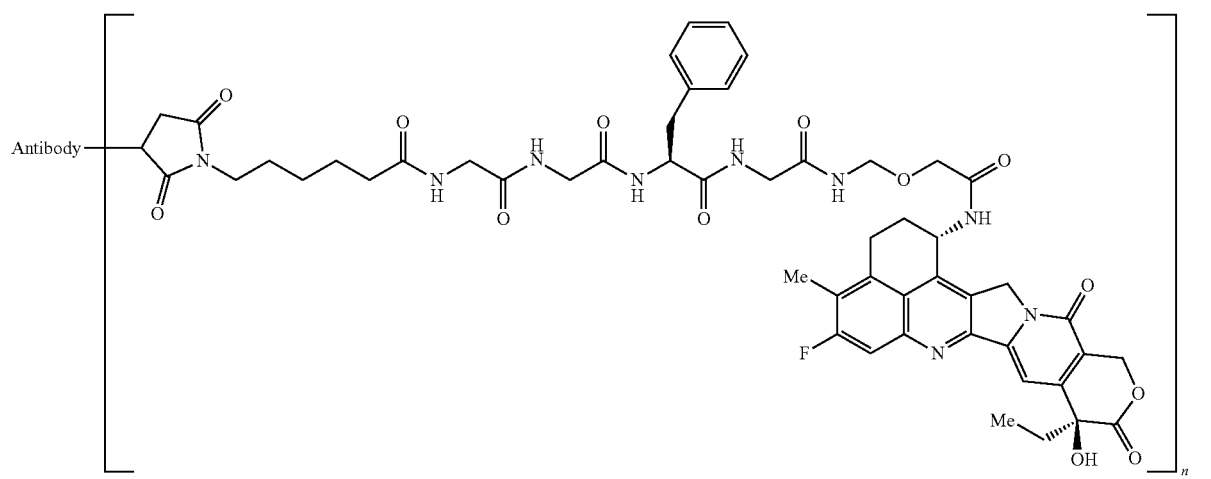

wherein the drug-linker is conjugated to the antibody via a thioether bond, and n is the average number of units of the drug-linker conjugated per antibody molecule.

Advantageous Effects of Invention

The present invention provides a pharmaceutical composition wherein a specific antibody-drug conjugate and a tubulin inhibitor are administered in combination, and/or a method of treatment wherein a specific antibody-drug conjugate and a tubulin inhibitor are administered in combination to a subject.

BRIEF DESCRIPTION OF DRAWINGS

FIG. 1 is a diagram showing the amino acid sequence of a heavy chain of an anti-HER2 antibody (SEQ ID NO: 1).
FIG. 2 is a diagram showing the amino acid sequence of a light chain of an anti-HER2 antibody (SEQ ID NO: 2).
FIG. 3 is a diagram showing the amino acid sequence of a heavy chain of an anti-HER3 antibody (SEQ ID NO: 3).
FIG. 4 is a diagram showing the amino acid sequence of a light chain of an anti-HER3 antibody (SEQ ID NO: 4).
FIG. 5 is a diagram showing the amino acid sequence of a heavy chain of an anti-TROP2 antibody (SEQ ID NO: 5).
FIG. 6 is a diagram showing the amino acid sequence of a light chain of an anti-TROP2 antibody (SEQ ID NO: 6).
FIG. 7 is a diagram showing the amino acid sequence of a heavy chain of an anti-B7-H3 antibody (SEQ ID NO: 7).
FIG. 8 is a diagram showing the amino acid sequence of a light chain of an anti-B7-H3 antibody (SEQ ID NO: 8).
FIG. 9 is a diagram showing the tumor growth suppressing effect in mice with subcutaneously transplanted KPL-4 cells in single administration groups of an antibody-drug conjugate (1) and paclitaxel respectively, and a combined administration group of the antibody-drug conjugate (1) and paclitaxel.
FIG. 10 is a diagram showing the tumor growth suppressing effect in mice with subcutaneously transplanted KPL-4 cells in single administration groups of an antibody-drug conjugate (1) and eribulin mesylate respectively, and a combined administration group of the antibody-drug conjugate (1) and eribulin mesylate.
FIG. 11 is a diagram showing the tumor growth suppressing effect in mice with subcutaneously transplanted JIMT-1 cells in single administration groups of an antibody-drug conjugate (1) and paclitaxel respectively, and a combined administration group of the antibody-drug conjugate (1) and paclitaxel.
FIG. 12 is a diagram showing the tumor growth suppressing effect in mice with subcutaneously transplanted JIMT-1 cells in single administration groups of an antibody-drug conjugate (1) and eribulin mesylate respectively, and a combined administration group of the antibody-drug conjugate (1) and eribulin mesylate.
FIG. 13 is a diagram showing the tumor growth suppressing effect in mice with subcutaneously transplanted NCI-N87 cells in single administration groups of an antibody-drug conjugate (1) and paclitaxel respectively, and a combined administration group of the antibody-drug conjugate (1) and paclitaxel.
FIG. 14 is a diagram showing the tumor growth suppressing effect in mice with subcutaneously transplanted NCI-N87 cells in single administration groups of an antibody-drug conjugate (1) and eribulin mesylate respectively, and a combined administration group of the antibody-drug conjugate (1) and eribulin mesylate.
FIG. 15 is a diagram showing the tumor growth suppressing effect in mice with subcutaneously transplanted MDA-MB-453 cells in single administration groups of an antibody-drug conjugate (1) and paclitaxel respectively, and a combined administration group of the antibody-drug conjugate (1) and paclitaxel.
FIG. 16 is a diagram showing the tumor growth suppressing effect in mice with subcutaneously transplanted SNU-1 cells in single administration groups of an antibody-drug conjugate (1) and paclitaxel respectively, and a combined administration group of the antibody-drug conjugate (1) and paclitaxel.
FIG. 17 is a diagram showing the tumor growth suppressing effect in mice with subcutaneously transplanted NCI-H441 cells in single administration groups of an antibody-drug conjugate (1) and paclitaxel respectively, and a combined administration group of the antibody-drug conjugate (1) and paclitaxel.
FIG. 18 is a diagram showing the amino acid sequence of a heavy chain of an anti-GPR20 antibody (SEQ ID NO: 9).

FIG. 19 is a diagram showing the amino acid sequence of a light chain of an anti-GPR20 antibody (SEQ ID NO: 10).

FIG. 20 is a diagram showing the amino acid sequence of a heavy chain of an anti-CDH6 antibody (SEQ ID NO: 11).

FIG. 21 is a diagram showing the amino acid sequence of a light chain of an anti-CDH6 antibody (SEQ ID NO: 12).

FIG. 22 is a diagram showing the tumor growth suppressing effect in mice with subcutaneously transplanted JIMT-1 cells in single administration groups of an antibody-drug conjugate (2) and paclitaxel respectively, and a combined administration group of the antibody-drug conjugate (2) and paclitaxel.

FIG. 23 is a diagram showing the tumor growth suppressing effect in mice with subcutaneously transplanted OV-90 cells in single administration groups of an antibody-drug conjugate (3) and paclitaxel respectively, and a combined administration group of the antibody-drug conjugate (3) and paclitaxel.

DESCRIPTION OF EMBODIMENTS

Hereinafter, preferred modes for carrying out the present invention are described. The embodiments described below are given merely for illustrating one example of a typical embodiment of the present invention and are not intended to limit the scope of the present invention.

1. Antibody-Drug Conjugate

The antibody-drug conjugate used in the present invention is an antibody-drug conjugate in which a drug-linker represented by the following formula:

to as a "drug-linker". The drug-linker is connected to a thiol group (in other words, the sulfur atom of a cysteine residue) formed at an interchain disulfide bond site (two sites between heavy chains, and two sites between a heavy chain and a light chain) in the antibody.

The drug-linker of the present invention includes exatecan (IUPAC name: (1S,9S)-1-amino-9-ethyl-5-fluoro-1,2,3,9,12,15-hexahydro-9-hydroxy-4-methyl-10H,13H-benzo[de]pyrano[3',4':6,7]indolizino[1,2-b]quinolin-10,13-dione, (also expressed as chemical name: (1S,9S)-1-amino-9-ethyl-5-fluoro-2,3-dihydro-9-hydroxy-4-methyl-1H,12H-benzo[de]pyrano[3',4':6,7]indolizino[1,2-b]quinolin-10,13(9H,15H)-dione)), which is a topoisomerase I inhibitor, as a component. Exatecan is a camptothecin derivative having an antitumor effect, represented by the following formula:

[Formula 18]

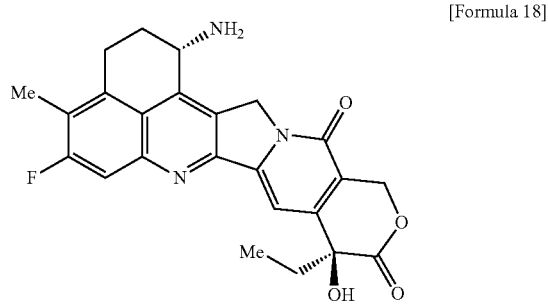 [SMILES: CC[C@@]1(O)C(=O)OCc2c1cc1n(c2=O)Cc2c-1nc1cc(F)c(C)c3c1c2[C@@H](N)CC3]

[Formula 17]

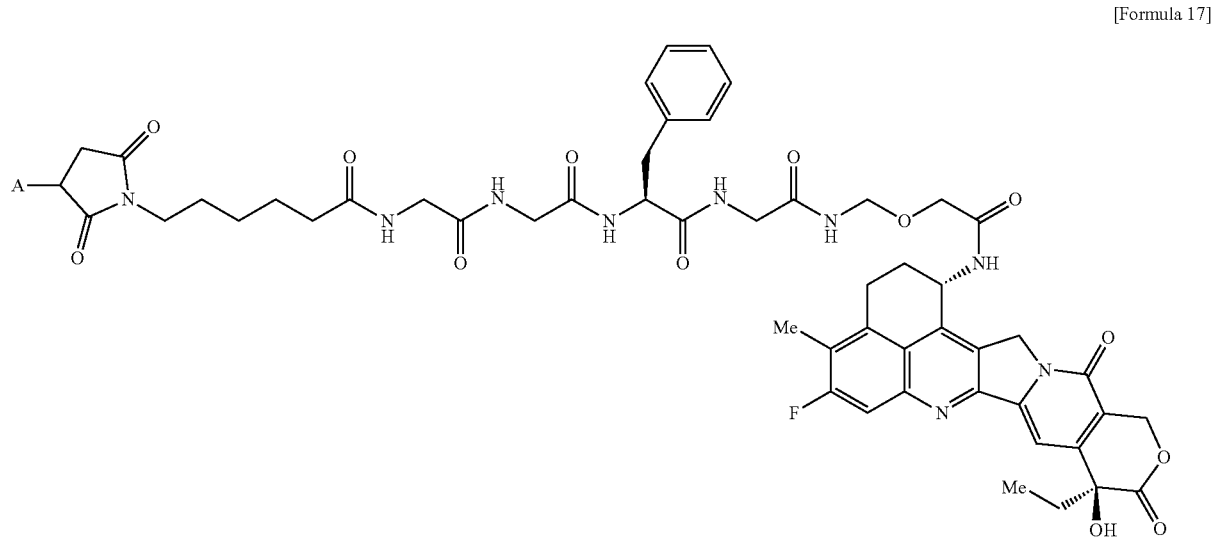

wherein A represents a connecting position to an antibody, is conjugated to the antibody via a thioether bond.

In the present invention, the partial structure consisting of a linker and a drug in the antibody-drug conjugate is referred The antibody-drug conjugate used in the present invention can also be represented by the following formula:

[Formula 19]

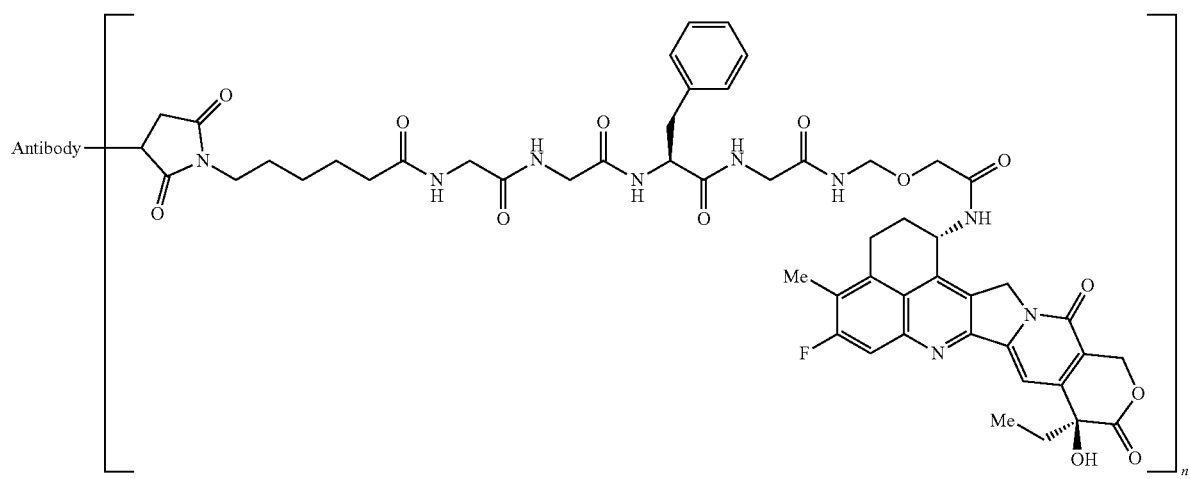

wherein, the drug-linker is conjugated to an antibody via a thioether bond. The meaning of n is the same as that of what is called the average number of conjugated drug molecules (DAR; Drug-to-Antibody Ratio), and indicates the average number of units of the drug-linker conjugated per antibody molecule.

After migrating into cancer cells, the antibody-drug conjugate used in the present invention is cleaved at the linker portion to release the compound represented by the following formula:

[Formula 20]

The aforementioned compound is inferred to be the original source of the antitumor activity of the antibody-drug conjugate used in the present invention, and has been confirmed to have a topoisomerase I inhibitory effect (Ogitani Y. et al., Clinical Cancer Research, 2016, October 15; 22 (20):5097-5108, Epub 2016 Mar. 29.)

Topoisomerase I is an enzyme that cleaves and rejoins single strands of DNA, thereby transforming the conformation of the DNA for participation in DNA synthesis. Therefore, agents with a topoisomerase I inhibitory effect can inhibit DNA synthesis, and thus arrest cell division at the S phase (DNA synthesis phase) of the cell cycle and induce cell death by apoptosis, thereby suppressing growth of cancer cells.

On the other hand, tubulin inhibitors affect microtubule dynamics, and thus arrest cell division at the $G_2$ phase (pre-mitotic gap phase) and/or M phase (mitotic phase) of the cell cycle and induce cell death via apoptosis, thereby suppressing growth of cancer cells (Dumontet C, et al., Nat Rev Drug Discov. 2010 October; 9 (10): 790-803.) (Mukhtar E, et al., Mol Cancer Ther. 2014 February: 13 (2): 275-284.)

Accordingly, the antibody-drug conjugate used in the present invention (which has an agent with topoisomerase I inhibitory effect as the original source of the antitumor activity) is administered in combination with a tubulin inhibitor, thereby arresting cell division at the S phase and $G_2$ phase and/or M phase of the cell cycle in multiple manners, thus enabling it to exert an excellent combined effect (antitumor effect).

The antibody-drug conjugate used in the present invention is also known to have a bystander effect (Ogitani Y. et al., Cancer Science (2016) 107, 1039-1046).

The bystander effect is exerted through a process such that the antibody-drug conjugate used in the present invention is internalized in cancer cells expressing the target and the aforementioned compound is released and then exerts an antitumor effect also on cancer cells which are present therearound and not expressing the target.

The bystander effect is also exerted as an excellent antitumor effect when the antibody-drug conjugate according to the present invention is used in combination with a tubulin inhibitor.

2. Antibody in the Antibody-Drug Conjugate

The antibody in the antibody-drug conjugate used in the present invention may be derived from any species, and is preferably an antibody derived from a human, a rat, a mouse, or a rabbit. In cases when the antibody is derived from species other than human species, it is preferably chimerized or humanized using a well-known technique. The antibody of the present invention may be a polyclonal antibody or a monoclonal antibody and is preferably a monoclonal antibody.

The antibody in the antibody-drug conjugate used in the present invention is an antibody preferably having the characteristic of being able to target cancer cells, and is preferably an antibody possessing, for example, the property of being able to recognize a cancer cell, the property of being able to bind to a cancer cell, the property of being internalized in a cancer cell, and/or cytocidal activity against cancer cells.

The binding activity of the antibody against cancer cells can be confirmed using flow cytometry. The internalization of the antibody into tumor cells can be confirmed using (1) an assay of visualizing an antibody incorporated in cells under a fluorescence microscope using a secondary antibody (fluorescently labeled) binding to the therapeutic antibody (Cell Death and Differentiation (2008) 15, 751-761), (2) an assay of measuring a fluorescence intensity incorporated in cells using a secondary antibody (fluorescently labeled) binding to the therapeutic antibody (Molecular Biology of the Cell, Vol. 15, 5268-5282, December 2004), or (3) a Mab-ZAP assay using an immunotoxin binding to the therapeutic antibody wherein the toxin is released upon incorporation into cells to inhibit cell growth (Bio Techniques 28: 162-165, January 2000). As the immunotoxin, a recombinant complex protein of a diphtheria toxin catalytic domain and protein G may be used.

The antitumor activity of the antibody can be confirmed in vitro by determining inhibitory activity against cell growth. For example, a cancer cell line overexpressing a target protein for the antibody is cultured, and the antibody is added at varying concentrations into the culture system to determine inhibitory activity against focus formation, colony formation, and spheroid growth. The antitumor activity can be confirmed in vivo, for example, by administering the antibody to a nude mouse with a transplanted cancer cell line highly expressing the target protein, and determining changes in the cancer cells.

Since the compound conjugated in the antibody-drug conjugate exerts an antitumor effect, it is preferred but not essential that the antibody itself should have an antitumor effect. For the purpose of specifically and selectively exerting the cytotoxic activity of the antitumor compound against cancer cells, it is important and also preferred that the antibody should have the property of being internalized to migrate into cancer cells.

The antibody in the antibody-drug conjugate used in the present invention can be obtained by a procedure known in the art. For example, the antibody of the present invention can be obtained using a method usually carried out in the art, which involves immunizing animals with an antigenic polypeptide and collecting and purifying antibodies produced in vivo. The origin of the antigen is not limited to humans, and the animals may be immunized with an antigen derived from a non-human animal such as a mouse, a rat and the like. In this case, the cross-reactivity of antibodies binding to the obtained heterologous antigen with human antigens can be tested to screen for an antibody applicable to a human disease.

Alternatively, antibody-producing cells which produce antibodies against the antigen can be fused with myeloma cells according to a method known in the art (for example, Kohler and Milstein, Nature (1975) 256, p.495-497; Kennet, R. ed., Monoclonal Antibodies, p.365-367, Plenum Press, N.Y. (1980)), to establish hybridomas, from which monoclonal antibodies can in turn be obtained.

The antigen can be obtained by genetically engineering host cells to produce a gene encoding the antigenic protein. Specifically, vectors that permit expression of the antigen gene are prepared and transferred to host cells so that the gene is expressed. The antigen thus expressed can be purified. The antibody can also be obtained by a method of immunizing animals with the above-described genetically engineered antigen-expressing cells or a cell line expressing the antigen.

The antibody in the antibody-drug conjugate used in the present invention is preferably a recombinant antibody obtained by artificial modification for the purpose of decreasing heterologous antigenicity to humans such as a chimeric antibody or a humanized antibody, or is preferably an antibody having only the gene sequence of an antibody derived from a human, that is, a human antibody. These antibodies can be produced using a known method.

As the chimeric antibody, an antibody in which antibody variable and constant regions are derived from different species, for example, a chimeric antibody in which a mouse- or rat-derived antibody variable region is connected to a human-derived antibody constant region can be exemplified (Proc. Natl. Acad. Sci. USA, 81, 6851-6855, (1984)).

As the humanized antibody, an antibody obtained by integrating only the complementarity determining region (CDR) of a heterologous antibody into a human-derived antibody (Nature (1986) 321, pp. 522-525), an antibody obtained by grafting a part of the amino acid residues of the framework of a heterologous antibody as well as the CDR sequence of the heterologous antibody to a human antibody by a CDR-grafting method (WO 90/07861), and an antibody humanized using a gene conversion mutagenesis strategy (U.S. Pat. No. 5,821,337) can be exemplified.

As the human antibody, an antibody generated by using a human antibody-producing mouse having a human chromosome fragment including genes of a heavy chain and a light chain of a human antibody (see Tomizuka, K. et al., Nature Genetics (1997) 16, p.133-143; Kuroiwa, Y. et. al., Nucl. Acids Res. (1998) 26, p.3447-3448; Yoshida, H. et. al., Animal Cell Technology: Basic and Applied Aspects vol. 10, p.69-73 (Kitagawa, Y., Matsuda, T. and Iijima, S. eds.), Kluwer Academic Publishers, 1999; Tomizuka, K. et. al., Proc. Natl. Acad. Sci. USA (2000) 97, p.722-727, etc.) can be exemplified. As an alternative, an antibody obtained by phage display, the antibody being selected from a human antibody library (see Wormstone, I. M. et. al, Investigative Ophthalmology & Visual Science. (2002) 43 (7), p.2301-2308; Carmen, S. et. al., Briefings in Functional Genomics and Proteomics (2002), 1 (2), p.189-203; Siriwardena, D. et. al., Ophthalmology (2002) 109 (3), p.427-431, etc.) can be exemplified.

In the antibody in the antibody-drug conjugate used in present invention, modified variants of the antibody are also included. The modified variant refers to a variant obtained by subjecting the antibody according to the present invention to chemical or biological modification. Examples of the chemically modified variant include variants including a linkage of a chemical moiety to an amino acid skeleton, variants including a linkage of a chemical moiety to an N-linked or O-linked carbohydrate chain, etc. Examples of the biologically modified variant include variants obtained by post-translational modification (such as N-linked or O-linked glycosylation, N- or C-terminal processing, deamidation, isomerization of aspartic acid, or oxidation of methionine), and variants in which a methionine residue has been added to the N terminus by being expressed in a prokaryotic host cell. Further, an antibody labeled so as to enable the detection or isolation of the antibody or an antigen according to the present invention, for example, an enzyme-labeled antibody, a fluorescence-labeled antibody, and an affinity-labeled antibody are also included in the meaning of the modified variant. Such a modified variant of the antibody according to the present invention is useful for improving the stability and blood retention of the antibody, reducing the antigenicity thereof, detecting or isolating an antibody or an antigen, and so on.

Further, by regulating the modification of a glycan which is linked to the antibody according to the present invention (glycosylation, defucosylation, etc.), it is possible to enhance antibody-dependent cellular cytotoxic activity. As the technique for regulating the modification of a glycan of antibodies, WO 99/54342, WO 00/61739, WO 02/31140, WO 2007/133855, WO 2013/120066, etc. are known. However, the technique is not limited thereto. In the antibody according to the present invention, antibodies in which the modification of a glycan is regulated are also included.

It is known that a lysine residue at the carboxyl terminus of the heavy chain of an antibody produced in a cultured mammalian cell is deleted (Journal of Chromatography A, 705: 129-134 (1995)), and it is also known that two amino acid residues (glycine and lysine) at the carboxyl terminus of the heavy chain of an antibody produced in a cultured mammalian cell are deleted and a proline residue newly located at the carboxyl terminus is amidated (Analytical Biochemistry, 360: 75-83 (2007)). However, such deletion and modification of the heavy chain sequence do not affect the antigen-binding affinity and the effector function (complement activation, antibody-dependent cellular cytotoxicity, etc.) of the antibody. Therefore, in the antibody according to the present invention, antibodies subjected to such modification and functional fragments of the antibody are also included, and deletion variants in which one or two amino acids have been deleted at the carboxyl terminus of the heavy chain, variants obtained by amidation of the deletion variants (for example, a heavy chain in which the carboxyl terminal proline residue has been amidated), and the like are also included. The type of deletion variant having a deletion at the carboxyl terminus of the heavy chain of the antibody according to the present invention is not limited to the above variants as long as the antigen-binding affinity and the effector function are conserved. The two heavy chains constituting the antibody according to the present invention may be of one type selected from the group consisting of a full-length heavy chain and the above-described deletion variant, or may be of two types in combination selected therefrom. The ratio of the amount of each deletion variant can be affected by the type of cultured mammalian cells which produce the antibody according to the present invention and the culture conditions; however, an antibody in which one amino acid residue at the carboxyl terminus has been deleted in both of the two heavy chains in the antibody according to the present invention can be preferably exemplified.

As isotypes of the antibody according to the present invention, for example, IgG (IgG1, IgG2, IgG3, IgG4) can be exemplified. Preferably, IgG1 or IgG2 can be exemplified.

Examples of antibodies in the antibody-drug conjugate used in the present invention can include, but are not particularly limited to, an anti-HER2 antibody, an anti-HER3 antibody, an anti-TROP2 antibody, an anti-B7-H3 antibody, an anti-CD3 antibody, an anti-CD30 antibody, an anti-CD33 antibody, an anti-CD37 antibody, an anti-CD56 antibody, an anti-CD98 antibody, an anti-DR5 antibody, an anti-EGFR antibody, an anti-EPHA2 antibody, an anti-FGFR2 antibody, an anti-FGFR4 antibody, an anti-FOLR1 antibody, an anti-VEGF antibody, an anti-CD20 antibody, an anti-CD22 antibody, an anti-CD70 antibody, an anti-PSMA antibody, an anti-CEA antibody, an anti-Mesothelin antibody, an anti-A33 antibody, an anti-CanAg antibody, an anti-Cripto antibody, an anti-$G_{250}$ antibody, an anti-MUC1 antibody, an anti-GPNMB antibody, an anti-Integrin antibody, an anti-Tenascin-C antibody, an anti-SLC44A4 antibody, an anti-GPR20 antibody, and an anti-CDH6 antibody. Further, an anti-HER2 antibody, an anti-HER3 antibody, an anti-TROP2 antibody, an anti-B7-H3 antibody, an anti-GPR20 antibody, and an anti-CDH6 antibody can be preferably exemplified.

In the present invention, the term "anti-HER2 antibody" refers to an antibody which binds specifically to HER2 (Human Epidermal Growth Factor Receptor Type 2; ErbB-2), and preferably has an activity of internalization in HER2-expressing cells by binding to HER2.

Examples of the anti-HER2 antibody include trastuzumab (U.S. Pat. No. 5,821,337) and pertuzumab (International Publication No. WO 01/00245). Preferably, trastuzumab can be exemplified.

In the present invention, the term "anti-HER3 antibody" refers to an antibody which binds specifically to HER3 (Human Epidermal Growth Factor Receptor Type 3; ErbB-3), and preferably has an activity of internalization in HER3-expressing cells by binding to HER3.

Examples of the anti-HER3 antibody include patritumab (U3-1287), U1-59 (International Publication No. WO 2007/077028), MM-121 (seribantumab), an anti-ERBB3 antibody described in International Publication No. WO 2008/100624, RG-7116 (lumretuzumab), and LJM-716 (elgemtumab). Preferably, patritumab and U1-59 can be exemplified.

In the present invention, the term "anti-TROP2 antibody" refers to an antibody which binds specifically to TROP2 (TACSTD2: Tumor-associated calcium signal transducer 2; EGP-1), and preferably has an activity of internalization in TROP2-expressing cells by binding to TROP2.

Examples of the anti-TROP2 antibody include hTINA1-H1L1 (International Publication No. WO 2015/098099).

In the present invention, the term "anti-B7-H3 antibody" refers to an antibody which binds specifically to B7-H3 (B cell antigen #7 homolog 3; PD-L3; CD276), and preferably has an activity of internalization in B7-H3-expressing cells by binding to B7-H3.

Examples of the anti-B7-H3 antibody include M30-H1-L4 (International Publication No. WO 2014/057687).

In the present invention, the term "anti-GPR20 antibody" refers to an antibody which binds specifically to GPR20 (G Protein-coupled receptor 20), and preferably has an activity of internalization in GPR20-expressing cells by binding to GPR20.

Examples of the anti-GPR20 antibody include h046-H4e/L7 (International Publication No. WO 2018/135501).

In the present invention, the term "anti-CDH6 antibody" refers to an antibody which binds specifically to CDH6 (Cadherin-6), and preferably has an activity of internalization in CDH6-expressing cells by binding to CDH6.

Examples of the anti-CDH6 antibody include H01L02 (International Publication No. WO 2018/212136).

3. Production of the Antibody-Drug Conjugate

A drug-linker intermediate for use in the production of the antibody-drug conjugate used in to the present invention is represented by the following formula.

[Formula 21]

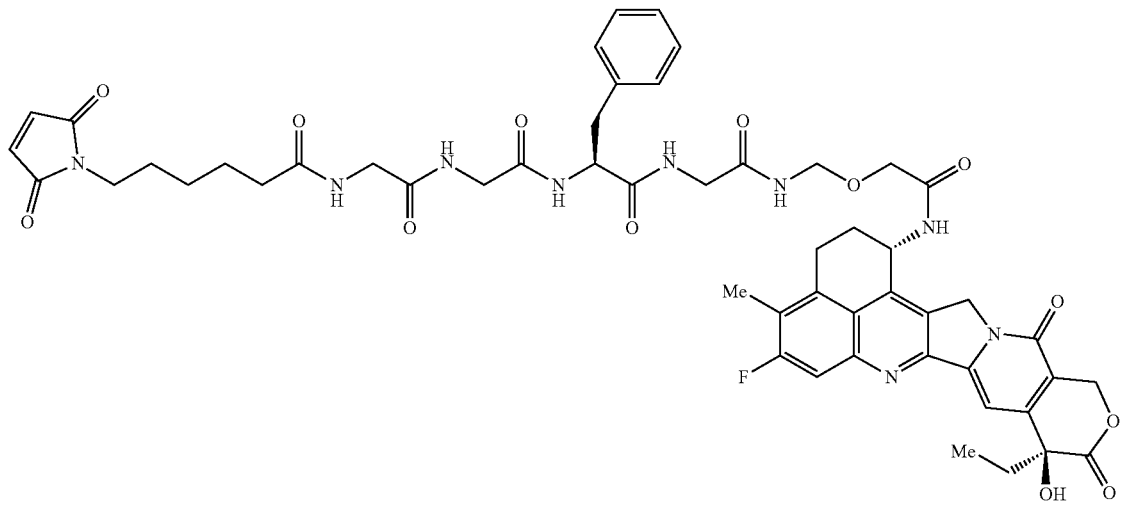

The drug-linker intermediate can be expressed as the chemical name N-[6-(2,5-dioxo-2,5-dihydro-1H-pyrrol-1-yl)hexanoyl]glycylglycyl-L-phenylalanyl-N-[(2-{[(1S,9S)-9-ethyl-5-fluoro-9-hydroxy-4-methyl-10,13-dioxo-2,3,9,10,13,15-hexahydro-1H,12H-benzo[de]pyrano[3',4':6,7]indolizino[1,2-b]quinolin-1-yl]amino}-2-oxoethoxy)methyl]glycinamide, and can be produced with reference to descriptions in International Publication No. WO 2014/057687, International Publication No. WO 2015/098099, International Publication No. WO 2015/115091, International Publication No. WO 2015/155998, International Publication No. WO 2019/044947, and so on.

The antibody-drug conjugate used in the present invention can be produced by reacting the above-described drug-linker intermediate and an antibody having a thiol group (alternatively referred to as a sulfhydryl group).

The antibody having a sulfhydryl group can be obtained by a method well known in the art (Hermanson, G. T, Bioconjugate Techniques, pp. 56-136, pp. 456-493, Academic Press (1996)). For example, by using 0.3 to 3 molar equivalents of a reducing agent such as tris(2-carboxyethyl) phosphine hydrochloride (TCEP) per interchain disulfide within the antibody and reacting with the antibody in a buffer solution containing a chelating agent such as ethylenediamine tetraacetic acid (EDTA), an antibody having a sulfhydryl group with partially or completely reduced interchain disulfides within the antibody can be obtained.

Further, by using 2 to 20 molar equivalents of the drug-linker intermediate per the antibody having a sulfhydryl group, an antibody-drug conjugate in which 2 to 8 drug molecules are conjugated per antibody molecule can be produced.

The average number of conjugated drug molecules per antibody molecule of the antibody-drug conjugate produced can be determined, for example, by a method of calculation based on measurement of UV absorbance for the antibody-drug conjugate and the conjugation precursor thereof at two wavelengths of 280 nm and 370 nm (UV method), or a method of calculation based on quantification through HPLC measurement for fragments obtained by treating the antibody-drug conjugate with a reducing agent (HPLC method).

Conjugation between the antibody and the drug-linker intermediate and calculation of the average number of conjugated drug molecules per antibody molecule of the antibody-drug conjugate can be performed with reference to descriptions in International Publication No. WO 2014/057687, International Publication No. WO 2015/098099, International Publication No. WO 2015/115091, International Publication No. WO 2015/155998, International Publication No. WO 2018/135501, International Publication No. WO 2018/212136, and so on.

In the present invention, the term "anti-HER2 antibody-drug conjugate" refers to an antibody-drug conjugate such that the antibody in the antibody-drug conjugate according to the invention is an anti-HER2 antibody.

The anti-HER2 antibody is preferably an antibody comprising a heavy chain consisting of an amino acid sequence consisting of amino acid residues 1 to 449 of SEQ ID NO: 1 and a light chain consisting of an amino acid sequence consisting of amino acid residues 1 to 214 of SEQ ID NO: 2; or an antibody comprising a heavy chain consisting of an amino acid sequence represented by SEQ ID NO: 1 and a light chain consisting of an amino acid sequence represented by SEQ ID NO: 2.

The average number of units of the drug-linker conjugated per antibody molecule in the anti-HER2 antibody-drug conjugate is preferably 2 to 8, more preferably 3 to 8, even more preferably 7 to 8, even more preferably 7.5 to 8, and even more preferably about 8.

The anti-HER2 antibody-drug conjugate can be produced with reference to descriptions in International Publication No. WO 2015/115091 and so on.

In the present invention, the term "anti-HER3 antibody-drug conjugate" refers to an antibody-drug conjugate such that the antibody in the antibody-drug conjugate according to the invention is an anti-HER3 antibody.

The anti-HER3 antibody is preferably an antibody comprising a heavy chain comprising CDRH1 consisting of an amino acid sequence consisting of amino acid residues 26 to 35 of SEQ ID NO: 3, CDRH2 consisting of an amino acid sequence consisting of amino acid residues 50 to 65 of SEQ ID NO: 3, and CDRH3 consisting of an amino acid sequence consisting of amino acid residues 98 to 106 of SEQ ID NO: 3, and a light chain comprising CDRL1 consisting of an amino acid sequence consisting of amino acid residues 24 to 39 of SEQ ID NO: 4, CDRL2 consisting of an amino acid sequence consisting of amino acid residues 56 to 62 of SEQ ID NO: 4, and CDRL3 consisting of an amino acid sequence consisting of amino acid residues 95 to 103 of SEQ ID NO: 4, more preferably an antibody comprising a heavy chain comprising a heavy chain variable region consisting of an amino acid sequence consisting of amino acid residues 1 to 117 of SEQ ID NO: 3, and a light chain comprising a light chain variable region consisting of an amino acid sequence consisting of amino acid residues 1 to 113 of SEQ ID NO: 4, and even more preferably an antibody comprising a heavy chain consisting of an amino acid sequence represented by SEQ ID NO: 3 and a light chain consisting of an amino acid sequence represented by SEQ ID NO: 4, or a variant of the antibody in which a lysine residue at the carboxyl terminus of the heavy chain is deleted.

The average number of units of the drug-linker conjugated per antibody molecule in the anti-HER3 antibody-drug conjugate is preferably 2 to 8, more preferably 3 to 8, even more preferably 7 to 8, even more preferably 7.5 to 8, and even more preferably about 8.

The anti-HER3 antibody-drug conjugate can be produced with reference to descriptions in International Publication No. WO 2015/155998 and so on.

In the present invention, the term "anti-TROP2 antibody-drug conjugate" refers to an antibody-drug conjugate such that the antibody in the antibody-drug conjugate according to the invention is an anti-TROP2 antibody.

The anti-TROP2 antibody is preferably an antibody comprising a heavy chain comprising CDRH1 consisting of an amino acid sequence consisting of amino acid residues 50 to 54 of SEQ ID NO: 5, CDRH2 consisting of an amino acid sequence consisting of amino acid residues 69 to 85 of SEQ ID NO: 5, and CDRH3 consisting of an amino acid sequence consisting of amino acid residues 118 to 129 of SEQ ID NO: 5, and a light chain comprising CDRL1 consisting of an amino acid sequence consisting of amino acid residues 44 to 54 of SEQ ID NO: 6, CDRL2 consisting of an amino acid sequence consisting of amino acid residues 70 to 76 of SEQ ID NO: 6, and CDRL3 consisting of an amino acid sequence consisting of amino acid residues 109 to 117 of SEQ ID NO: 6, more preferably an antibody comprising a heavy chain comprising a heavy chain variable region consisting of an amino acid sequence consisting of amino acid residues 20 to 140 of SEQ ID NO: 5, and a light chain comprising a light chain variable region consisting of an amino acid sequence consisting of amino acid residues 21 to 129 of SEQ ID NO: 6, and even more preferably an antibody comprising a heavy chain consisting of an amino acid sequence consisting of amino acid residues 20 to 470 of SEQ ID NO: 5 and a light chain consisting of an amino acid sequence consisting of amino acid residues 21 to 234 of SEQ ID NO: 6, or a variant of the antibody in which a lysine residue at the carboxyl terminus of the heavy chain is deleted.

The average number of units of the drug-linker conjugated per antibody molecule in the anti-TROP2 antibody-drug conjugate is preferably 2 to 8, more preferably 3 to 5, even more preferably 3.5 to 4.5, and even more preferably about 4.

The anti-TROP2 antibody-drug conjugate can be produced with reference to descriptions in International Publication No. WO 2015/098099 and so on.

In the present invention, the term "anti-B7-H3 antibody-drug conjugate" refers to an antibody-drug conjugate such that the antibody in the antibody-drug conjugate according to the invention is an anti-B7-H3 antibody.

The anti-B7-H3 antibody is preferably an antibody comprising a heavy chain comprising CDRH1 consisting of an amino acid sequence consisting of amino acid residues 50 to 54 of SEQ ID NO: 7, CDRH2 consisting of an amino acid sequence consisting of amino acid residues 69 to 85 of SEQ ID NO: 7, and CDRH3 consisting of an amino acid sequence consisting of amino acid residues 118 to 130 of SEQ ID NO: 7, and a light chain comprising CDRL1 consisting of an amino acid sequence consisting of amino acid residues 44 to 53 of SEQ ID NO: 8, CDRL2 consisting of an amino acid sequence consisting of amino acid residues 69 to 75 of SEQ ID NO: 8, and CDRL3 consisting of an amino acid sequence consisting of amino acid residues 108 to 116 of SEQ ID NO: 8, more preferably an antibody comprising a heavy chain comprising a heavy chain variable region consisting of an amino acid sequence consisting of amino acid residues 20 to 141 of SEQ ID NO: 7, and a light chain comprising a light chain variable region consisting of an amino acid sequence consisting of amino acid residues 21 to 128 of SEQ ID NO: 8, and even more preferably an antibody comprising a heavy chain consisting of an amino acid sequence consisting of amino acid residues 20 to 471 of SEQ ID NO: 7 and a light chain consisting of an amino acid sequence consisting of amino acid residues 21 to 233 of SEQ ID NO: 8, or a variant of the antibody in which a lysine residue at the carboxyl terminus of the heavy chain is deleted.

The average number of units of the drug-linker conjugated per antibody molecule in the anti-B7-H3 antibody-drug conjugate is preferably 2 to 8, more preferably 3 to 5, even more preferably 3.5 to 4.5, and even more preferably about 4.

The anti-B7-H3 antibody-drug conjugate used in the present invention can be produced with reference to descriptions in International Publication No. WO 2014/057687 and so on.

In the present invention, the term "anti-GPR20 antibody-drug conjugate" refers to an antibody-drug conjugate such that the antibody in the antibody-drug conjugate according to the invention is an anti-GPR20 antibody.

The anti-GPR20 antibody is preferably an antibody comprising a heavy chain comprising CDRH1 consisting of an amino acid sequence consisting of amino acid residues 45 to 54 of SEQ ID NO: 9, CDRH2 consisting of an amino acid sequence consisting of amino acid residues 69 to 78 of SEQ ID NO: 9, and CDRH3 consisting of an amino acid sequence consisting of amino acid residues 118 to 131 of SEQ ID NO: 9, and a light chain comprising CDRL1 consisting of an amino acid sequence consisting of amino acid residues 44 to 54 of SEQ ID NO: 10, CDRL2 consisting of an amino acid sequence consisting of amino acid residues 70 to 76 of SEQ ID NO: 10, and CDRL3 consisting of an amino acid sequence consisting of amino acid residues 109 to 117 of SEQ ID NO: 10, more preferably an antibody comprising a heavy chain comprising a heavy chain variable region consisting of an amino acid sequence consisting of amino acid residues 20 to 142 of SEQ ID NO: 9, and a light chain comprising a light chain variable region consisting of an amino acid sequence consisting of amino acid residues 21 to 129 of SEQ ID NO: 10, and even more preferably an antibody comprising a heavy chain consisting of an amino acid sequence consisting of amino acid residues 20 to 472 of SEQ ID NO: 9 and a light chain consisting of an amino acid sequence consisting of amino acid residues 21 to 234 of SEQ ID NO: 10, or a variant of the antibody in which a lysine residue at the carboxyl terminus of the heavy chain is deleted.

The average number of units of the drug-linker conjugated per antibody molecule in the anti-GPR20 antibody-drug conjugate is preferably 2 to 8, more preferably 3 to 8, even more preferably 7 to 8, even more preferably 7.5 to 8, and even more preferably about 8.

The anti-GPR20 antibody-drug conjugate can be produced with reference to descriptions in International Publication No. WO 2018/135501 and so on.

In the present invention, the term "anti-CDH6 antibody-drug conjugate" refers to an antibody-drug conjugate such that the antibody in the antibody-drug conjugate according to the invention is an anti-CDH6 antibody.

The anti-CDH6 antibody is preferably an antibody comprising a heavy chain comprising CDRH1 consisting of an amino acid sequence consisting of amino acid residues 45 to 54 of SEQ ID NO: 11, CDRH2 consisting of an amino acid sequence consisting of amino acid residues 69 to 78 of SEQ ID NO: 11, and CDRH3 consisting of an amino acid sequence consisting of amino acid residues 118 to 130 of SEQ ID NO: 11, and a light chain comprising CDRL1 consisting of an amino acid sequence consisting of amino acid residues 44 to 54 of SEQ ID NO: 12, CDRL2 consisting of an amino acid sequence consisting of amino acid residues 70 to 76 of SEQ ID NO: 12, and CDRL3 consisting of an amino acid sequence consisting of amino acid residues 109 to 116 of SEQ ID NO: 12, more preferably an antibody comprising a heavy chain comprising a heavy chain variable region consisting of an amino acid sequence consisting of amino acid residues 20 to 141 of SEQ ID NO: 11, and a light chain comprising a light chain variable region consisting of an amino acid sequence consisting of amino acid residues 21 to 128 of SEQ ID NO: 12, and even more preferably an antibody comprising a heavy chain consisting of an amino acid sequence consisting of amino acid residues 20 to 471 of SEQ ID NO: 11 and a light chain consisting of an amino acid sequence consisting of amino acid residues 21 to 233 of SEQ ID NO: 12, or a variant of the antibody in which a lysine residue at the carboxyl terminus of the heavy chain is deleted.

The average number of units of the drug-linker conjugated per antibody molecule in the anti-CDH6 antibody-drug conjugate is preferably 2 to 8, more preferably 3 to 8, even more preferably 7 to 8, even more preferably 7.5 to 8, and even more preferably about 8.

The anti-CDH6 antibody-drug conjugate can be produced with reference to descriptions in International Publication No. WO 2018/212136 and so on.

4. Tubulin Inhibitor

In the present invention, the term "tubulin inhibitor" refers to an agent that affects microtubule dynamics, and thus arrests cell division at the $G_2$ phase (pre-mitotic gap phase) and/or M phase (mitotic phase) of the cell cycle and induces cell death by apoptosis, thereby suppressing growth of cancer cells (Dumontet C, et al., Nat Rev Drug Discov. 2010 October; 9 (10): 790-803.) (Mukhtar E, et al., Mol Cancer Ther. 2014 February: 13 (2): 275-284).

Tubulin inhibitors include agents that promote tubulin polymerization, thereby affecting microtubule dynamics (referred to as "tubulin polymerization accelerator" in the present invention); and agents that inhibit tubulin polymerization, thereby affecting microtubule dynamics (referred to as "tubulin polymerization inhibitor" in the present invention).

Known tubulin polymerization accelerators include taxanes (such as paclitaxel, docetaxel, and cabazitaxel). Known tubulin polymerization inhibitors include halichondrins (such as eribulin), vinca alkaloids (such as vincristine, vinblastine, vinorelbine, and vindesine), dolastatins (such as MMAE and MMAF), and maytansinoids (such as DM1 and DM4). These agents and pharmacologically acceptable salts thereof can be used as the tubulin inhibitors in the present invention. Furthermore, a conjugate of any of these drugs to albumin (e.g., nab-paclitaxel, which is a conjugate of paclitaxel with albumin), and an antibody-drug conjugate in which any of these drugs is conjugated to an antibody via a linker (e.g., brentuximab vedotin, which is an antibody-drug conjugate in which MMAE is conjugated to an anti-CD30 antibody via a linker; trastuzumab emtansine, which is an antibody-drug conjugate in which DM1 is conjugated to an anti-HER2 antibody via a linker; CDX-011, which is an antibody-drug conjugate in which MMAE is conjugated to an anti-GPMNB antibody via a linker [International Publication No. WO 2006/071441 and the like]; IMGN-853, which is an antibody-drug conjugate in which DM4 is conjugated to an anti-FOLR1 antibody via a linker [International Publication No. WO 2017/049149 and the like]; RG-7596, which is an antibody-drug conjugate in which MMAE is conjugated to an anti-CD79b antibody via a linker [U.S. Patent Application Publication No. 2017/304438 and the like]; SAR-3419, which is an antibody-drug conjugate in which DM4 is conjugated to an anti-CD19 antibody via a linker [U.S. Patent Application Publication No. 2015/071949 and the like]; PSMA-ADC, which is an antibody-drug conjugate in which MMAE is conjugated to an anti-PSMA antibody via a linker [International Publication No. WO 2007/002222 and the like]; BT-062, which is an antibody-drug conjugate in which DM4 is conjugated to an anti-CD138 antibody via a linker [U.S. Patent Application Publication No. 2007/183971 and the like]; BAY-94-9343, which is an antibody-drug conjugate in which DM4 is conjugated to an anti-mesothelin antibody via a linker [International Publication No. WO 2010/124797 and the like]; SGN-CD19A, which is an antibody-drug conjugate in which MMAF is conjugated to an anti-CD19 antibody via a linker [International Publication No. WO 2009/052431 and the like]; AGS-16C3F, which is an antibody-drug conjugate in which MMAF is conjugated to an anti-ENPP3 antibody via a linker); and the like can also be used as the tubulin inhibitor in the present invention.

Among the tubulin inhibitors preferably used in the present invention, tubulin polymerization accelerators can be exemplified by taxanes or pharmacologically acceptable salts thereof, or a conjugate of taxanes to albumin; can be more preferably exemplified by paclitaxel, docetaxel, cabazitaxel, or a pharmacologically acceptable salt thereof, or nab-paclitaxel; can be even more preferably exemplified by paclitaxel, docetaxel trihydrate, or cabazitaxel acetonate, or nab-paclitaxel; and can be even more preferably exemplified by paclitaxel.

Among the tubulin inhibitors preferably used in the present invention, tubulin polymerization inhibitors can be exemplified by halichondrins, or a pharmacologically acceptable salt thereof, or an antibody-drug conjugate in which halichondrins is conjugated to an antibody via a linker; can be more preferably exemplified by eribulin, or a pharmacologically acceptable salt thereof, or an antibody-drug conjugate in which eribulin is conjugated to an antibody via a linker (e.g., MORAb-202, which is an antibody-drug conjugate in which eribulin is conjugated to an anti-FOLR1 antibody via a linker [U.S. Patent Application Publication No. 2017/252458 and the like]); and can be even more preferably exemplified by eribulin mesylate.

In the present invention, the term "pharmacologically acceptable salt" may be any of acid addition salts and base addition salts. Examples of the acid addition salts include lower alkanesulfonates such as camsylate (camphorsulfonate), mesylate (methanesulfonate), trifluoromethanesulfonate, and ethanesulfonate; arylsulfonates such as tosylate (p-toluenesulfonate) and benzenesulfonate; inorganic acid salts such as phosphate, nitrate, perchlorate, and sulfate; hydrohalides such as hydrochloride, hydrobromide, hydroiodide, and hydrofluoride; organic acid salts such as acetate, malate, fumarate, succinate, citrate, tartrate, oxalate, and maleate; and amino acid salts such as an ornithine salt, glutamate, and aspartate. Examples of the base addition salts include alkali metal salts such as a sodium salt, a potassium salt, and a lithium salt; alkaline earth metal salts such as a calcium salt and a magnesium salt; inorganic salts such as an ammonium salt; organic amine salts such as a dibenzylamine salt, a morpholine salt, a phenylglycine alkyl ester salt, ethylenediamine salt, an N-methylglucamine salt, a diethylamine salt, a triethylamine salt, a cyclohexylamine salt, a dicyclohexylamine salt, an N,N'-dibenzylethylenediamine salt, a diethanolamine salt, an N-benzyl-N-(2-phenylethoxy) amine salt, a piperazine salt, a tetramethylammonium salt, and a tris(hydroxymethyl)aminomethane salt; and amino acid salts such as an arginine salt.

Further, pharmacologically acceptable salts may exist as solvates, and these solvates are also included in the term "pharmacologically acceptable salt" according to the present invention. Examples of such solvates can include hydrates (for example, hemihydrate, monohydrate, dihydrate, trihydrate), ethanolate, and acetonate.

5. Medicament

Described in the following are a pharmaceutical composition and a method of treatment according to the present invention, wherein an antibody-drug conjugate and a tubulin inhibitor are administered in combination.

The pharmaceutical composition and method of treatment of the present invention may be those in which the antibody-drug conjugate and the tubulin inhibitor are separately contained as active components in different formulations and are administered simultaneously or at different times, or may be those in which the antibody-drug conjugate and the tubulin inhibitor are contained as active components in a single formulation and administered.

The pharmaceutical composition and method of treatment of the present invention can be used for treating cancer, and can be preferably used for treating at least one disease selected from the group consisting of breast cancer, gastric cancer (also called gastric adenocarcinoma), colorectal cancer (also called colon and rectal cancer, and including colon cancer and rectal cancer), lung cancer (including small cell lung cancer and non-small cell lung cancer), esophageal cancer, head-and-neck cancer (including salivary gland cancer and pharyngeal cancer), esophagogastric junction cancer, biliary tract cancer (including bile duct cancer), Paget's disease, pancreatic cancer, ovarian cancer, uterine carcinosarcoma, urothelial cancer, prostate cancer, bladder cancer, gastrointestinal stromal tumor, uterine cervix cancer, squamous cell carcinoma, peritoneal cancer, liver cancer, hepatocellular cancer, endometrial cancer, kidney cancer, vulval cancer, thyroid cancer, penis cancer, leukemia, malignant lymphoma, plasmacytoma, myeloma, glioblastoma multiforme, osteosarcoma, and melanoma; can be more preferably used for treating at least one cancer selected from the group consisting of breast cancer, gastric cancer, colorectal cancer, lung cancer, esophageal cancer, salivary gland cancer, esophagogastric junction adenocarcinoma, biliary tract cancer, Paget's disease, pancreatic cancer, ovarian cancer, bladder cancer, prostate cancer, and uterine carcinosarcoma; and can be even more preferably used for treating at least one cancer selected from the group consisting of breast cancer, gastric cancer, lung cancer, and ovarian cancer.

Among the antibody-drug conjugates used in the present invention, the kind of antibody preferably used in the antibody-drug conjugate can be determined by examining the type of cancer and tumor markers. For example, if HER2 expression is found in the cancer, an anti-HER2 antibody-drug conjugate can be preferably used; if HER3 expression is found in the cancer, an anti-HER3 antibody-drug conjugate can be preferably used; if TROP2 expression is found in the cancer, an anti-TROP2 antibody-drug conjugate can be preferably used; if B7-H3 expression is found in the cancer, an anti-B7-H3 antibody-drug conjugate can be preferably used; if GPR20 expression is found in the cancer, an anti-GPR20 antibody-drug conjugate can be preferably used; and if CDH6 expression is found in the cancer, an anti-CDH6 antibody-drug conjugate can be preferably used.

The presence or absence of HER2, HER3, TROP2, B7-H3, GPR20, and CDH6, and other tumor markers can be checked by, for example, collecting tumor tissue from a cancer patient, and subjecting the formalin-fixed paraffin-embedded specimen (FFPE) to an examination at a gene product (protein) level, such as an immunohistochemistry (IHC) method, a flow cytometry, a western blot method, or an examination at a gene transcription level such as an in situ hybridization method (ISH), a quantitative PCR method (q-PCR), or a microarray analysis; alternatively, it can also be checked by collecting cell-free blood circulating tumor DNA (ctDNA) from a cancer patient and subjecting to an examination which uses a method such as next generation sequencing (NGS).

The pharmaceutical composition and method of treatment of the present invention can be preferably used for mammals, and can be more preferably used for humans.

The antitumor effect of the pharmaceutical composition and method of treatment of the present invention can be confirmed by, for example, generating a model in which cancer cells are transplanted to a test animal, and measuring reduction in tumor volume, life-prolonging effects due to applying the pharmaceutical composition and method of treatment of the present invention. Furthermore, comparison with the antitumor effect of single administration of each of the antibody-drug conjugate and the tubulin inhibitor used in the present invention can provide confirmation of the combined effect of the antibody-drug conjugate and the tubulin inhibitor used in the present invention.

In addition, the antitumor effect of the pharmaceutical composition and method of treatment of the present invention can be confirmed, in a clinical study, with the Response Evaluation Criteria in Solid Tumors (RECIST) evaluation method, WHO's evaluation method, Macdonald's evaluation method, measurement of body weight, and other methods; and can be determined by indicators such as Complete response (CR), Partial response (PR), Progressive disease (PD), Objective response rate (ORR), Duration of response (DoR), Progression-free survival (PFS), and Overall survival (OS).

Further, the combined effect of the pharmaceutical composition and method of treatment of the present invention can also be determined based on variations in the expression level of a drug sensitivity factor and/or a drug resistance factor. For example, the expression level of the drug sensitivity factor and/or drug resistance factor is compared among respective single administrations of the antibody-drug conjugate used in the present invention and the tubulin inhibitor, combined administration thereof, and non-administration (control) to a test subject. Then, when it can be confirmed that the tubulin inhibitor suppresses decreased expression of a drug sensitivity factor caused by the administration of the antibody-drug conjugate used in the present invention, it can be determined that there is a combined effect of the antibody-drug conjugate and the tubulin inhibitor. Examples of such drug sensitivity factors include SLFN11. SLFN11 is known to be a sensitivity factor of a topoisomerase I inhibitor (Zoppoli G. et al., Proc Natl Acad Sci USA. 2012; 109 (39): 15030-5). Alternatively, when it can be confirmed that the tubulin inhibitor suppresses increased expression of a drug resistance factor caused by the administration of the antibody-drug conjugate used in the present invention, it can be determined that there is a combined effect of the antibody-drug conjugate and the tubulin inhibitor. Examples of such drug resistance factors include ABCG2. ABCG2 is known to be a resistance factor (transporter) of the drug which is released from the antibody-drug conjugate according to the present invention (Nagai Y. et al., Xenobiotica. 2019; 49 (9): 1086-96). The expression level of the drug sensitivity factor and/or drug resistance factor can be compared at the gene (RNA, etc.) level, and the expression level can also be compared at the protein level.

The foregoing methods can provide confirmation of superiority in terms of the antitumor effect of the pharmaceutical composition and method of treatment of the present invention compared to existing pharmaceutical compositions and methods of treatment for cancer therapy.

The pharmaceutical composition and method of treatment of the present invention can retard growth of cancer cells, suppress their proliferation, and further can kill cancer cells. These effects can allow cancer patients to be free from symptoms caused by cancer or can achieve an improvement in the QOL of cancer patients and attain a therapeutic effect by sustaining the lives of the cancer patients. Even if the pharmaceutical composition and method of treatment of the present invention do not accomplish the killing of cancer cells, they can achieve higher QOL of cancer patients while achieving longer-term survival, by inhibiting or controlling the growth of cancer cells.

The pharmaceutical composition of the present invention can be expected to exert a therapeutic effect by application as systemic therapy to patients, and additionally, by local application to cancer tissues.

The pharmaceutical composition of the present invention may be administered as a pharmaceutical composition containing at least one pharmaceutically suitable ingredient. The pharmaceutically suitable ingredient can be suitably selected and applied from formulation additives or the like that are generally used in the art, in view of the dosage, administration concentration or the like of the antibody-drug conjugate and the tubulin inhibitor used in the present invention. For example, the antibody-drug conjugate used in the present invention may be administered as a pharmaceutical composition containing a buffer such as a histidine buffer, an excipient such as sucrose or trehalose, and a surfactant such as polysorbate 80 or 20. The pharmaceutical composition containing the antibody-drug conjugate used in the present invention can be preferably used as an injection, can be more preferably used as an aqueous injection or a lyophilized injection, and can be even more preferably used as a lyophilized injection.

In the case that the pharmaceutical composition containing the antibody-drug conjugate used in the present invention is an aqueous injection, it can be preferably diluted with a suitable diluent and then given as an intravenous infusion. For the diluent, a dextrose solution, physiological saline, and the like, can be exemplified, and a dextrose solution can be preferably exemplified, and a 5% dextrose solution can be more preferably exemplified.

In the case that the pharmaceutical composition containing the antibody-drug conjugate used in the present invention is a lyophilized injection, it can be preferably dissolved in water for injection, subsequently a required amount can be diluted with a suitable diluent and then given as an intravenous infusion. For the diluent, a dextrose solution, physiological saline, and the like, can be exemplified, and a dextrose solution can be preferably exemplified, and a 5% dextrose solution can be more preferably exemplified.

Examples of the administration route which may be used to administer the pharmaceutical composition of the present invention include intravenous, intradermal, subcutaneous, intramuscular, and intraperitoneal routes; and preferably include an intravenous route.

The antibody-drug conjugate used in the present invention can be administered to a human once at intervals of 1 to 180 days, and can be preferably administered once a week, once every 2 weeks, once every 3 weeks, or once every 4 weeks, and can be even more preferably administered once every 3 weeks. Also, the antibody-drug conjugate used in the present invention can be administered at a dose of about 0.001 to 100 mg/kg, and can be preferably administered at a dose of 0.8 to 12.4 mg/kg. In the case that the antibody-drug conjugate used in the present invention is an anti-HER2 antibody-drug conjugate, it can be preferably administered once every 3 weeks at a dose of 0.8 mg/kg, 1.6 mg/kg, 3.2 mg/kg, 5.4 mg/kg, 6.4 mg/kg, 7.4 mg/kg, or 8 mg/kg. In the case that the antibody-drug conjugate used in the present invention is an anti-HER3 antibody-drug conjugate, it can be preferably administered once every 3 weeks at a dose of 1.6 mg/kg, 3.2 mg/kg, 4.8 mg/kg, 5.6 mg/kg, 6.4 mg/kg, 8.0 mg/kg, 9.6 mg/kg, or 12.8 mg/kg. In the case that the antibody-drug conjugate used in the present invention is an anti-TROP2 antibody-drug conjugate, it can be preferably administered once every 3 weeks at a dose of 0.27 mg/kg, 0.5 mg/kg, 1.0 mg/kg, 2.0 mg/kg, 4.0 mg/kg, 6.0 mg/kg, or 8.0 mg/kg.

The tubulin inhibitor according to the present invention can be administered to a human once at intervals of 1 to 180 days, and can be preferably administered once a week, once every 2 weeks, once every 3 weeks, or once every 4 weeks. Also, the tubulin inhibitor according to the present invention can be administered at a dose of about 0.001 to 100 mg/kg. In the case that the tubulin inhibitor according to the present invention is paclitaxel, it can be preferably intravenously administered (by infusion) once a week or once every 3 weeks at a dose of 100, 125, 135, 175, or 260 mg/m$^2$ (body surface area). If it is administered once a week, the fourth week after 3-weeks of continuous administration is a drug holiday. In the case that the tubulin inhibitor according to the present invention is eribulin mesylate, it can be preferably intravenously administered once a week at a dose of 1.4 mg/m$^2$ (body surface area), and the third week after 2-weeks of continuous administration is a drug holiday.

The pharmaceutical composition and method of treatment of the present invention may further contain a cancer therapeutic agent other than the antibody-drug conjugate and the tubulin inhibitor according to the present invention. The pharmaceutical composition and method of treatment of the present invention can also be administered in combination with another cancer therapeutic agent, thereby enhancing the antitumor effect. Other cancer therapeutic agents to be used for such purpose may be administered to a subject simultaneously with, separately from, or sequentially with the pharmaceutical composition of the present invention, or may be administered while varying the dosage interval for each. Such cancer therapeutic agents are not limited as long as they are agents having antitumor activity, and can be exemplified by at least one selected from the group consisting of irinotecan (CPT-11), cisplatin, carboplatin, oxaliplatin, fluorouracil (5-FU), gemcitabine, capecitabine, doxorubicin, epirubicin, cyclophosphamide, mitomycin C, tegafur-gimeracil-oteracil combination, cetuximab, panitumumab, bevacizumab, ramucirumab, regorafenib, trifluridine-tipiracil combination, gefitinib, erlotinib, afatinib, methotrexate, pemetrexed, tamoxifen, toremifene, fulvestrant, leuprorelin, goserelin, letrozole, anastrozole, progesterone formulation, trastuzumab, pertuzumab, and lapatinib.

The pharmaceutical composition and method of treatment of the present invention can also be used in combination with radiotherapy. For example, a cancer patient may receive radiotherapy before and/or after or simultaneously with receiving therapy with the pharmaceutical composition of the present invention.

The pharmaceutical composition and method of treatment of the present invention can also be used as an adjuvant chemotherapy in combination with a surgical procedure. The pharmaceutical composition of the present invention may be administered for the purpose of diminishing the size of a tumor before a surgical procedure (referred to as preoperative adjuvant chemotherapy or neoadjuvant therapy), or may be administered after a surgical procedure for the purpose of preventing the recurrence of a tumor (referred to as post-operative adjuvant chemotherapy or adjuvant therapy).

EXAMPLES

The present invention is specifically described in view of the examples shown below. However, the present invention is not limited to these. Further, it is by no means to be interpreted in a limited way.

Example 1: Production of the Antibody-Drug Conjugate

In accordance with a production method described in International Publication No. WO 2015/115091 with use of a humanized anti-HER2 antibody (an antibody comprising a heavy chain consisting of an amino acid sequence consisting of amino acid residues 1 to 449 of SEQ ID NO: 1 and a light chain consisting of an amino acid sequence consisting of amino acid residues 1 to 214 of SEQ ID NO: 2), an antibody-drug conjugate in which a drug-linker represented by the following formula:

[Formula 22]

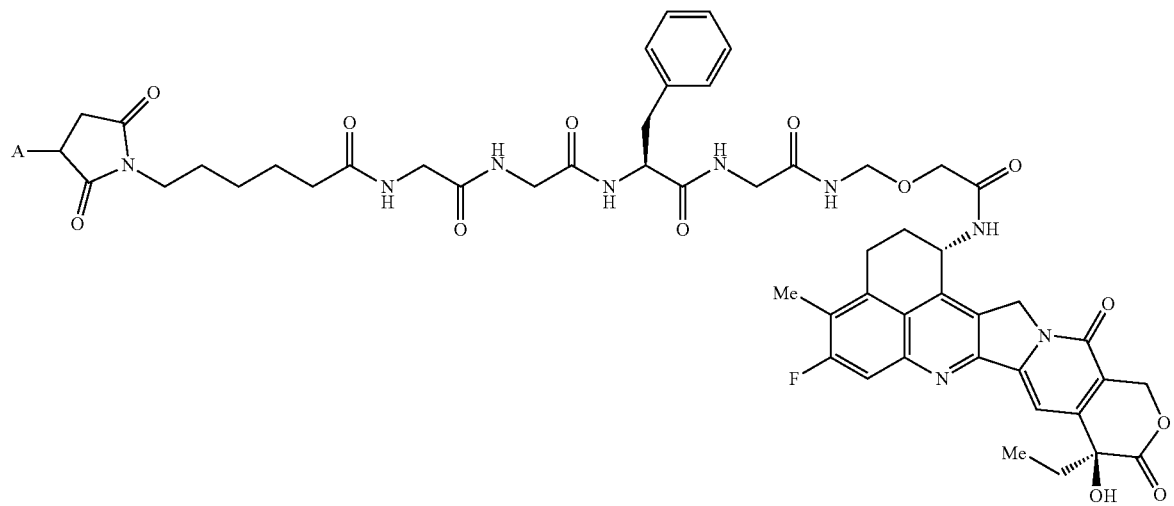

wherein A represents a connecting position to an antibody, is conjugated to the anti-HER2 antibody via a thioether bond (hereinafter referred to as the "antibody-drug conjugate (1)") was produced. The DAR of the antibody-drug conjugate (1) is 7.7 or 7.8.

Example 2: Antitumor Study (1)

Mouse: Female 5-6-week-old BALB/c nude mice (CHARLES RIVER LABORATORIES JAPAN, INC.) were subjected to the experiments.

Measurement and calculation formula: In all studies, the major axis and minor axis of tumors were measured twice a week with an electronic digital caliper (CD15-CX, Mitutoyo Corp.), and the tumor volume (mm$^3$) was calculated. The calculation formula is as shown below.

Tumor volume$(mm^3)=\frac{1}{2}\times$Major axis$(mm)\times$[Minor axis $(mm)]^2$ The antibody-drug conjugate (1) was diluted with ABS buffer (10 mM acetate buffer [pH 5.5], 5% sorbitol), and intravenously administered in a fluid volume of 10 mL/kg to the tail vein. Paclitaxel was dissolved with cremophor and ethanol (1:1), diluted with physiological saline, and then intravenously administered to the tail vein in a fluid volume of 10 or 20 mL/kg. Eribulin mesylate was diluted with physiological saline, and intravenously administered to the tail vein in a fluid volume of 10 mL/kg.

Human breast cancer cell line KPL-4, which was obtained from Dr. Junichi Kurebayashi in Kawasaki Medical School [British Journal of Cancer, (1999) 79 (5/6). 707-717], was suspended into physiological saline, subcutaneously transplanted at $1.5 \times 10^7$ cells into the right side of female nude mice, and the mice were randomly grouped 17 days after the transplantation (Day 0). The antibody-drug conjugate (1) (DAR: 7.8) was intravenously administered to the tail vein at a dose of 7.5 mg/kg on Day 0. Paclitaxel was intravenously administered to the tail vein at a dose of 15 mg/kg on Day 0 and Day 7, and eribulin mesylate was intravenously administered to the tail vein at a dose of 0.8 mg/kg on Day 0 and Day 4. Single administration groups of each drug, a combined administration group, and a solvent administration group as a control group were set up.

Results of a combination of the antibody-drug conjugate (1) and paclitaxel are shown in FIG. 9. Single administration of paclitaxel showed a tumor growth inhibition (TGI) of 48% in the last day of the study. Single administration of the antibody-drug conjugate (1) showed TGI of 87%. On the other hand, combined administration of the antibody-drug conjugate (1) and paclitaxel exhibited a significantly superior tumor growth suppression effect than single administration of paclitaxel ($P<0.01$ [calculated by Dunnett's test; the same applies hereinafter]), and also exhibited a significantly superior tumor growth suppression effect than single administration of the antibody-drug conjugate (1) ($P<0.05$); the combined effect was so strong that all cases exhibited disappearance of tumor (TGI, 100%). Here, in the Figure, the abscissa axis represents days after cell transplantation, and the longitudinal axis represents tumor volume. In addition, none of the single and combined administration groups exhibited any particular notable finding such as weight loss. Incidentally, in the following evaluation examples relating to antitumor studies, unless otherwise described, the studies are performed by the procedure used in this evaluation example.

Results of a combination of the antibody-drug conjugate (1) and eribulin mesylate are shown in FIG. 10. Single administration of eribulin mesylate showed TGI of 91%. Single administration of the antibody-drug conjugate (1) showed TGI of 87%. On the other hand, combined administration of the antibody-drug conjugate (1) and eribulin mesylate exhibited a significantly superior tumor growth suppression effect than single administration of eribulin mesylate ($P<0.05$), and also exhibited a significantly superior tumor growth suppression effect than single administration of the antibody-drug conjugate (1) ($P<0.05$); the combined effect was so strong that all cases exhibited disappearance of tumor (TGI, 100%). Here, in the Figure, the abscissa axis represents days after cell transplantation, and the longitudinal axis represents tumor volume. In addition, none of the single and combined administration groups exhibited any particular notable finding such as weight loss.

Example 3: Antitumor Study (2)

Human breast cancer cell line JIMT-1, which was purchased from DSMZ (Deutsche Sammlung von Mikroorganismen und Zellkulturen GmbH), was suspended into physiological saline, subcutaneously transplanted at $5 \times 10^6$ cells into the right side of female nude mice, and the mice were randomly grouped 13 days after the transplantation (Day 0). The antibody-drug conjugate (1) (DAR: 7.7) was intravenously administered to the tail vein at a dose of 10 mg/kg on Day 0. Paclitaxel was intravenously administered to the tail vein at a dose of 15 mg/kg on Day 0, Day 7 and Day 14. Eribulin mesylate was intravenously administered to the tail vein at a dose of 0.8 mg/kg on Day 0 and Day 3. Single administration groups of each drug, a combined administration group, and a solvent administration group as a control group were set up.

Results of a combination of the antibody-drug conjugate (1) and paclitaxel are shown in FIG. 11. Single administration of paclitaxel showed TGI of 30%. Single administration of the antibody-drug conjugate (1) showed TGI of 73%. On the other hand, combined administration of the antibody-drug conjugate (1) and paclitaxel exhibited a significantly superior tumor growth suppression effect than single administration of paclitaxel ($P<0.001$), and also exhibited a significantly superior tumor growth suppression effect than single administration of the antibody-drug conjugate (1) ($P<0.001$); TGI was 97%. In addition, none of the single and combined administration groups exhibited any particular notable finding such as weight loss.

Results of a combination of the antibody-drug conjugate (1) and eribulin mesylate are shown in FIG. 12. Single administration of eribulin mesylate showed TGI of 73%. Single administration of the antibody-drug conjugate (1) showed TGI of 73%. On the other hand, combined administration of the antibody-drug conjugate (1) and eribulin mesylate exhibited a significantly superior tumor growth suppression effect than single administration of eribulin mesylate ($P<0.05$), and also exhibited a significantly superior tumor growth suppression effect than single administration of the antibody-drug conjugate (1) ($P<0.001$); TGI was 97%. In addition, none of the single and combined administration groups exhibited any particular notable finding such as weight loss.

Example 4: Antitumor Study (3)

Human gastric cancer cell line NCI-N87, which was purchased from ATCC (American Type Culture Collection), was suspended into physiological saline, subcutaneously transplanted at $1 \times 10^7$ cells into the right side of female nude mice, and the mice were randomly grouped 6 days after the transplantation (Day 0). The antibody-drug conjugate (1) (DAR: 7.8) was intravenously administered to the tail vein at a dose of 1 mg/kg on Day 0. Paclitaxel was intravenously administered to the tail vein at a dose of 15 mg/kg on Day 0 and Day 7. Eribulin mesylate was intravenously administered to the tail vein at a dose of 0.4 mg/kg on Day 0 and Day 4. Single administration groups of each drug, a combined administration group, and a solvent administration group as a control group were set up.

Results of a combination of the antibody-drug conjugate (1) and paclitaxel are shown in FIG. 13. Single administration of paclitaxel showed TGI of 50%. Single administration of the antibody-drug conjugate (1) showed TGI of 45%. On the other hand, combined administration of the antibody-drug conjugate (1) and paclitaxel exhibited a significantly superior tumor growth suppression effect than single administration of paclitaxel ($P<0.001$), and also exhibited a significantly superior tumor growth suppression effect than single administration of the antibody-drug conjugate (1) ($P<0.001$); TGI was 82%. In addition, none of the single and combined administration groups exhibited any particular notable finding such as weight loss.

Results of a combination of the antibody-drug conjugate (1) and eribulin mesylate are shown in FIG. 14. Single administration of eribulin mesylate showed TGI of 64%. Single administration of the antibody-drug conjugate (1) showed TGI of 45%. On the other hand, combined administration of the antibody-drug conjugate (1) and eribulin mesylate exhibited a significantly superior tumor growth suppression effect than single administration of eribulin mesylate (P<0.01), and also exhibited a significantly superior tumor growth suppression effect than single administration of the antibody-drug conjugate (1) (P<0.001); TGI was 77%. In addition, none of the single and combined administration groups exhibited any particular notable finding such as weight loss.

Example 5: Antitumor Study (4)

Human breast cancer cell line MDA-MB-453, which was purchased from ATCC, was suspended into Matrigel basal membrane matrix (Matrigel), subcutaneously transplanted at $1\times10^7$ cells into the right side of female nude mice, and the mice were randomly grouped 7 days after the transplantation (Day 0). The antibody-drug conjugate (1) (DAR: 7.8) was intravenously administered to the tail vein at a dose of 0.5 mg/kg on Day 0. Paclitaxel was intravenously administered to the tail vein at a dose of 15 mg/kg on Day 0 and Day 7. Single administration groups of each drug, a combined administration group, and a solvent administration group as a control group were set up.

Results of a combination of the antibody-drug conjugate (1) and paclitaxel are shown in FIG. 15. Single administration of paclitaxel showed TGI of 96%. Single administration of the antibody-drug conjugate (1) showed TGI of 75%. On the other hand, combined administration of the antibody-drug conjugate (1) and paclitaxel exhibited a significantly superior tumor growth suppression effect than single administration of the antibody-drug conjugate (1) (P<0.01); TGI was 100%. In addition, none of the single and combined administration groups exhibited any particular notable finding such as weight loss.

Example 6: Antitumor Study (5)

Human gastric cancer cell line SNU-1, which was purchased from ATCC, was suspended into Matrigel, subcutaneously transplanted at $1\times10^7$ cells into the right side of female nude mice, and the mice were randomly grouped 28 days after the transplantation (Day 0). The antibody-drug conjugate (1) (DAR: 7.8) was intravenously administered to the tail vein at a dose of 10 mg/kg on Day 0. Paclitaxel was intravenously administered to the tail vein at a dose of 15 mg/kg on Day 0 and Day 7. Single administration groups of each drug, a combined administration group, and a solvent administration group as a control group were set up.

Results of a combination of the antibody-drug conjugate (1) and paclitaxel are shown in FIG. 16. Single administration of paclitaxel showed TGI of 58%. Single administration of the antibody-drug conjugate (1) showed TGI of 79%. On the other hand, combined administration of the antibody-drug conjugate (1) and paclitaxel exhibited a significantly superior tumor growth suppression effect than single administration of paclitaxel (P<0.01); TGI was 87%. In addition, none of the single and combined administration groups exhibited any particular notable finding such as weight loss.

Example 7: Antitumor Study (6)

Human lung cancer cell line NCI-H441, which was purchased from ATCC, was suspended into Matrigel, subcutaneously transplanted at $5\times10^6$ cells into the right side of female nude mice, and the mice were randomly grouped 7 days after the transplantation (Day 0). The antibody-drug conjugate (1) (DAR: 7.8) was intravenously administered to the tail vein at a dose of 10 mg/kg on Day 0. Paclitaxel was intravenously administered to the tail vein at a dose of 15 mg/kg on Day 0 and Day 7. Single administration groups of each drug, a combined administration group, and a solvent administration group as a control group were set up.

Results of a combination of the antibody-drug conjugate (1) and paclitaxel are shown in FIG. 17. Single administration of paclitaxel showed TGI of 55%. Single administration of the antibody-drug conjugate (1) showed TGI of 92%. On the other hand, combined administration of the antibody-drug conjugate (1) and paclitaxel exhibited a significantly superior tumor growth suppression effect than single administration of paclitaxel (P<0.001), and also exhibited a significantly superior tumor growth suppression effect than single administration of the antibody-drug conjugate (1) (P<0.01); TGI was 99%. None of the single and combined administration groups exhibited any particular notable finding such as weight loss.

Example 8: Production of the Antibody-Drug Conjugate (2)

In accordance with a production method described in International Publication No. WO 2015/155998 with use of an anti-HER3 antibody (an antibody comprising a heavy chain consisting of an amino acid sequence represented by SEQ ID NO: 3 and a light chain consisting of an amino acid sequence represented by SEQ ID NO: 4), an antibody-drug conjugate in which a drug-linker represented by the following formula:

[Formula 23]

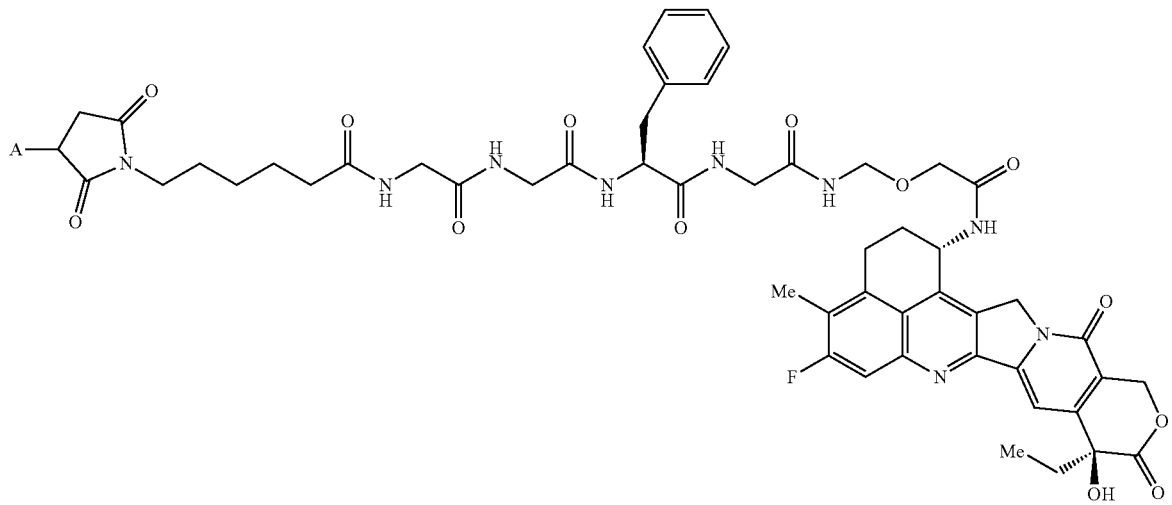

wherein A represents a connecting position to an antibody, is conjugated to the anti-HER3 antibody via a thioether bond (hereinafter referred to as "antibody-drug conjugate (2)") was produced. The DAR of the antibody-drug conjugate (2) is 7.6.

Example 9: Production of the Antibody-Drug Conjugate (3)

In accordance with a production method described in International Publication No. WO 2018/212136 with use of an anti-CDH6 antibody (an antibody comprising a heavy chain consisting of an amino acid sequence consisting of amino acid residues 20 to 471 of SEQ ID NO: 11 and a light chain consisting of an amino acid sequence consisting of amino acid residues 21 to 233 of SEQ ID NO: 12), an antibody-drug conjugate in which a drug-linker represented by the following formula:

is conjugated to the anti-CDH6 antibody via a thioether bond (hereinafter referred to as "antibody-drug conjugate (3)") was produced. The DAR of the antibody-drug conjugate (3) is 7.8.

Example 10: Antitumor Study (7)

Human breast cancer cell line JIMT-1, which was purchased from DSMZ, was suspended into physiological saline, subcutaneously transplanted at $5 \times 10^6$ cells into the right side of female nude mice, and the mice were randomly grouped 10 days after the transplantation (Day 0). The antibody-drug conjugate (2) (DAR: 7.6) was intravenously administered to the tail vein at a dose of 10 mg/kg on Day 0, Day 7, and Day 14. Paclitaxel was intravenously administered to the tail vein at a dose of 15 mg/kg on Day 0 and Day 7. Single administration groups of each drug, a com-

[Formula 24]

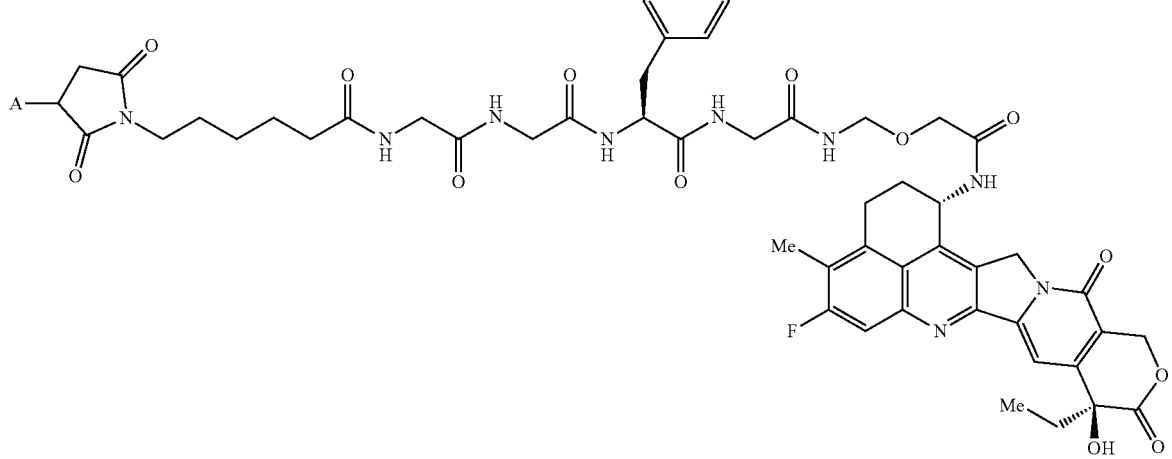

wherein A represents a connecting position to an antibody, bined administration group, and a solvent administration group as a control group were set up.

Results of a combination of the antibody-drug conjugate (2) and paclitaxel are shown in FIG. 22. Single administration of paclitaxel showed TGI of 36%. Single administration of the antibody-drug conjugate (2) showed TGI of 69%. On the other hand, combined administration of the antibody-drug conjugate (2) and paclitaxel exhibited a significantly superior tumor growth suppression effect than single administration of paclitaxel (P<0.001), and also exhibited a significantly superior tumor growth suppression effect than single administration of the antibody-drug conjugate (2) (P<0.001); TGI was 97%. None of the single and combined administration groups exhibited any particular notable finding such as weight loss.

Example 11: Antitumor Study (8)

Human ovarian cancer cell line OV-90, which was purchased from ATCC, was suspended into Matrigel, subcutaneously transplanted at $2.5 \times 10^6$ cells into the right side of female nude mice, and the mice were randomly grouped 15 days after the transplantation (Day 0). The antibody-drug conjugate (3) (DAR: 7.8) was intravenously administered to the tail vein at a dose of 10 mg/kg on Day 0. Paclitaxel was intravenously administered to the tail vein at a dose of 15 mg/kg on Day 0, Day 7, and Day 14. Single administration groups of each drug, a combined administration group, and a solvent administration group as a control group were set up.

Results of a combination of the antibody-drug conjugate (3) and paclitaxel are shown in FIG. 23. Single administration of paclitaxel on Day 17 showed TGI of 80%; single administration of the antibody-drug conjugate (3) showed TGI of 97%; and combined administration of the antibody-drug conjugate (3) and paclitaxel showed TGI of 99%. Further, combined administration of the antibody-drug conjugate (3) and paclitaxel exhibited a significantly superior tumor growth suppression effect than single administration of paclitaxel (P<0.001) on Day 27. It also exhibited a significantly superior tumor growth suppression effect than single administration of the antibody-drug conjugate (3) (P<0.01 (calculated by the Student's t-test)) on Day 38. In addition, none of the single and combined administration groups exhibited any particular notable finding such as weight loss.

Example 12: RNA Expression Analysis

Human breast cancer cell line JIMT-1 is transplanted into nude mice, and single administration groups of the antibody-drug conjugate (1), paclitaxel, or eribulin mesylate, combined administration groups of the antibody-drug conjugate (1) and paclitaxel or the antibody-drug conjugate (1) and eribulin mesylate, and a control group are set up. Tumors are sampled before and after drug administration, and used in RNA expression analysis. After weight measurement, the tumors are incubated overnight in RNAlater RNA Stabilization Reagent, and stored at −80° C. after RNAlater removal. RNA is extracted through QIACube using RNeasy Mini Kit (Qiagen N.V.), and a library is prepared from the obtained RNA using NEBNext Poly(A) mRNA Magnetic Module and NEBNext Ultra RNA Library Prep Kit for Illumina. The library is analyzed in Illumina NextSeq 500 or 550 sequencer using Illumina NextSeq 500/550 High Output Kit v2.5 to output base call files. The obtained base call files are converted to fastq files using bcl2fastq ver. 2.20.0.422. The reads of the fastq files are aligned against the reference sequences of transcripts based on human reference genome GRCh37 assembly using STAR ver. 2.5.3a15, and the number of reads of each gene is estimated with RSEM ver. 1.3.016. Gene expression levels are indicated by normalized Transcripts Per Kilobase Million (TPM) values by the inter-sample median ratio normalization method using EBSeq ver. 1.22.0.

It is confirmed that the average TPM value of the SLFN11 gene after single administration of the antibody-drug conjugate (1) shows a lower value than that in the tumors of the control group. Further, it is confirmed that the average TPM value of the SLFN11 gene after combined administration of the antibody-drug conjugate (1) and paclitaxel or after combined administration of the antibody-drug conjugate (1) and eribulin mesylate shows a higher value than that after single administration of the antibody-drug conjugate (1).

Further, it is confirmed that the average TPM value of the ABCG2 gene after single administration of the antibody-drug conjugate (1) shows a higher value than that in the tumors of the control group. Further, it is confirmed that the average TPM value of the ABCG2 gene after combined administration of the antibody-drug conjugate (1) and paclitaxel or after combined administration of the antibody-drug conjugate (1) and eribulin mesylate shows a lower value than that after single administration of the antibody-drug conjugate (1).

Example 13: Protein Expression Analysis

Human breast cancer cell line JIMT-1 is transplanted into nude mice, and single administration groups of the antibody-drug conjugate (1), paclitaxel, or eribulin mesylate, combined administration groups of the antibody-drug conjugate (1) and paclitaxel or the antibody-drug conjugate (1) and eribulin mesylate, and a control group are set up. Tumors are sampled before and after drug administration, and used in protein expression analysis. The tumors excised from the mice are homogenized and lysed in RIPA buffer, and supernatants after centrifugation are recovered as tumor lysates. SLFN11 protein expression and β-Actin expression in the obtained tumor lysates are detected using Simple Western Systems (Wes or Peggy Sue), and peak area values are calculated using Compass for SW ver. 4.0.0. The SLFN11 protein expression level ratio of each tumor lysate is calculated according to the following expression.

SLFN11 protein expression level ratio=(Peak area value of the SLFN11 protein at each point in time/Peak area value of β-Actin at each point in time)/(Peak area value of the SLFN11 protein on Day 0/Peak area value of β-Actin on Day 0)

It is confirmed that the SLFN11 protein expression level in the combined administration group of the antibody-drug conjugate (1) and paclitaxel or the combined administration group of the antibody-drug conjugate (1) and eribulin mesylate shows a higher value than that in the single administration group of the antibody-drug conjugate (1).

Free Text of Sequence Listing
   SEQ ID NO: 1—Amino acid sequence of a heavy chain of the anti-HER2 antibody
   SEQ ID NO: 2—Amino acid sequence of a light chain of the anti-HER2 antibody
   SEQ ID NO: 3—Amino acid sequence of a heavy chain of the anti-HER3 antibody
   SEQ ID NO: 4—Amino acid sequence of a light chain of the anti-HER3 antibody SEQ ID NO: 5—Amino acid sequence of a heavy chain of the anti-TROP2 antibody
SEQ ID NO: 6—Amino acid sequence of a light chain of the anti-TROP2 antibody
SEQ ID NO: 7—Amino acid sequence of a heavy chain of the anti-B7-H3 antibody
SEQ ID NO: 8—Amino acid sequence of a light chain of the anti-B7-H3 antibody
SEQ ID NO: 9—Amino acid sequence of a heavy chain of the anti-GPR20 antibody
SEQ ID NO: 10—Amino acid sequence of a light chain of the anti-GPR20 antibody
SEQ ID NO: 11—Amino acid sequence of a heavy chain of the anti-CDH6 antibody
SEQ ID NO: 12—Amino acid sequence of a light chain of the anti-CDH6 antibody

The invention claimed is:

1. A method of treating cancer, said method comprising administering a first antibody-drug conjugate and administering a tubulin inhibitor to a subject in need of such treatment, wherein the first antibody-drug conjugate is an antibody-drug conjugate in which a drug-linker represented by the following formula:

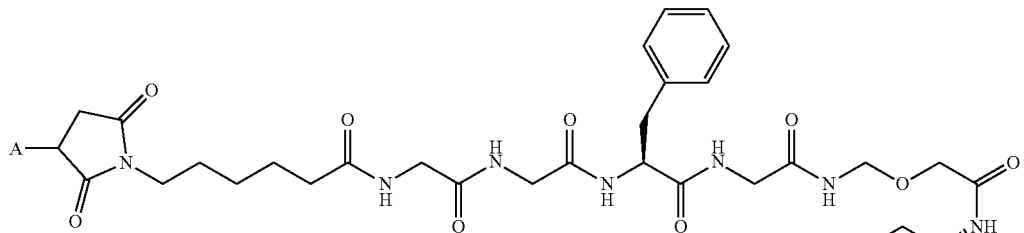
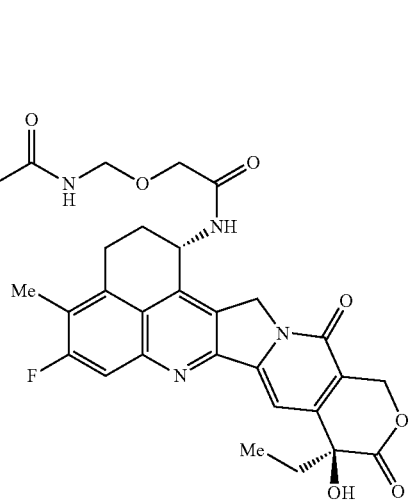

is conjugated to an antibody via a thioether bond, wherein A represents a connecting position to the antibody; and wherein the tubulin inhibitor is:
(i) paclitaxel, docetaxel, cabazitaxel, or eribulin or a pharmacologically acceptable salt therof;
(ii) or nab-paclitaxel; or
(iii) a second antibody-drug conjugate in which eribulin is conjugated to an antibody via a linker.

2. The method of treating cancer according to claim 1, wherein the antibody in the first antibody-drug conjugate is an anti-HER2 antibody, an anti-HER3 antibody, an anti-TROP2 antibody, an anti-B7-H3 antibody, an anti-GPR20 antibody, or an anti-CDH6 antibody.

3. The method of treating cancer according to claim 2, wherein the antibody in the first antibody-drug conjugate is an anti-HER2 antibody.

4. The method of treating cancer according to claim 3, wherein the anti-HER2 antibody is an antibody comprising a heavy chain consisting of an amino acid sequence consisting of amino acid residues 1 to 449 of SEQ ID NO: 1 and a light chain consisting of an amino acid sequence consisting of amino acid residues 1 to 214 of SEQ ID NO: 2.

5. The method of treating cancer according to claim 3, wherein the anti-HER2 antibody is an antibody comprising a heavy chain consisting of an amino acid sequence represented by SEQ ID NO: 1 and a light chain consisting of an amino acid sequence represented by SEQ ID NO: 2.

6. The method of treating cancer according to claim 3, wherein the average number of units of the drug-linker conjugated per antibody molecule in the first antibody-drug conjugate is in the range of from 7 to 8.

7. The method of treating cancer according to claim 2, wherein the antibody in the first antibody-drug conjugate is an anti-HER3 antibody.

8. The method of treating cancer according to claim 7, wherein the anti-HER3 antibody is an antibody comprising a heavy chain consisting of an amino acid sequence represented by SEQ ID NO: 3 and a light chain consisting of an amino acid sequence represented by SEQ ID NO: 4.

9. The method of treating cancer according to claim 7, wherein the anti-HER3 antibody is an antibody comprising a heavy chain consisting of an amino acid sequence consisting of amino acid residues 1 to 446 of SEQ ID NO: 3 and a light chain consisting of an amino acid sequence represented by SEQ ID NO: 4.

10. The method of treating cancer according to claim 7, wherein the average number of units of the drug-linker conjugated per antibody molecule in the first antibody-drug conjugate is in the range of from 7 to 8.

11. The method of treating cancer according to claim 2, wherein the antibody in the first antibody-drug conjugate is an anti-TROP2 antibody.

12. The method of treating cancer according to claim 11, wherein the anti-TROP2 antibody is an antibody comprising a heavy chain consisting of an amino acid sequence consisting of amino acid residues 20 to 470 of SEQ ID NO: 5 and a light chain consisting of an amino acid sequence consisting of amino acid residues 21 to 234 of SEQ ID NO: 6.

13. The method of treating cancer according to claim 11, wherein the anti-TROP2 antibody is an antibody comprising a heavy chain consisting of an amino acid sequence consisting of amino acid residues 20 to 469 of SEQ ID NO: 5 and a light chain consisting of an amino acid sequence consisting of amino acid residues 21 to 234 of SEQ ID NO: 6.

14. The method of treating cancer according to claim 11, wherein the average number of units of the drug-linker conjugated per antibody molecule in the first antibody-drug conjugate is in the range of from 3.5 to 4.5.

15. The method of treating cancer according to claim 2, wherein the antibody in the first antibody-drug conjugate is an anti-B7-H3 antibody.

16. The method of treating cancer according to claim 15, wherein the anti-B7-H3 antibody is an antibody comprising a heavy chain consisting of an amino acid sequence consisting of amino acid residues 20 to 471 of SEQ ID NO: 7 and a light chain consisting of an amino acid sequence consisting of amino acid residues 21 to 233 of SEQ ID NO: 8.

17. The method of treating cancer according to claim 15, wherein the anti-B7-H3 antibody is an antibody comprising a heavy chain consisting of an amino acid sequence consisting of amino acid residues 20 to 470 of SEQ ID NO: 7 and a light chain consisting of an amino acid sequence consisting of amino acid residues 21 to 233 of SEQ ID NO: 8.

18. The method of treating cancer according to claim 15, wherein the average number of units of the drug-linker conjugated per antibody molecule in the first antibody-drug conjugate is in the range of from 3.5 to 4.5.

19. The method of treating cancer according to claim 2, wherein the antibody in the first antibody-drug conjugate is an anti-GPR20 antibody.

20. The method of treating cancer according to claim 19, wherein the anti-GPR20 antibody is an antibody comprising a heavy chain consisting of an amino acid sequence consisting of amino acid residues 20 to 472 of SEQ ID NO: 9 and a light chain consisting of an amino acid sequence consisting of amino acid residues 21 to 234 of SEQ ID NO: 10.

21. The method of treating cancer according to claim 19, wherein the anti-GPR20 antibody is an antibody comprising a heavy chain consisting of an amino acid sequence consisting of amino acid residues 20 to 471 of SEQ ID NO: 9 and a light chain consisting of an amino acid sequence consisting of amino acid residues 21 to 234 of SEQ ID NO: 10.

22. The method of treating cancer according to claim 19, wherein the average number of units of the drug-linker conjugated per antibody molecule in the first antibody-drug conjugate is in the range of from 7 to 8.

23. The method of treating cancer according to claim 2, wherein the antibody in the first antibody-drug conjugate is an anti-CDH6 antibody.

24. The method of treating cancer according to claim 23, wherein the anti-CDH6 antibody is an antibody comprising a heavy chain consisting of an amino acid sequence consisting of amino acid residues 20 to 471 of SEQ ID NO: 11 and a light chain consisting of an amino acid sequence consisting of amino acid residues 21 to 233 of SEQ ID NO: 12.

25. The method of treating cancer according to claim 23, wherein the anti-CDH6 antibody is an antibody comprising a heavy chain consisting of an amino acid sequence consisting of amino acid residues 20 to 470 of SEQ ID NO: 11 and a light chain consisting of an amino acid sequence consisting of amino acid residues 21 to 233 of SEQ ID NO: 12.

26. The method of treating cancer according to claim 23, wherein the average number of units of the drug-linker conjugated per antibody molecule in the first antibody-drug conjugate is in the range of from 7 to 8.

27. The method of treating cancer according to claim 1, wherein the tubulin inhibitor is paclitaxel, docetaxel, cabazitaxel, or a pharmacologically acceptable salt thereof, or nab-paclitaxel.

28. The method of treating cancer according to claim 27, wherein the tubulin inhibitor is paclitaxel.

29. The method of treating cancer according to claim 1, wherein the tubulin inhibitor is eribulin or a pharmacologically acceptable salt thereof, or a second antibody-drug conjugate in which eribulin is conjugated to an antibody via a linker.

30. The method of treating cancer according to claim 29, wherein the tubulin inhibitor is eribulin mesylate.

31. The method of treating cancer according to claim 1, wherein the first antibody-drug conjugate and the tubulin inhibitor are separately contained as active components in different formulations, and are administered simultaneously or at different times.

32. The method of treating cancer according to claim 1, wherein the cancer is method of treatment is for use in treating at least one selected from the group consisting of breast cancer, gastric cancer, colorectal cancer, lung cancer, esophageal cancer, salivary gland cancer, esophagogastric junction adenocarcinoma, biliary tract cancer, Paget's disease, pancreatic cancer, ovarian cancer, bladder cancer, prostate cancer, and uterine carcinosarcoma.

33. The method of treating cancer according to claim 32, wherein the cancer is breast cancer.

34. The method of treating cancer according to claim 32, wherein the cancer is gastric cancer.

35. The method of treating cancer according to claim 32, wherein the cancer is lung cancer.

36. The method of treating cancer according to claim 32, wherein the cancer is ovarian cancer.

37. The method of treating cancer according to claim 1,
wherein the antibody in the first antibody-drug conjugate is an anti-HER2 antibody, wherein the anti-HER2 antibody is (i) an antibody comprising a heavy chain consisting of an amino acid sequence consisting of amino acid residues 1 to 449 of SEQ ID NO: 1 and a light chain consisting of an amino acid sequence consisting of amino acid residues 1 to 214 of SEQ ID NO: 2, or (ii) an antibody comprising a heavy chain consisting of an amino acid sequence represented by SEQ ID NO: 1 and a light chain consisting of an amino acid sequence represented by SEQ ID NO: 2;
wherein the average number of units of the drug-linker conjugated per antibody molecule in the first antibody-drug conjugate is in the range of from 7 to 8; and
wherein the cancer is method of treatment is for use in treating at least one selected from the group consisting of breast cancer, gastric cancer, colorectal cancer, lung cancer, esophageal cancer, salivary gland cancer, esophagogastric junction adenocarcinoma, biliary tract cancer, Paget's disease, pancreatic cancer, ovarian cancer, bladder cancer, prostate cancer, and uterine carcinosarcoma.

38. The method of treating cancer according to claim 37, wherein the tubulin inhibitor is paclitaxel.

39. The method of treating cancer according to claim 37, wherein the tubulin inhibitor is eribulin mesylate.

40. The method of treating cancer according to claim 38, wherein the cancer is breast cancer.

41. The method of treating cancer treatment according to claim 38, wherein the cancer is gastric cancer.

42. The method of treating cancer treatment according to claim 38, wherein the cancer is cancer.

43. The method of treating cancer treatment according to claim 38, wherein the cancer is ovarian cancer.

44. The method of treating cancer according to claim 39, wherein the cancer is breast cancer.

45. The method of treating cancer treatment according to claim 39, wherein the cancer is gastric cancer.

46. The method of treating cancer according to claim 39, wherein the cancer is lung cancer.

47. The method of treating cancer according to claim 39, wherein the cancer is met ovarian cancer.

\* \* \* \* \*